(12) United States Patent
Woolf et al.

(10) Patent No.: US 8,251,704 B2
(45) Date of Patent: Aug. 28, 2012

(54) INSTRUMENTATION AND SCHEMATIZATION OF LEARNING APPLICATION PROGRAMS IN A COMPUTERIZED LEARNING ENVIRONMENT

(75) Inventors: Susan D. Woolf, Seattle, WA (US); Mythreyee Ganapathy, Hyderabad (IN); Patrick O'Kelley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 955 days.

(21) Appl. No.: 11/786,697

(22) Filed: Apr. 12, 2007

(65) Prior Publication Data

US 2008/0254429 A1    Oct. 16, 2008

(51) Int. Cl.
*G09B 3/00* (2006.01)

(52) U.S. Cl. ........ 434/322; 434/156; 434/308; 434/319; 434/365; 434/350

(58) Field of Classification Search .................. 434/167, 434/322, 350, 308, 319, 156, 365
See application file for complete search history.

(56) References Cited

U.S. PATENT DOCUMENTS

| | | | |
|---|---|---|---|
| 4,336,020 A | 6/1982 | Zacharin | |
| 4,798,543 A | 1/1989 | Spiece | |
| 4,967,077 A | 10/1990 | Watson | |
| 5,035,625 A | 7/1991 | Munson et al. | |
| 5,437,555 A | 8/1995 | Ziv-El | |
| 5,439,232 A | 8/1995 | Pollock | |
| 5,456,607 A | 10/1995 | Antoniak | |
| 5,607,356 A | 3/1997 | Schwartz | |
| 5,782,692 A | 7/1998 | Stelovsky | |
| 5,806,056 A | 9/1998 | Hekmatpour | |
| 5,813,913 A | 9/1998 | Berner et al. | |
| 5,879,165 A | 3/1999 | Brunkow et al. | |
| 6,076,021 A | 6/2000 | Houriet, Jr. et al. | |
| 610,639 A | 8/2000 | Begis | |
| 6,099,320 A | 8/2000 | Papadopoulos | |
| 6,146,148 A | 11/2000 | Stuppy | |

(Continued)

FOREIGN PATENT DOCUMENTS

EP   1326189 A2   7/2003

(Continued)

OTHER PUBLICATIONS

Kirriemuir, et al., "Literature Review in Games and Learning", http://www.futurelab.org.uk/download/pdfs/research/lit_reviews/Games_Review1.pdf.

(Continued)

*Primary Examiner* — Xuan Thai
*Assistant Examiner* — Banafsheh Hadizonooz
(74) *Attorney, Agent, or Firm* — Alleman Hall McCoy Russell & Tuttle LLP

(57) ABSTRACT

A computerized learning method is provided. The method may include receiving a write request from a first learning application program to write a learning level for a skill in a user profile. The user profile is configured to store data indicative of a plurality of skills and a learning level for each skill. The skills and learning levels are defined according to a profile schema. The method may further include writing the learning level for the skill in the user profile. The method may also include receiving a read request from a second learning application program to read the learning level for the skill in the user profile. The method may finally include retrieving the learning level from the user profile, and sending the learning level to the second learning application program.

18 Claims, 25 Drawing Sheets

U.S. PATENT DOCUMENTS

| | | | |
|---|---|---|---|
| 6,149,441 | A | 11/2000 | Pellegrino et al. |
| 6,164,975 | A | 12/2000 | Weingarden et al. |
| 6,186,794 | B1 | 2/2001 | Brown et al. |
| 6,227,863 | B1 | 5/2001 | Spector |
| 6,270,351 | B1 | 8/2001 | Roper |
| 6,287,123 | B1 | 9/2001 | O'Brien |
| 6,301,462 | B1 | 10/2001 | Freeman et al. |
| 6,302,698 | B1 | 10/2001 | Ziv-El |
| 6,322,366 | B1 | 11/2001 | Bergan et al. |
| 6,336,813 | B1 | 1/2002 | Siefert |
| 6,347,333 | B2 | 2/2002 | Eisendrath et al. |
| 6,352,479 | B1 | 3/2002 | Sparks, II |
| 6,377,781 | B1 | 4/2002 | Mishkin |
| 6,405,162 | B1 | 6/2002 | Segond et al. |
| 6,419,496 | B1 | 7/2002 | Vaughan, Jr. |
| 6,487,583 | B1 | 11/2002 | Harvey et al. |
| 6,507,726 | B1 | 1/2003 | Atkinson et al. |
| 6,546,230 | B1 * | 4/2003 | Allison .................. 434/350 |
| 6,551,107 | B1 | 4/2003 | Buckley et al. |
| 6,554,618 | B1 | 4/2003 | Lockwood |
| 6,634,949 | B1 | 10/2003 | Briggs et al. |
| 664,876 | A1 | 11/2003 | Nicastro |
| 6,641,481 | B1 | 11/2003 | Mai et al. |
| 6,688,888 | B1 | 2/2004 | Ho et al. |
| 6,699,043 | B2 | 3/2004 | Ho et al. |
| 6,699,125 | B2 | 3/2004 | Kirmse et al. |
| 6,704,541 | B1 | 3/2004 | Ciarallo et al. |
| 6,790,045 | B1 | 9/2004 | Drimmer |
| 6,808,393 | B2 | 10/2004 | Mascarenhas |
| 6,813,474 | B2 | 11/2004 | Robinson et al. |
| 6,817,947 | B2 | 11/2004 | Tanskanen |
| 6,825,601 | B2 | 11/2004 | Yamauchi et al. |
| 6,884,175 | B2 | 4/2005 | Toriyama et al. |
| 6,921,268 | B2 | 7/2005 | Bruno et al. |
| 6,944,596 | B1 | 9/2005 | Gray et al. |
| 6,944,624 | B2 | 9/2005 | Orton et al. |
| 6,979,267 | B2 | 12/2005 | Leen et al. |
| 6,987,945 | B2 | 1/2006 | Corn et al. |
| 6,996,366 | B2 | 2/2006 | L'Allier et al. |
| 7,025,675 | B2 | 4/2006 | Fogel et al. |
| 7,029,394 | B2 | 4/2006 | Leen et al. |
| 7,050,753 | B2 | 5/2006 | Knutson |
| 7,054,831 | B2 | 5/2006 | Koenig |
| 7,080,030 | B2 | 7/2006 | Eglen et al. |
| 7,192,352 | B2 | 3/2007 | Walker et al. |
| 7,545,784 | B2 | 6/2009 | Mgrdechian et al. |
| 7,895,625 | B1 | 2/2011 | Bryan et al. |
| 2001/0017632 | A1 | 8/2001 | Goren-Bar |
| 2001/0031456 | A1 | 10/2001 | Cynaumon et al. |
| 2001/0049084 | A1 | 12/2001 | Mitry |
| 2002/0045154 | A1 | 4/2002 | Wood et al. |
| 2002/0046202 | A1 | 4/2002 | Honda |
| 2002/0081561 | A1 | 6/2002 | Skeans et al. |
| 2002/0086267 | A1 | 7/2002 | Birkhoelzer et al. |
| 2002/0101036 | A1 | 8/2002 | Kutzik |
| 2002/0138456 | A1 | 9/2002 | Levy et al. |
| 2002/0142815 | A1 | 10/2002 | Candelore |
| 2002/0187463 | A1 * | 12/2002 | Aspe et al. .................. 434/362 |
| 2002/0188583 | A1 | 12/2002 | Rukavina et al. |
| 2002/0193162 | A1 | 12/2002 | Walker et al. |
| 2003/0009742 | A1 | 1/2003 | Bass et al. |
| 2003/0017442 | A1 | 1/2003 | Tudor et al. |
| 2003/0027121 | A1 | 2/2003 | Grudnitski et al. |
| 2003/0059761 | A1 | 3/2003 | Patterson |
| 2003/0134261 | A1 | 7/2003 | Jennen et al. |
| 2003/0148253 | A1 | 8/2003 | Sacco et al. |
| 2003/0152902 | A1 | 8/2003 | Altenhofen et al. |
| 2003/0152903 | A1 | 8/2003 | Theilmann |
| 2003/0203346 | A1 | 10/2003 | Wen et al. |
| 2003/0207237 | A1 | 11/2003 | Glezerman |
| 2003/0207242 | A1 | 11/2003 | Balasubramanian |
| 2004/0009457 | A1 | 1/2004 | Weiner et al. |
| 2004/0009462 | A1 | 1/2004 | McElwrath |
| 2004/0018479 | A1 | 1/2004 | Pritchard et al. |
| 2004/0073787 | A1 | 4/2004 | Ban et al. |
| 2004/0110119 | A1 | 6/2004 | Riconda et al. |
| 2004/0114032 | A1 | 6/2004 | Kakii et al. |
| 2004/0127289 | A1 | 7/2004 | Davis et al. |
| 2004/0128319 | A1 | 7/2004 | Davis et al. |
| 2004/0180317 | A1 | 9/2004 | Bodner et al. |
| 2004/0193776 | A1 | 9/2004 | Iida et al. |
| 2004/0209231 | A1 | 10/2004 | Merritt |
| 2004/0219502 | A1 | 11/2004 | Bechard et al. |
| 2004/0219504 | A1 | 11/2004 | Hattie |
| 2004/0241625 | A1 * | 12/2004 | Raya et al. .................. 434/167 |
| 2005/0026131 | A1 | 2/2005 | Elzinga et al. |
| 2005/0048458 | A1 | 3/2005 | Collins et al. |
| 2005/0089829 | A1 | 4/2005 | Wasowicz |
| 2005/0113164 | A1 | 5/2005 | Buecheler et al. |
| 2005/0137006 | A1 | 6/2005 | Rothschild et al. |
| 2005/0175970 | A1 | 8/2005 | Dunlap et al. |
| 2005/0186550 | A1 | 8/2005 | Gillani |
| 2005/0191605 | A1 | 9/2005 | Nguyen et al. |
| 2005/0192097 | A1 | 9/2005 | Farnham et al. |
| 2005/0221261 | A1 | 10/2005 | Wen et al. |
| 2005/0221268 | A1 | 10/2005 | Chaar et al. |
| 2005/0227215 | A1 | 10/2005 | Bruno et al. |
| 2005/0227216 | A1 | 10/2005 | Gupta |
| 2005/0227792 | A1 | 10/2005 | McCreary et al. |
| 2005/0233288 | A1 | 10/2005 | McGrath |
| 2005/0266906 | A1 | 12/2005 | Stevens |
| 2005/0278041 | A1 | 12/2005 | Bortnik et al. |
| 2006/0046239 | A1 | 3/2006 | Allen et al. |
| 2006/0078863 | A1 | 4/2006 | Coleman et al. |
| 2006/0078868 | A1 | 4/2006 | Douglas et al. |
| 2006/0082060 | A1 | 4/2006 | Soto |
| 2006/0105313 | A1 | 5/2006 | Mansfield et al. |
| 2006/0121991 | A1 | 6/2006 | Bortnik et al. |
| 2006/0121992 | A1 | 6/2006 | Bortnik et al. |
| 2006/0122716 | A1 | 6/2006 | Bortnik et al. |
| 2006/0127871 | A1 | 6/2006 | Grayson |
| 2006/0135264 | A1 | 6/2006 | Shaw et al. |
| 2006/0154227 | A1 | 7/2006 | Rossi et al. |
| 2006/0166174 | A1 | 7/2006 | Rowe et al. |
| 2006/0170945 | A1 | 8/2006 | Bill |
| 2006/0204947 | A1 | 9/2006 | Berger et al. |
| 2006/0223041 | A1 | 10/2006 | Beck et al. |
| 2006/0240395 | A1 | 10/2006 | Faist et al. |
| 2006/0247055 | A1 | 11/2006 | O'Kelley, II et al. |
| 2006/0258416 | A1 | 11/2006 | Crawford |
| 2006/0286538 | A1 | 12/2006 | Scalone et al. |
| 2006/0287106 | A1 | 12/2006 | Jensen |
| 2007/0009875 | A1 | 1/2007 | Berman |
| 2007/0021168 | A1 | 1/2007 | Chamizer et al. |
| 2007/0136603 | A1 * | 6/2007 | Kuecuekyan .................. 713/185 |
| 2007/0143130 | A1 | 6/2007 | Hearn |
| 2007/0143175 | A1 | 6/2007 | Tien et al. |
| 2007/0218434 | A1 * | 9/2007 | Habichler et al. .................. 434/219 |
| 2007/0218447 | A1 | 9/2007 | Chavan |
| 2007/0248938 | A1 * | 10/2007 | Ronald .................. 434/178 |
| 2007/0273101 | A1 | 11/2007 | Berke et al. |
| 2007/0277104 | A1 | 11/2007 | Hennum et al. |
| 2007/0281285 | A1 | 12/2007 | Jayaweera |
| 2008/0108035 | A1 * | 5/2008 | Warda .................. 434/335 |
| 2008/0109453 | A1 | 5/2008 | Bauer |
| 2008/0153596 | A1 | 6/2008 | Nguyen |
| 2008/0268414 | A1 | 10/2008 | Fung |
| 2009/0054127 | A1 | 2/2009 | Sweary et al. |

FOREIGN PATENT DOCUMENTS

| | | | |
|---|---|---|---|
| JP | 2004233734 A | | 8/2004 |
| KR | 20010000648 A | | 1/2001 |
| KR | 20010044827 A | | 6/2001 |
| KR | 20010075837 A | | 8/2001 |
| KR | 20020003721 A | | 1/2002 |
| KR | 20020086422 A | | 11/2002 |
| WO | 2005113093 A1 | | 12/2005 |
| WO | 2006073377 A2 | | 7/2006 |

OTHER PUBLICATIONS

Newman, Michael, "The Academic Achievement Game", Date: 2001, vol. 18, No. 4, http://wcx.sagepub.com/cgi/content/abstract/18/4/470.

Peters, et al., "A Simple Classification Model for Debriefing Simulation Games ", Date: 2004, vol. 35, No. 1, http://sag.sagepub.com/cgi/content/abstract/35/1/70.

Reisinger, et al., "Coevolving Strategies for General Game Playing", Date: 2007, http://nn.cs.utexas.edu/downloads/papers/reisinger.cig07.pdf.

ISA Korea, International Search Report of PCT/US2008/060136, Oct. 8, 2008, 3 pages.

Stead, et al., "The Learner Profile an e-learning research and development project"; Developing Pupil Voice; Jul. 2006; http://www.ellnet.org/reports/learnerprofile.pdf; 11 Pgs.

Keller, Spring, "Adaptive Game-Based Learning" Publication 2006, access date Feb. 16, 2007; http://www.research.unizh.ch/p6544.htm; 2 pgs.

Atari, "Invasion From Beyond"; Listed on Amazon.com; http://www.amazon.com/Invasion-From-Beyond/dp/B00002STJ1; access date Feb. 16, 2007; 6 Pgs.

Ang, et al., "Social Interaction in Game Communities and Second Language Learning", The 19th British HCI Group Annual Conference, Edinburgh, UK, 2005, 2 Pgs.

Ang, et al., "Developing Enjoyable Second Language Learning Software Tools: A Computer Game Paradigm" access date 2005; http://www.soi.city.ac.uk~cf559/My_Paper/Developing%20Enjoyable%20Second%20Languag%20Learning%20Software%20Tools%20A%20Computer%20Game%20Paradigm.pdf; 36 Pgs.

Mundy, Darren, "Using Learning Objects to Support Introductory Computer Architecture Education" Proceedings of the Fifth IASTED International Conference Web-Based Education; Jan. 23-25, 2006; Puerti Vallarta, Mexico; 6 Pgs.

De Weck, et al., "Active Learing Games" 1st Annual CDIO Conference, Queen's University, Ontario CA; Jun. 7-8, 2005; 17 Pgs.

Woodill, et al., "The Design of LearnFlex Evaluator a Web-Based Adaptable Assessment and Evaluation Application"; Operitel Coporation, www.operitel.com, 2005, 10 Pgs.

ISA Korea, International Search Report of PCT/US2008/060151, Oct. 8, 2008, WIPO, 11 pages.

ISA Korea, International Search Report of PCT/US2008/060136, Oct. 8, 2008, WIPO, 12 pages.

ISA Korea, International Search Report of PCT/US2008/060155, Sep. 1, 2008, WIPO, 10 pages.

ISA Korea, International Search Report of PCT/US2008/060152, Oct. 8, 2008, WIPO, 11 pages.

ISA Korea, International Search Report of PCT/US2008/060154, Oct. 8, 2008, WIPO, 11 pages.

"Behavior Authoring Techniques in Computer Games and their Utility in Military Training Simulations," BBN Technologies, http://seriousgames.bbn.com/behaviorauthoring/militaryuse.html, Date of Access Feb. 16, 2007, 3 pages.

"The EA Sports Nation Debuts Online For The Playstation 2," EA News, http://ps2.gamezone.com/news/09_15_03_05_28PM.htm, Sep. 15, 2003, 2 pages.

"Quazel: Products and Services for Multiplayer Game Development," http://www.quazel.com/modules.php?op=modload&name=Section&file=index&req=viewarticle&artid=25&page=1, Date of Access Feb. 16, 2007, 2 pages.

"What is the TrueSkill Ranking system?" http://research.microsoft.com/mlp/trueskill/, Date of Access Feb. 16, 2007, 2 pages.

"Edutainment: A Trojan Horse for Learning," Mar. 2005, <http://www.apple.com/games/articles/2005/03/edutainment/>, Access date Feb. 16, 2007, 4 pages.

"Harnessing the power of video games for learning," Federation of American Scientists' National Summit on Education Games, Oct. 25, 2005, Washington D.C., 53 pages.

"Game-Based E-Learning Gets Real," Jan. 2001, <http://www.learningcircuits.org/2001/jan2001/klaila.html>, Access date Feb. 16, 2007, 5 pages.

"Xbox 360: New Details from GDC Europe—Xbox," Aug. 31, 2005, <http://web.archive.org/web/20051001012716/http://news.teamxbox.com/xbox.9133/xbox-360-new-details-from-GDC-Europe/7-2005>, Access date Jul. 27, 2011, 3 pages.

Feng, M. et al., "Informing Teachers Live about Student Learning: Reporting in the Assistment System," Tech., Inst., Cognition and Learning, vol. 3, pp. 00-00; Department of Computer Science, Worcester Polytechnic Institute, Worcester, MA 01609; 2005, 14 pages.

Black, P. et al., "Assessment and Classroom Learning," Assessment in Educations: Principles, Policy & Practice; vol. 5 Issue 1; Mar., 1998; 54 pages.

Gaylord, T. et al., "University of Akron and Kent State University: Schools Collaborate to Create Online Learning Initiative," <http://campustechnology.com/articles/39079/>, Feb. 3, 2003, 4 pages.

Mazza, et al., "Visualising Student Tracking Data to Support Instructors in Web-Based Distance Education", Date: May 2004, pp. 1-8, New York, USA.

Pivec, et al., "Game-based learning framework for collaborative learning and student e-teamwork", 2004, pp. 1-8.

* cited by examiner

INSTRUMENTATION AND SCHEMATIZATION OF LEARNING APPLICATION PROGRAMS IN A COMPUTERIZED LEARNING ENVIRONMENT

BACKGROUND

Video games show potential as an effective tool for learning a range of subjects. However, learning-oriented games to date have been designed as separated experiences, and cannot measure, store, or retrieve learning data about game players across game titles. For example, skills acquired by the user in one game are not available for reading or modification by other games. This problem is compounded when games are from different publishers, for example, due to the different formats for data that each publisher employs. As a result, the player must start anew acquiring skills, and spend needless time playing levels of the game that are not adjusted to the user's skills.

While some video games enable a user to select a general level of difficulty prior to starting a game, this has the drawback of potentially incorrect self assessment, and also does not account for skill-by-skill differences in the ability of players. Further, games in which a user selects a level of difficulty are not provided with mechanisms by which the game can update or modify the user's level of difficulty, for example, if the user selected too low a difficulty level, or if the user improves his skill through practice in the game. Thus, the user may grow tired of a game that is too easy, or quit a game that is too hard. Finally, there is no way to compare user learning in games from one game to the next, because a difficulty level in one game may not be comparable to a difficulty level in another game. For this reason, the user experience with learning software applications has been isolated, fragmented and non-cumulative.

SUMMARY

A computerized learning method is provided. The method may include receiving a write request from a first learning application program to write a learning level for a skill in a user profile. The user profile is configured to store data indicative of a plurality of skills and a learning level for each skill. The skills and learning levels are defined according to a profile schema. The method may further include writing the learning level and other learning data for the skill in the user profile. The method may also include receiving a read request from a second learning application program to read the learning level and other learning data for the skill in the user profile. The method may finally include retrieving the learning level and other learning data from the user profile, and sending the learning information to the second learning application program.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

I. Overview

Figure 1:
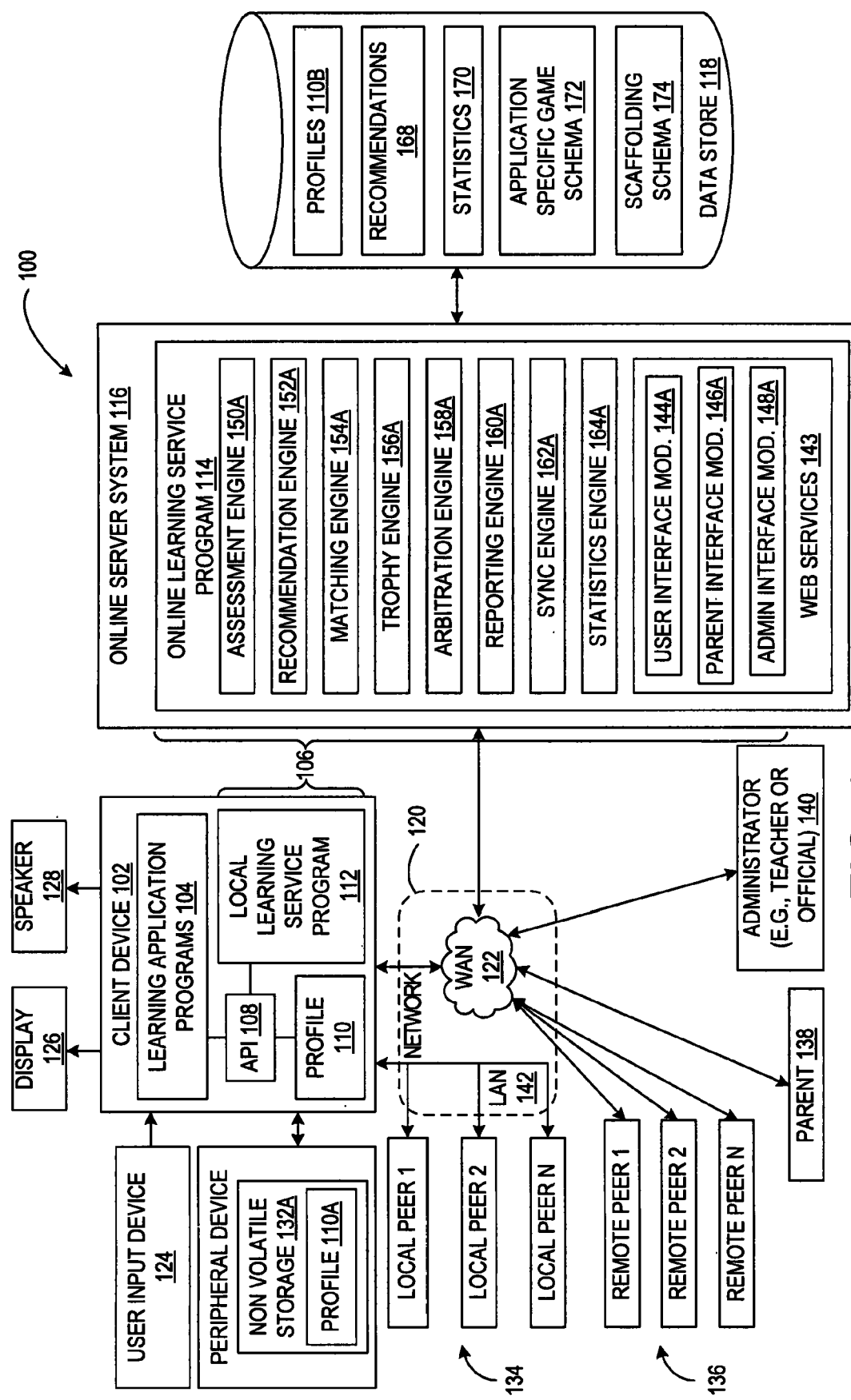
FIG. 1 shows a schematic depiction of an embodiment of a computerized learning system.

FIG. 1 illustrates an embodiment of a computerized learning system 100. The computerized learning system 100 includes a user client device 102 configured to execute one or more of a plurality of learning application programs 104, each of which is configured to communicate learning data for each of a plurality of users with a learning service program 106, via an application programming interface (API) 108. The plurality of users may interact with the computerized learning system 100 via user client devices 102 synchronously, i.e., at the same time, or asynchronously, i.e., at different times. The learning service program 106 is configured to store the learning data in a profile 110 for each user. The data in profile 110 is made available to the plurality of different learning applications 104 by the application programming interface 108 and the learning service program 106, which are configured to receive and process via read and write requests for the learning data in the user profiles, from each of the learning application programs 104, as described in detail below.

As used herein "program" refers to software or firmware components that may be executed by, or utilized by one or more computing devices of the computerized learning system 100, and is meant to encompass individual or groups of executable files, data files, libraries, drivers, scripts, database records, etc. It will be appreciated that the learning service program 106 may include a local component and an online component. The local component may be a local learning service program 112 executed on the user client device 102, and the online component may be an online learning service program 114 executed on an online server system 116. The local component may function as a subset of the online component functionality in the event that connectivity is not available. Alternatively, the local component may be a "thin client" (e.g. a Web browser) to which application software and services are communicated via the Internet. Whether the learning application programs are displayed on the user client device via a thin client which is served remotely, or reside as standalone applications, they are described herein to be executed on the client device.

The profile 110 may be stored in the user client device 102, in a peripheral device 130 associated with the user client device 102 as illustrated at 110A, or on a data store 118 associated with the online server system 116, as illustrated at 110B. The user client device 102 and the online server system 116 are configured to communicate via a computer network 120, which may include a wide area network (WAN) 122. The learning application programs 104 of the user client device 102 may be configured to communicate over WAN 122 with the online learning service program 114 via the application programming interface 108 and local learning service 112. In other embodiments, for example, the computer network 120 may be a wireless telephone network configured to communicate with computer-enabled wireless telephones or other mobile computing devices.

The user client device 102 may be a personal computer, computer-enabled wireless telephone, portable data assistant (PDA), or other computing device on which a computer operating system is configured to interact with learning application programs 104. The user client device 102 may include various components not shown in FIG. 1, including but not limited to a processor connected via a bus to volatile memory (e.g., Random Access Memory), non-volatile storage device (e.g., Read Only Memory), and/or a mass storage device (e.g. a hard drive). The user client device 102 further may be configured to receive input from one or more of associated user input device 124, such as a keyboard, mouse, stylus, camera, game controller, and/or microphone, and to send output to output devices such as a display 126 and audio speaker 128. It will be appreciated that these input and output devices may be integrated into the user client device 102, such as in a laptop or mobile telephone.

As noted above, peripheral device 130 equipped with a non-volatile storage 132A, 132B for storing a copy of the profile 110 may also be provided. The peripheral device 130 may be, for example, a memory-equipped stylus, mouse, portable USB flash drive, etc., and may be configured to connect directly, or via a wired or wireless connection to the user client device 102.

The computerized learning system 100 further includes a plurality of other client devices connected to the computer network 120, such as local peer client devices 134, remote peer client devices 136, a parent client device 138, and an administrator client device 140. It will be appreciated that as used herein the term "administrator" is used broadly to refer to a person with authority to administer educational services to a population of students, and encompasses teachers and managers alike, as explained in detail below. Thus, separate user interfaces may be provided for teacher administrators and managing administrators to access the learning system via the administrator client device 140. Like the user client device 102, each of these other client devices 134-140 is configured to run one or more of the learning application programs 104 and the local learning service program 112. As these devices 134-140 are configured similarly to device 102, they will not be described in detail. It will be appreciated that the computer network 120 may further include a local area network (LAN) 142, and local peer client devices 134 are configured to communicate with the user client device 102 via LAN 142. LAN 142 may be a wireless or wired network.

Figure 2:
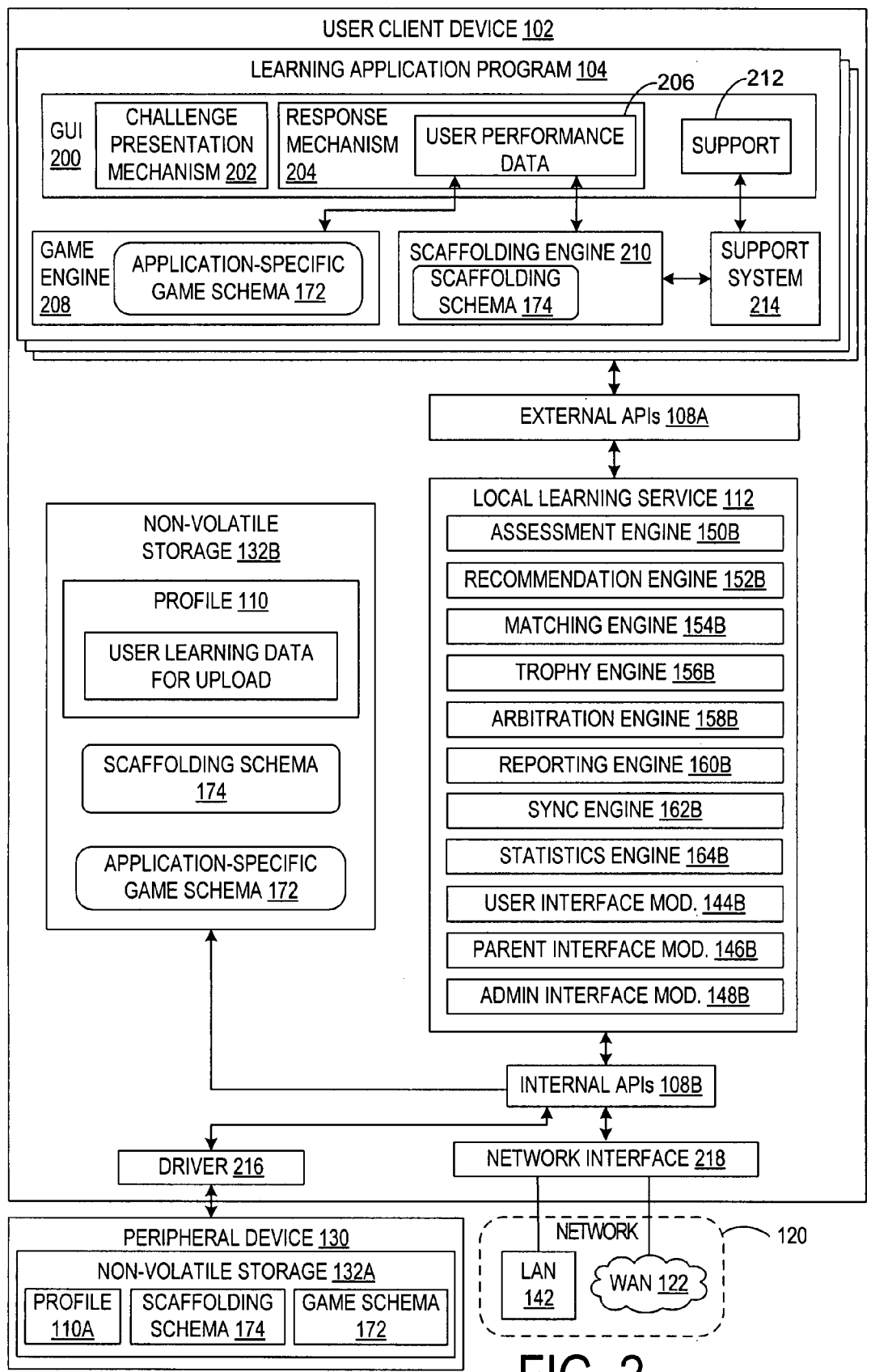
FIG. 2 shows a schematic depiction of an embodiment of a user client device.

Remote peer client devices 136 typically connect to WAN 122 of the computer network 120. It will be appreciated that the primary difference between local peer client devices and remote peer client devices is their respective point of contact with the computer network 120, and a single computing device, such as a portable laptop computer or web-enabled mobile telephone, may transition between network access points and alternately assume the role of locally and remotely connected peer device. Similarly, it will be appreciated that parent client device 138 and administrator client device 140 are configured to connect to WAN 122, but may alternatively connect to LAN 142. It will also be appreciated that the distinction between parent, administrator (e.g., teacher or management), user and peer client devices also depends on which of a plurality of users is using the client device to access the learning service program 106, and users may use different client devices to access the learning service than the ones which hold the learning application programs. For example, a child user can play a learning application program on a first computing device, and a parent can access the online learning service to review statistics on the child's play via a second computing device that does not hold a learning application program. With reference to FIGS. 1 and 2, as described in more detail below the local learning service program 106 and the online learning service program 114 may be configured with a user interface module 144A, 144B, parent interface module 146A, 146B, and administrator interface module 148A, 148B, which are respectively configured to display a user, parent, and administrator interface to an authenticated user with user-level, parent-level, or administrator-level privileges. Thus, the role of a particular client device may change with the authenticated user using the client device. It will be appreciated that user interface module 144A, parent interface module 146A, and administrator interface module 148A may be part of web service program 143, each program being executed on a separate, purpose-built web server within online server system 116. On the other hand, modules 144B-148B are executed locally on user client device 102.

Continuing with reference to FIGS. 1 and 2, each of the local learning service program 112 and the online learning service program 114 also may include a variety of software engines configured to provide specific functionality. In the illustrated configuration, each a copy of each engine is provided at each of the local learning service program and the online learning service program. The collection of software engines is illustrated to include an assessment engine 150A, 150B, recommendation engine 152A, 152B, matching engine 154A, 154B, a trophy engine 156A, 156B, an arbitration engine 158A, 158B, a reporting engine 160A, 160B, a sync engine 162A, 162B, and a statistics engine 164A, 164B. These engines may be generally described without specifying a location, or may be specifically described by reference to the location of the engine as local or online. It will be appreciated that the engines may reside both locally and online, or may be provided at one or the other of the local service program or online service program. For example, in one embodiment the arbitration engine and the recommendation engine reside only on the online learning service program, such that local arbitration engine 158A and local recommendation engine 152A are omitted. The function of each of the engines listed above will be described in detail below.

As mentioned above, the computerized learning system 100 may include the data store 118 configured to communicate with the online server system 116. The data store 118 may be configured to store data used by the online server system 116, including profiles 110, as discussed above and illustrated at 110B, recommendations 168 generated by the recommendation engine, statistics 170 generated by the statistics engine, application-specific game schemas 172, and scaffolding schemas 174. The function of these data types is also described in detail below.

The assessment engine of the learning service program 106 may administer an assessment test to a user. In one embodiment, an intra-game assessment is made by learning application program 104. Alternatively, a request is sent to the assessment engine of learning service program 106 to administer an assessment test to the user. The assessment test is designed to verify learning levels determined in the intra-game assessment.

For example, when a user is determined to advance a learning level, the content of the learning application program may be made more difficult and relevant to the aspiring level. Thus, one purpose of the assessment test is to verify that a proposed adjustment of content in the learning application program based on advancement of a learning level is appropriate. By doing this, the learning service program 106 may verify that the intra-game assessment of the user's learning level is substantially equivalent to the assessment engine's evaluation of the user's learning level before the assessed learning level may be updated to the profile 110 of the user. Another related purpose of the assessment test is to verify that the learning application program is presenting content to users that is standardized or consistent in its difficulty. If one learning application program continually recommends users for learning level advancement who in turn fail assessment tests, the learning service operator may inform the learning application program vendor that the content of the learning application program needs to be made more difficult in order to adhere to accepted standards. These accepted standards could be defined by the learning service operator, for example.

In this way, the assessment test may facilitate standardization of criterion for receiving trophies that are awarded across a plurality of learning application programs. In addition, the assessment engine may be used to verify that adjustment of support in the learning application program by scaffolding engine 210 may be appropriately correlated to skills gained by the user.

It may be further desired to receive parental authorization for the user to undertake the assessment test prior to administering the assessment test. In particular, the assessment test may be administered via the online learning service program 114 such that a parent of the user may authorize administration of a assessment test from a remote client device before the user may take the test. Accordingly, an API call may request retrieval of data for generating an assessment test following parent authorization of the assessment test. For example, an assessment test may be generated based on trophy data stored in the profile 110 of the user such that the assessment test may effectively test skills intended to be acquired by the user for the trophy specified. In addition, a notification message may be sent to an authorized parent of the user following the award of a trophy to the user. For example, a parent of the user may receive a notification message in a parent view of data associated with the profile 110, as described in further detail below.

Reporting engine 160A, 160B may arrange data stored in the profile 110 of the user in a plurality of preselected report templates for the user. In particular, profile learning data may be arranged in a view corresponding to the user accessing the information, such as a student user, a parent of the user, an administrative user, etc. As such, reporting engine 160A, 160B may arrange data retrieved from the profile 110 of the user by an API call into viewable reports that may vary depending on the requesting client.

Referring now to FIG. 2, each of the learning application programs 104 on the user client device 102 is configured to present graphical user interface (GUI) 200 including a challenge presentation mechanism 202 configured to present a challenge to the user, and further including a user response mechanism 204 configured to receive a response as user input from the user. From the user response received via the user response mechanism 204, the learning application program is configured to generate user performance data 206 indicative of a user's performance in response to the challenge. GUI 200 is also configured to present support 212 (also referred to as "scaffolding") to the user to aid the user in completing the challenge.

The learning application programs 104 further may include a game engine 208 including a copy of application-specific game schema 172. The application-specific game schema 172, may, for example, take the form of a game configuration file written in an extensible mark up language, as described in detail below. The game engine functions to generate the game play displayed on GUI 200 of the learning application program. For example, the game engine 208 may control the audio and visual output of the learning application program 104.

The content and presentation of the support 212 may be determined and controlled by a support system 214 in the learning application program, with input from a scaffolding engine 210. The scaffolding engine is configured to store a copy of scaffolding schema 174, which provides a standardized framework for customizing support to a user's assessed scaffolding level, as described in detail below.

The application programming interface 108 shown in FIG. 1 may include external APIs 108A and internal APIs 108B, shown in FIG. 2. The APIs 108A and 108B are respectively configured to send and receive data between the learning application programs 104 and the profile 110, which may be stored in non-volatile storage 132B of the user client device 102, as indicated at 110B, or which may be stored in non-volatile storage, of peripheral device 130, as indicated at 110A. In additional to the local copy of the profile 110B non-volatile storage 132A on the user client device 102 is further configured to store a copy of application-specific game schema 172 and scaffolding schema 174.

A driver 216 or other suitable device interface is provided to facilitate communications between the user client device 102 and peripheral device 130, and a network interface 218 is provided to facilitate communications between the user client device 102 and the online server system 116 or other computing devices connected to the computer network 120.

Figure 3:
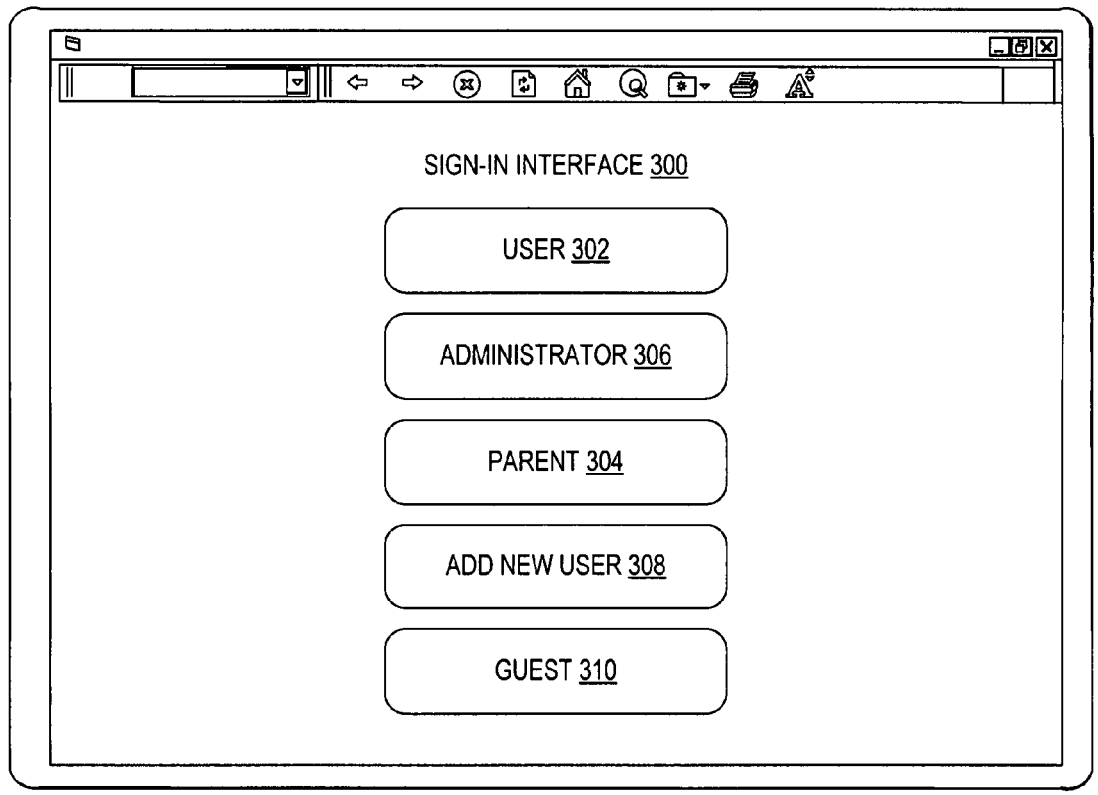
FIG. 3 shows an embodiment of a graphical user interface that may be used to sign-in to a learning service program of the computerized learning system.

FIG. 3 illustrates an exemplary embodiment of a learning service program sign-in interface 300. Sign-in interface 300 may be a graphical user interface that is displayed upon startup of the learning service program 106 and may prompt the user to sign into the learning service program 106 by entering or selecting a user ID via a selector such as a user selector 302, a parent selector 304, and an administrator selector 306. In the depicted example, selection of one or selectors 302-306 prompts the user to enter a user ID and password to sign in to the system. Once signed in, each user ID may be linked to a particular profile, and an appropriate interface such as a user interface, parent interface, teacher administrator interface, or managing administrator interface is shown to the user. These are described below in reference to FIGS. 4, 11, 12, and 13. It will be appreciated that a user ID may be linked to the profile 110 of a single user, while parent IDs are may be linked to one or more student profiles, and administrator IDs and teacher administrators IDs are may be linked to a plurality of profiles.

Furthermore, sign-in interface 300 may include an add new user selector 308. The add new user selector 308 may be selected by a first-time user that is signing into the learning service program 106 for the first time. Upon selecting selector 308, the first-time user may be prompted to create a profile 110. In one particular example, the creation process of the profile 110 may include creating a user ID, selecting an identification picture or avatar, selecting a color scheme of the profile 110, selecting a primary language (and a secondary language where applicable), and selecting a number of other possible personalizing/distinguishing attributes for the profile. Once the profile 110 is created, the profile 110 may be added to a list of selectable client IDs on the sign-in interface, and stored as described above on the user client device 102, peripheral 130, or the data store 118 associated with the online server system 116.

In some embodiments, the sign-in interface 300 may include a guest selector 310 which a user may select to interact with a particular learning application program. By signing in to the learning service as a guest, a user may bypass the creation process of the profile 110 and may be provided with a guest ID. A guest may interact with various learning application programs, but typically no user performance data may be saved and no learning level may be tracked once the guest stops interacting with the learning application program. Further, a guest may have limited (or no) ability to interact with other users online.

In some embodiments, the sign-in interface 300 may be displayed responsive to execution of the learning application program. Alternatively, the sign-in interface 300 may be displayed as an element of a dashboard interface that may be selectively displayed by the learning service program 106.

In some cases, the sign-in interface may be selectively displayed during interaction with the learning application program so that different users may sign in or sign out of the learning service.

Figure 4:
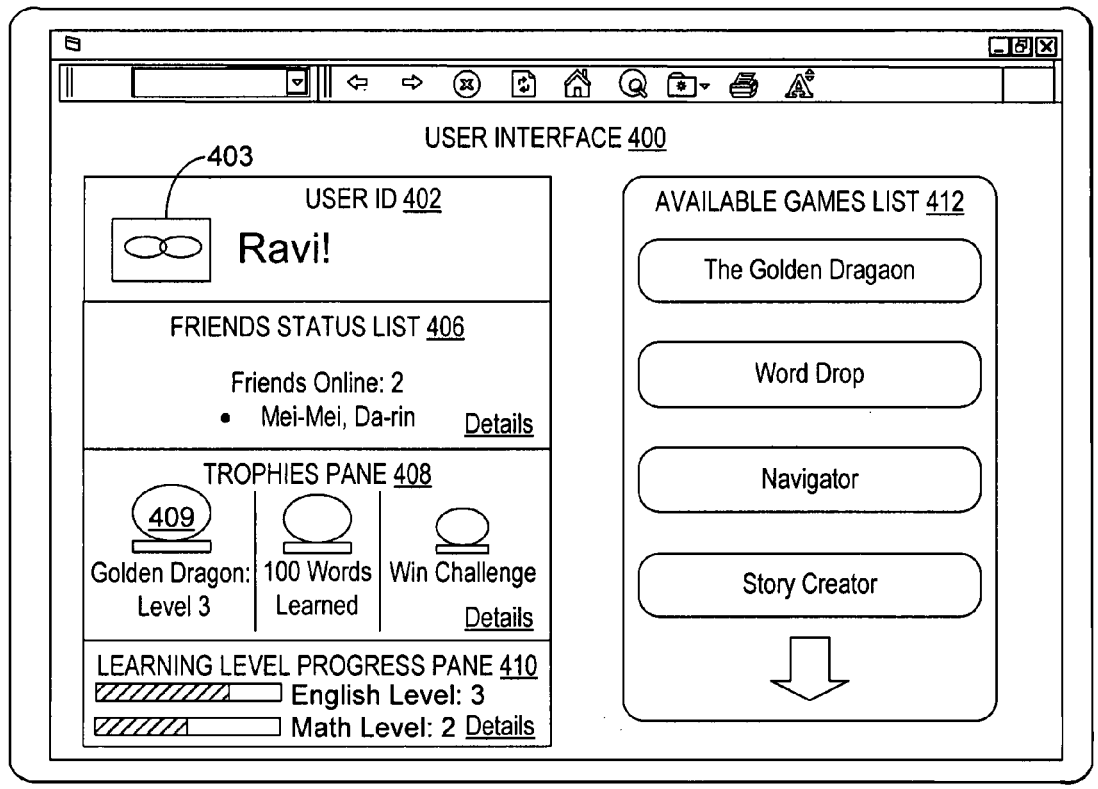
FIG. 4 shows an embodiment of a graphical user interface presenting information relating to a profile of a user.

FIG. 4 illustrates an exemplary embodiment of a user interface 400 that may be generated by the user interface module 144A, 144B of the learning service program 106. The user interface 400 may be a graphical user interface that displays information associated with a selected user and corresponding to the profile 110 of the user. The user interface 400 may display user ID 402. In some cases, the user ID may include a graphic 403, such as an image, artistic design, avatar, etc.

The user interface 400 also may include a friends status list 406. In one example, friends status list 406 may show the friends (or other online associates) associated with the particular user. In a more particular example, friends status list 406 may show which friends of the user are currently logged into the learning service (locally or online). In some embodiments, friend status list 406 may include a details selector that is configured to display a friends graphic user interface that presents detailed information about friends of the user.

User interface 400 may include a trophies pane 408 configured to display trophies that represent achievements the user has made in each of the plurality of learning application programs. In a more particular example, each of the displayed trophies may include a trophy graphic 409 and a description of the accomplished task associated with the trophy. In some embodiments, the trophies pane 408 may include a details selector that is configured to display a trophy graphic user interface that present detailed information about trophies earned by the user.

User interface 400 may include a learning level progress pane 410. In one example, learning level progress pane 410 may display a learning level for one or more selected skills of the user. In the depicted embodiment, a graphical and textual representation of the user's learning level for a plurality of skills, English and Math, are included. In some embodiments, learning level progress pane 410 may present learning level information of the user compared to other users. For example, a statistical comparison of the user to a group of users, or a head to head comparison of the user to one or more other users may be displayed.

User interface 400 may include an available games list 412 configured to display titles of appropriate learning application programs, which are depicted as The Golden Dragon, Word Drop, Navigator, and Story Creator in FIG. 4. The game titles may be selected by a user to purchase or execute the associated learning application program.

II. Profile

The interaction of the various components of the computerized learning system 100 with profile 110, as well as the organization of profile 110, is discussed in detail hereinafter. As discussed above, the application programming interface 108 is configured to receive user performance data 206 from a plurality of learning application programs 104 executed on a user client device 102 and store the user performance data in profile 110 of the user in non-volatile storage 132A, 132B accessible from the user client device 102. As shown in FIGS. 1 and 2, the learning service program 106 is configured to read user performance data 206 from profile 110 of the user, and process the user performance data 206 to determine an assessed user learning level for a skill. This assessment may be made by local assessment engine 150A of the local learning service program 112, or online assessment engine 150B of the online learning service program 114.

The application programming interface 108 further may be configured to send the assessed user learning level for the skill to a requesting learning application program. In turn, the requesting learning application program may be configured to adjust content based on the assessed user learning level. One manner in which the content may be adjusted, is by adjusting the difficulty of the challenge presented. In addition, the level of support 212 offered by the support system 214 may be adjusted, based on the user learning level, as discussed below.

As shown in FIG. 4, discussed above, the learning service program 106 may have a graphical user interface configured to display a representation of the data contained in the profile 110 of the user, the view including a graphical representation in learning level progress pane 410 of assessed user learning levels for one or more skills, the assessed user learning levels being computed based on user performance data 206 received by the learning service program 106 from a plurality of learning applications. The graphical user interface may be configured to display a statistical comparison of profile 110 of the user with profiles of other users on the graphical user interface, such as appears in the teacher administrator graphical user interface of FIG. 11, also described below. It will be appreciated that this sampling of statistical data is merely exemplary, and that other suitable organization of data collected from player activity may be added to the GUI.

Figure 5:
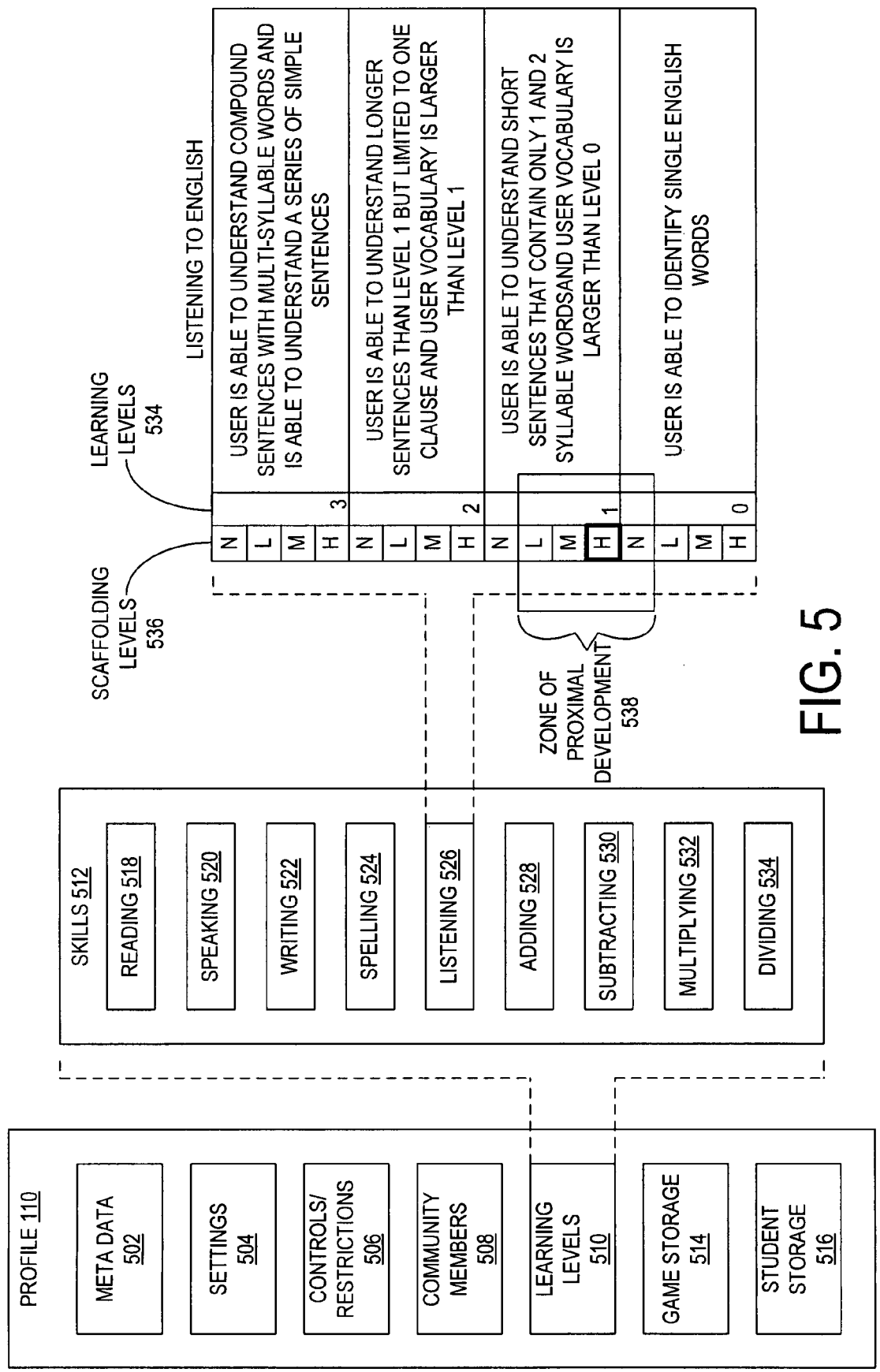
FIG. 5 shows a block diagram of an embodiment of a profile of a user.

Referring next to FIG. 5, data stored in profile 110 may be of a plurality of data types, including: (1) meta data 502 that defines user characteristics, (2) settings 504 to customize of profile 110 of the user, (3) controls and restrictions 506 for limiting various activities of the user associated with profile 110 of the user, (4) community member information 508, such as information on friends of the user, (5) learning level data 510 of the user, (6) game data 514 associated with activity in one or more learning application programs previously played by the user, and (7) student storage 516 for storing various media, such as sounds, images, etc., collected by the user. It will be appreciated that this organization is merely exemplary, and that other suitable categories may be added to achieve different features and functionalities. Each of these categories of data will be described in turn. These data types are illustrated in detail in the example embodiment of a profile schema shown below in Table 1.

TABLE 1

| PROFILE SCHEMA | |
|---|---|
| ELEMENT | CONTENT |
| 1. Meta data | |
| Learning client version | Int |
| Profile ID | Int (Offline\|Online) |
| Profile password | Encrypted |
| Parent ID | ID |
| Parent password | Encrypted |
| Synch date stamp | Int (Network or PC ID) |
| Synch PC ID | Int |
| Screen name | String |
| Primary language/locale | local ID |
| Secondary language/locale | local ID |
| Color | Int (Background color for user interface) |
| Picture | Jpeg |
| Games played | ID (array) (Number of times played, last played date) |
| Trophies earned/game ID | Trophy ID (array)/Game ID (array) |
| Earned trophy content | Image (standard jpeg), title, description (strings) |
| 2. Settings | |
| Pen/mouse/hardware device speed | Slow\|medium\|fast |

TABLE 1-continued

| PROFILE SCHEMA | |
|---|---|
| ELEMENT | CONTENT |
| Inversion | Normal\|inverted |
| Synch to PC | manual\|automatic |
| Synch to restricted network, Internet | manual\|automatic |
| 3. Controls/restrictions | |
| Community ID sharing | None\|Friends-only\|Restricted network\|Internet |
| Community content sharing | None\|Friends-only\|Restricted network\|Internet |
| Wireless content sharing | None\|Friends-only\|Restricted network |
| 5. Community members | |
| Friends | ID (array, 100–500) |
| Groups | ID (array, 2–5) |
| Group members per group ID | ID (array, 50–100) |
| 6. Learning Levels | Each level record contain 5 learning level records, to enable cross game validation of levels. |
| Reading English | level ID, game ID, date |
| Speaking English | level ID, game ID, date |
| Writing English | level ID, game ID, date |
| Spelling English | level ID, game ID, date |
| Listening to English | level ID, game ID, date |
| Adding | level ID, game ID, date |
| Subtracting | level ID, game ID, date |
| Multiplying | level ID, game ID, date |
| Dividing | level ID, game ID, date |
| <many others> | |
| 7. Games storage area | |
| Saved games | |
| Game specific settings | |
| 8. Student storage area | |
| Stories | Binary |
| Art | Binary |
| Pictures | Binary |

As shown above, profile meta data 502 may include elements such as an learning client system version element, a profile ID, a password, a parent ID, a synch date stamp, a network ID, a synch PC ID, a screen name, a primary language ID, a secondary language ID, a color, a picture, an application array, an achievement array, and an earned achievement content element. The learning client system version element may include a unique ID of the system detected during the most recent access of profile 110. This ensures that the client application is kept up to date relative to the server software. The profile ID may include a unique ID associated with the user of profile 110. The profile ID may be used to identify the user as online or offline. The password associated with profile 110 of the user may be an encrypted password received as user input during the inaugural use of profile 110.

The parent ID may be a unique ID associated with an approved parent of the user. An approved parent may be another user associated with the user, such as a parent, teacher administrator, or managing administrator, authorized to modify control elements of the profile 110. Further, an approved parent of the user may be authorized to modify a plurality of profiles. For example, a teacher may be authorized to modify profiles associated with students in a classroom of the teacher. The sync date stamp may be an element of profile meta data identifying the most recent communication sync between profile 110 on user client device 102, for example, and online learning service program 114. In addition, the sync date stamp may be associated with a network ID and/or user client device ID associated with the sync date stamp.

It will be appreciated that profile 110 may be associated with a particular client device. Further, profile 110 may be limited to syncing with a single user client device. For example, a user of profile 110 attempting to sync to a plurality of personal computers may be prompted to select association with one of the personal computers.

Profile meta data 502 may include a screen name. The primary and secondary language ID and/or the locale ID may associate profile 110 with a language and/or various other relevant data pertaining to the locale of the user based on user input. The locale ID typically refers to a geographic region in which the user resides. Profile 110 may be associated with a background color and a picture, such as a jpeg, enabling the user to customize aspects of the graphical user interface. The application array may include game IDs uploaded from game meta data, a number of times played, and a date associated with the last time the game was played. Further, the trophy array may include trophy IDs associated with the game IDs as the user completes the trophy. Each trophy ID may be associated with a title, and description.

Settings 504 associated with profile 110 may include elements such as a pen/mouse speed, an inversion element, a sync to PC element, and a sync to network element, although various other elements may be added. The pen/mouse speed element may include slow, medium, and fast settings. The inversion element may facilitate configuring learning application programs including a control system GUI, such as an airplane simulation GUI, to operate in an inverted mode, such that, for example, an airplane can be controlled to go up by pushing forward rather than backward on a joystick. The sync to PC and sync to network elements may facilitate one of a manual or automatic syncing option, based on a parameter such as a user preference, learning application specification, etc.

Controls and restrictions 506 associated with profile 110 may include elements such as a community ID sharing element, a community content sharing element, a wireless ID sharing element, and a wireless content sharing element. The community ID sharing element may be configured to allow other users to access a view of a shared portion of profile 110 of the user. In some embodiments, the community ID sharing element may be selected by an authorized parent of the user and/or an authorized administrator for a group of users. For example, the community ID sharing element may be set to restricting views of profile 110 of the user from other users. In addition, the sharing element may be set to restricting views of profile 110 from all users, unless otherwise authorized. In another example, access to views of profile 110 may be restricted to authorized friends of the user. In yet another example, other users in a restricted network may be authorized to access views of profile 110. The community content sharing element may be configured to allow users identified in the community ID sharing element to view particular elements in profile 110.

Community member information 508 associated with profile 110 may include elements such as a friends array, a group array, and a group members array. The friends array element may identify profiles associated with one or more friends of the user that may view profile 110 of the user. As such, profile IDs listed in the friends array element may be allowed to access views of profile 110 if the user enables such access via access controls in the graphical user interface. The listing of the community members also facilitates easy lookup and communication with them directly from the user profile. The group array element may identify groups to which the user belongs. In one example, an authorized parent and a user may be members of a group, and access may be restricted to network IDs corresponding to home and school networks of the parent and user. Learning service 106 may be provided with an API configured to manage users and groups, and present user interfaces by which the users and groups may interact.

As shown in Table 1 and illustrated in FIG. 5, profile 110 may define a plurality of skills 512 such as a reading 518, speaking 520, writing 522, spelling 524, listening 526, adding 528, subtracting 530, multiplying 532, and dividing 534. It will be appreciated that various other skills may be added to the profile schema as well, such as number sense, pattern recognition, recognition of aural phonemes, and many others. It will further be appreciated that a plurality of learning levels may be defined per skill. As depicted in this particular example, they are numbered 0-3, but may be any other suitable range of levels.

Each learning level element may include game play records for learning application programs 104 updated to profile 110. In one example, each learning level element may include a record for application-specific learning data for up to five recently used learning application programs. Further, each record associated with the learning application programs may include a level ID associated with the learning level element, a game ID uploaded to profile 110 from game meta data of application-specific game schema 172, for example, and a date associated with the most recent use of the learning application program of the record. Some learning level elements, such as reading, speaking, writing, spelling, and listening, may be grouped under a common language ID so that the skills can be tracked separately under each language.

Profile game data stored in game data 514 may include elements such as a games-saved element for continuing saved games and a game settings element for storing settings related to learning application programs used. Further, student storage 516 may include elements such as a story element, an art element, and a picture element or other personalization for storing media associated with learning application programs 104.

Figure 14:
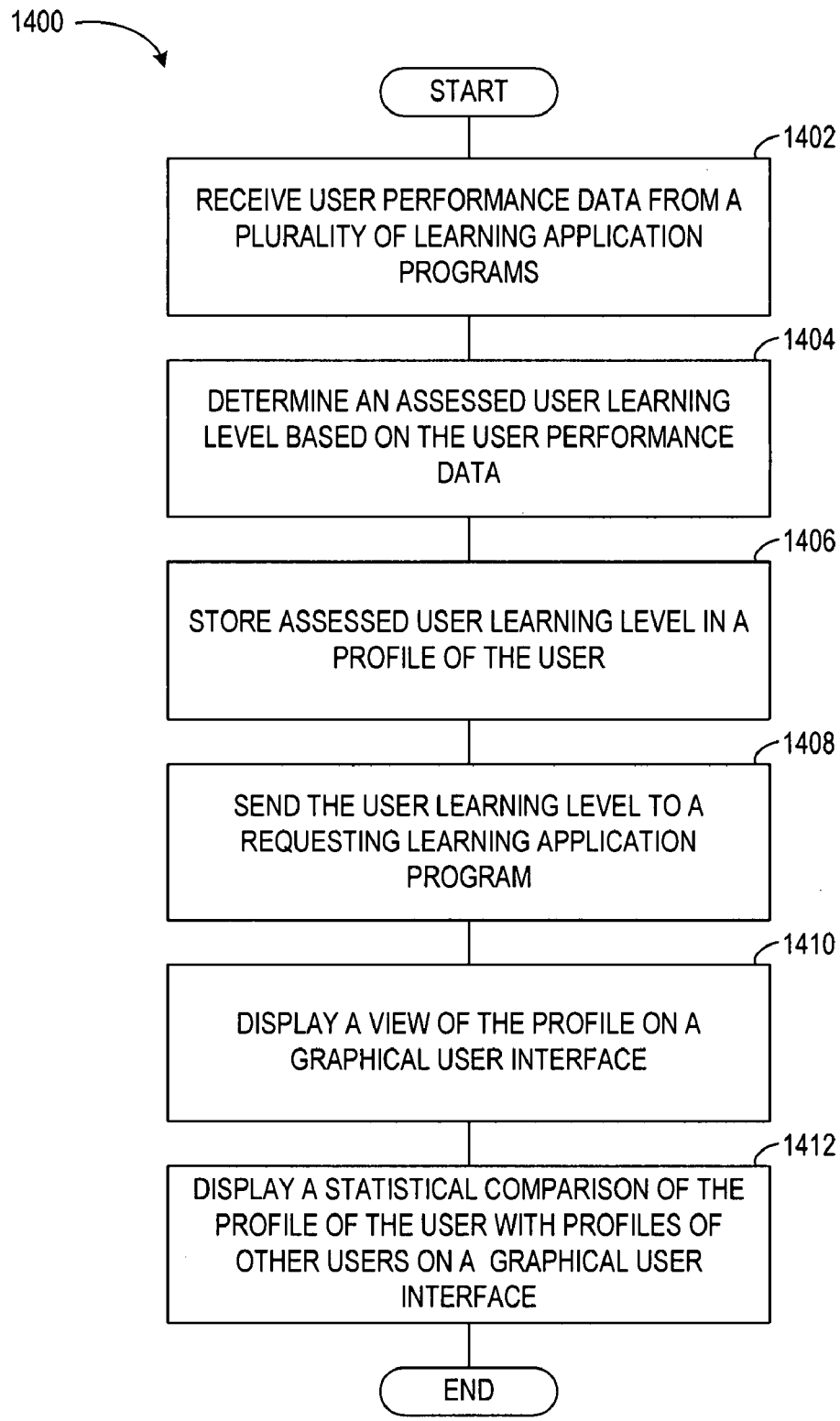
FIG. 14 shows a process flow of an embodiment of a method for collecting user performance data from a plurality of learning application programs and storing the user performance data in a profile of the user.

FIG. 14 illustrates a computerized learning method 1400 for utilizing a profile with a plurality of learning application programs. The method may include, at 1402, receiving user performance data for a unique user from a plurality of learning application programs executed on a user client device. At 1404, the method includes determining an assessed user learning level based on the user performance data. It will be appreciated that determining the assessed user learning level is an intra-game assessment that may be accomplished at least in part by a local learning service executed on the user client device 102. Alternatively, it may be an inter-game learning service assessment that is accomplished by a by local learning service program 112 or online learning service program 114 executed respectively on the client device or the online server system 116. The data in profile 110 may be organized according to a predefined schema.

At 1404, the method may include adjusting the content of the requesting learning application program, based on profile 110 of the user. The difficulty of the challenge or the type and degree of support offered may be adjusted, for example. At 1406, the method may include storing the assessed user learning level in profile 110 of the user. Profile 110 of the user may be organized according to a profile schema, and may be configured to store learning level data for each of a plurality of skills.

For example, the plurality of skills may include one or more language acquisition skills, and one of the language acquisition skills may include vocabulary mastery. In such a case, profile 110 of the user may be configured to store vocabulary words that have been demonstrated as known to the user. For each vocabulary word, a plurality of skills may apply. For example, different language acquisition skills may be defined to include reading, speaking, writing, spelling, and listening to each vocabulary word. In addition, other skills beyond language acquisition skills may be defined. For example, the plurality of skills may include a visual skill such as pattern recognition, an aural skill such as phoneme recognition, a mathematical skill, such as adding, subtracting, multiplying, or dividing, number sense, or virtually any other suitable learning skill.

It will be appreciated that profile 110 of the user may be configured to store one or more of profile meta data, user setting data, access control data, community member data, game data, and user storage data, described above. Further, as discussed above, profile 110 of the user may be stored at a location accessible by a local learning service on a user client device, such as at the data store 118 accessible to online learning service program 114. As described above a local copy of profile 110 of the user may be stored on a user client device or a peripheral thereof, and a remote copy of profile 110 of the user may be stored at an online learning service. The method may further include syncing the local copy and the remote copy of profile 110 of the user according to predetermined sync rules.

At 1408, the method includes sending the user learning level to a requesting learning application program. At 1410, the method may include displaying a view of profile 110 on a graphical user interface, such as user interface 400 described above. At 1412, the method may include displaying a statistical comparison of profile 110 of the user with profiles of other users on a graphical user interface, such as in parent and teacher administrator graphical user interfaces 1100, 1200 described below. For example, the statistical comparison may comparison include a comparison of a user or group of users with other users or groups of users who have played the same learning application programs, or who have played learning application programs that affect learning of similar types of skills.

III. Schematization and Instrumentation

As discussed above, the computerized learning system 100 may utilize schematization and instrumentation of learning application programs. Schematization refers to the process of defining a format for data that is exchanged between software components of the computerized learning system 100, such as among the learning service program, the application programming interface 108 and learning application program. Instrumentation refers to the process of providing a software component the ability to collect, store and retrieve schematized data, such as through an application programming interface 108.

The interaction of various components of computerized learning system 100 to achieve instrumentation and schematization will now be described. As discussed above, the computerized learning system 100 may include a plurality of learning profiles stored in non-volatile storage 132A, 132B, each profile being associated with a user. Further, each profile may include learning data organized according to a profile schema, where the learning data includes one or more skills. Further still, an assessed user learning level for each skill may be selected from among a plurality of possible learning levels. The computerized learning system 100 may further include learning service program 106 configured to receive requests from a plurality of learning application programs. As one example, the requests may be used to read and write learning data relating to the learning levels for each skill to and from each of the user profiles. The requests may be sent from the learning application program 104, via application programming interface 108, to be received by the learning service program 106. The computerized learning system 100 may include an arbitration engine 158A and 158B configured to determine if each of the read and write requests is authorized. This engine may compare the results submitted by a plurality of users who have played a multi-player learning application together. This comparison can be used to determine if any of the results submitted through the application programming interface have been tampered with. The local arbitration engine 158B may determine if read and write requests for the local copy of a profile are allowed, while arbitration engine 158A may determine if read and write requests for an online copy of the profile stored in data store 118 are allowed. Alternatively, all arbitration may be performed by an online arbitration engine and the local arbitration engine may be omitted.

Figure 6:
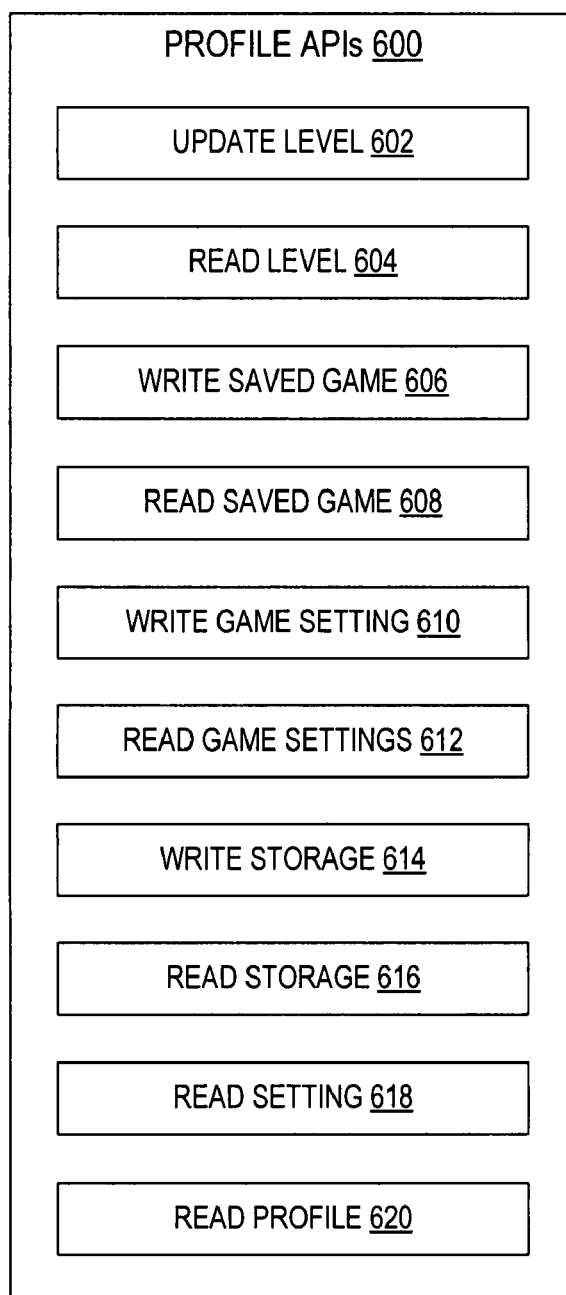
FIG. 6 shows a block diagram of an embodiment of an application programming interface that may be used with a learning service program of the computerized learning system.

FIG. 6 illustrates an example of a profile application programming interface set 600 of application programming interface 108, including an update level API 602 configured to update a learning level of a user profile in response to a write request from a learning application program, a read level API 604 configured to retrieve a value of a learning level from the profile in response to a read request from a learning application program, a write saved game API 606 configured to save current game data in a user profile in response to a request from a learning application program, a read saved game API 608 configured to retrieve saved game data from a user profile in response to a request from the learning application program, a write game setting API 610 configured to write a game specific setting in-response to a request from a learning application program, a read game setting API 612 configured to read a game specific setting from a user profile, a write storage API 614 configured to write data to a user storage area of a user profile, a read storage API 616, and a read setting API 618, and a read profile API 620, each configured to read data from the user storage area, setting area and profile ID of a user profile. This collection of APIs enables each of the plurality of learning application programs with sufficient instrumentation to read and write data to and from each of the plurality of user profiles. The following table summarizes one embodiment of the above discussed profile PI set 600 and lists parameters passed and return values.

TABLE 2

| PROFILE API SET | | |
| --- | --- | --- |
| API NAME | PARAMETERS | RETURN VALUES |
| UpdateSkillLevel | Profile ID, skill ID, skill level value, [game ID, date inferred] | |
| ReadSkillLevel | Profile ID, skill ID, locale [game ID inferred] | skill ID requested, array of skill level ints, date info (up to 10 per level ID), with level for that game ID called out |

TABLE 2-continued

PROFILE API SET

| API NAME | PARAMETERS | RETURN VALUES |
|---|---|---|
| WriteSavedGame | Profile ID, Binary [game ID, date inferred] | |
| ReadSavedGame | Profile ID [game ID] | Profile ID, Binary |
| WriteGameSetting | Profile ID, Setting ID, Setting value | |
| ReadGameSettings | Profile ID, Setting ID | Profile ID, Setting ID, Setting value |
| WriteStorage | Profile ID [game ID] | |
| ReadStorage | Profile ID [game ID] | Profile ID, Binary |
| ReadSetting | Profile ID, Setting ID | Profile ID, Setting ID, Setting value |
| ReadProfile | Profile ID, name, color, picture, languages/locales | Profile ID, values per profile type |

Another element in the schematization of the data exchanged in computerized learning system 100, is application-specific game schema 172, which is used to organize data related to a specific learning application program. Application-game specific game schema 172 may organize information related to a specific learning application program into game meta data, which identifies characteristics about the learning application program, game learning data, which identifies various skills that the user is recommended to possess for the application or may acquire through playing the game, and game trophy data, which defines milestone accomplishments for which trophies are awarded in the learning application program.

Game meta data may be organized into elements such as a game ID, a game title, a minimum and/or maximum number of players for the game, and online play capabilities of the application. Game learning data may be organized into elements such as application-specific target skills and skill levels where the target skill element may be assigned a skill ID. As such, applications may be targeted to users exhibiting a range of skill levels in one or more skills associated with a learning application program. Game trophy data may organized into elements such as an achievement ID, an achievement name, an achievement description, capability to display an achievement (achievements that may be displayed may be assigned a description such that the user may learn how the achievement may be earned), a point value for each achievement, and an image for each achievement. One example embodiment of an application-specific game schema is shown in Table 3 below.

TABLE 3

APPLICATION-SPECIFIC GAME SCHEMA

| ELEMENT | CONTENT |
|---|---|
| 1. Meta data | |
| Game ID | int |
| Game title | string(s) |
| Number of players | int (min), int (max) |
| Online play? | Yes\|No |
| 2. Learning data | |
| Target skill(s) | Skill ID numbers |
| Skill range(s) | Array of Skill ID, SkillLevel values [int (min), int (max)] |
| 3. Trophies | |
| Achievement ID | int |
| Achievement name | String |
| Achievement description | String |

TABLE 3-continued

APPLICATION-SPECIFIC GAME SCHEMA

| ELEMENT | CONTENT |
|---|---|
| Hidden? | Yes\|No |
| Achievement unearned description | String |
| Points | int |
| Image | PNG file |

Returning to FIG. 5, as discussed above, profile learning level data 510 of profile 110 is configured to store a learning level 534 for each of a plurality of skills. In the depicted embodiment, there are four learning levels, labeled 0-3, for each skill. A textual explanation of the difference between learning levels for the illustrated skill, listening to English is illustrated in FIG. 5.

It will be appreciated that the skills 512 may include virtually any skill suitable to schematization, including general mastery of vocabulary words, and the learning service program may be configured to receive requests to read a set of vocabulary words for a user, and write newly mastered vocabulary words to the user profile, in response to requests from learning application programs. In the depicted embodiment, the profile is configured to store a learning level for each of reading 518, speaking 520, writing 522, spelling 524 and listening 526, for each of a plurality of words in a target language. This enables, for example, the content of a challenge or support presented to a user to be modified based not only on a user's general mastery of a vocabulary word, but on the user's relative learning levels for different skills associated with that vocabulary word. It will also be appreciated that mathematical skills, such as adding 528, subtracting 530, multiplying 532, and dividing 534, may also be included within skills 512.

Figure 15:
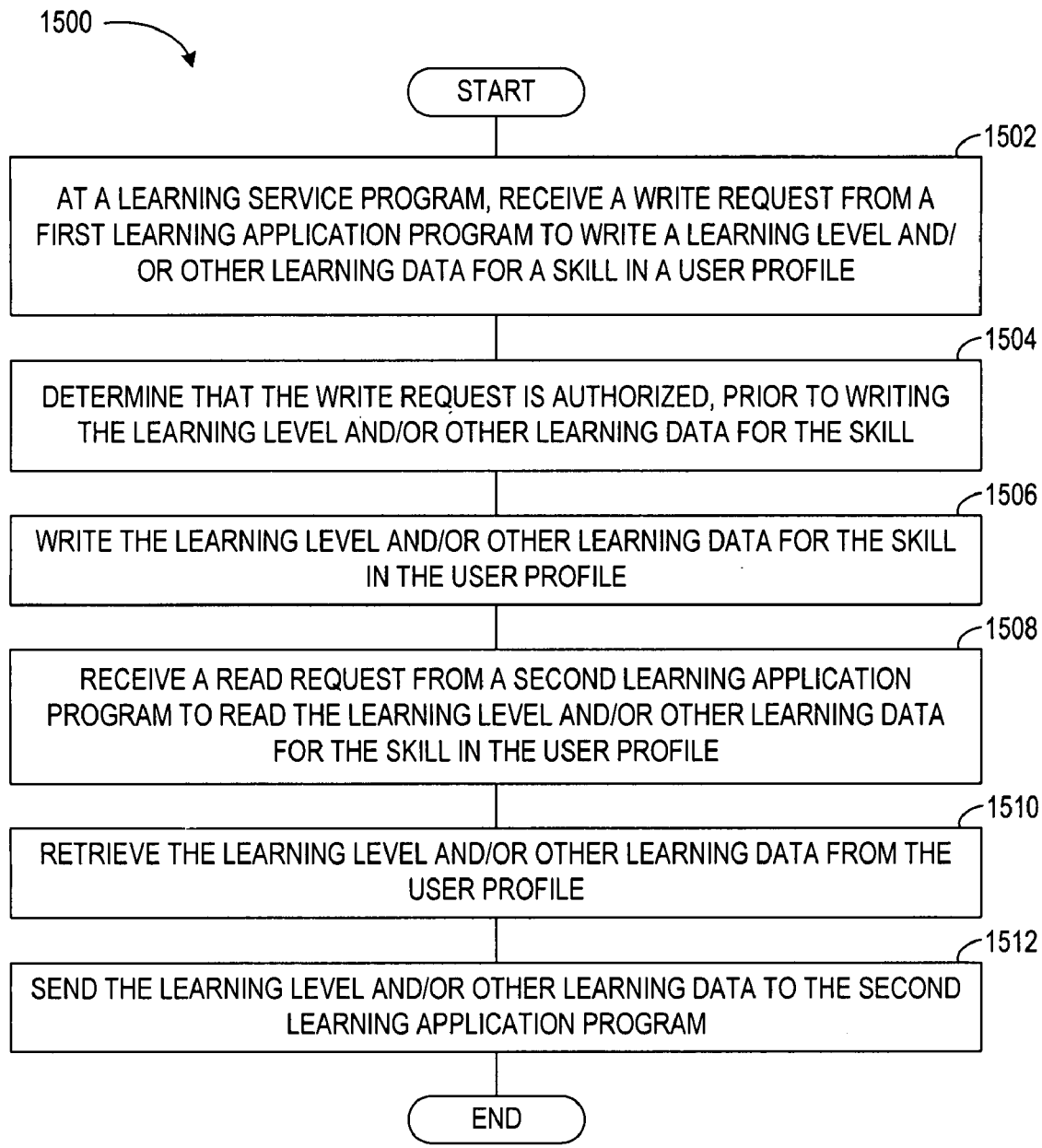
FIG. 15 shows a process flow of an embodiment of a method of utilizing schematized learning levels across a plurality of learning application programs.

FIG. 15 illustrates a computerized learning method 1500 utilizing schematized learning levels. As shown at 1502, the method may include, at learning service program 106, receiving a write request from a first learning application program to write a learning level and/or other learning data for a skill in a user profile. As discussed above, the user profile includes a plurality of skills and learning levels for each skill that is defined according to a profile schema. At 1504, the method may include determining that the write request is authorized, prior to writing the learning level and/or other learning data for the skill. At 1506, the method may include writing the learning level and/or other learning data for the skill in the user profile, and at 1508, receiving a read request from a second learning application program to read the learning level and/or other learning data for the skill in the user profile. At 1510, the method may include retrieving the learning level and/or other learning data from the user profile, and at 1512, sending the learning level and/or other learning data to the second learning application program. The read request and the write request may be received via profile application programming interface set 600 discussed above. Further, as discussed above, the skill may be mastery of vocabulary word in a target language, and the learning services program may be configured to send to a learning application program skill and learning level data from a user profile in response to a read request, which indicates a set of vocabulary words known to a user.

Figure 16:
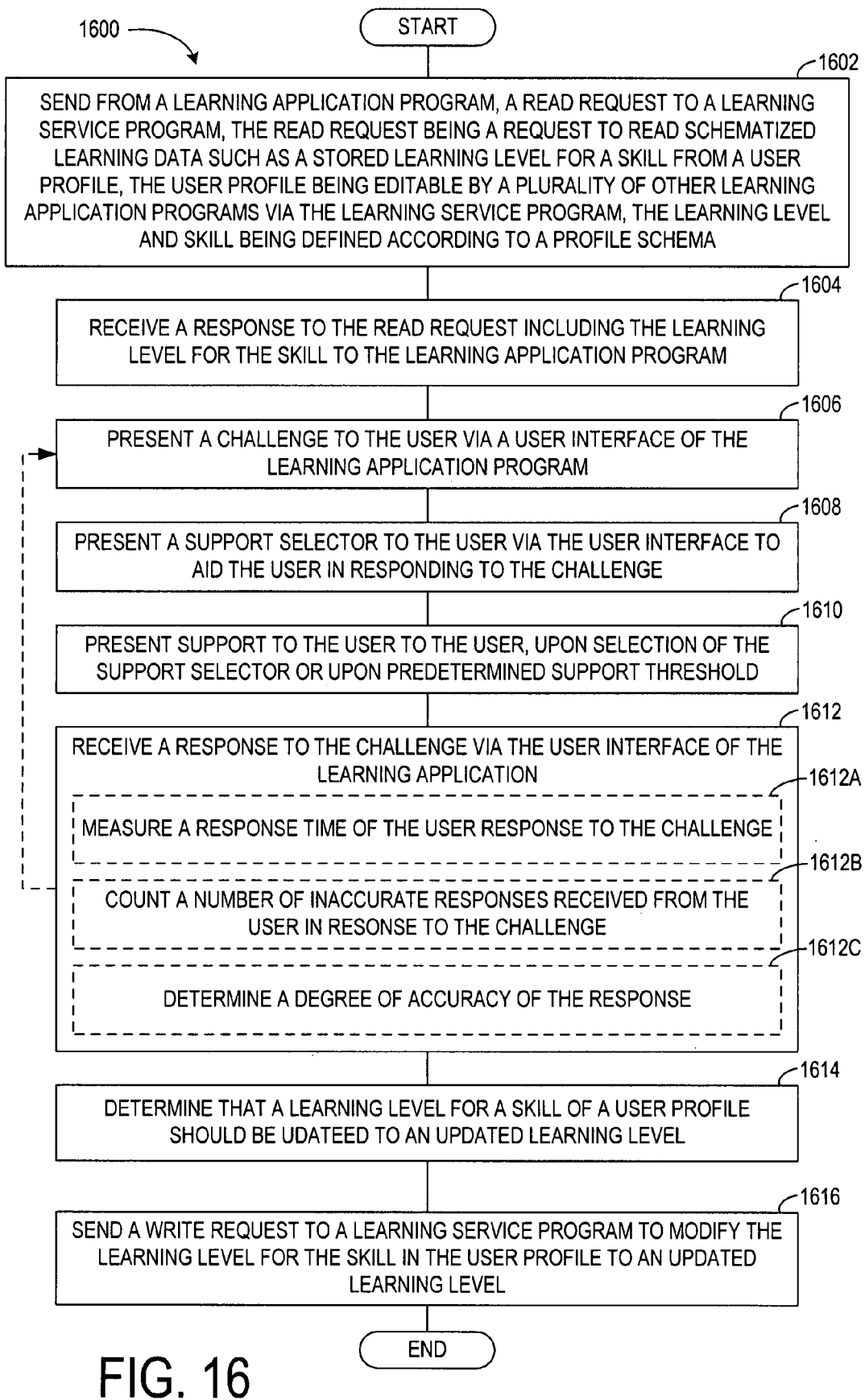
FIG. 16 shows a process flow of another embodiment of a method of utilizing schematized learning levels.

FIG. 16 illustrates another embodiment of a computerized learning method 1600 utilizing schematized learning levels. The method includes, as shown at 1602 at a learning application program, sending a read request to learning service program 106, the read request being a request to read a stored learning level for a skill from a user profile, the user profile being editable by a plurality of other learning application programs via the learning service program, the learning level and skill being defined according to a profile schema, as discussed above. At 1604, the method may include receiving a response to the read request including the learning level for the skill to the learning application program. At 1606, the method may include, presenting a challenge to the user via a user interface of the learning application program.

Figure 7:
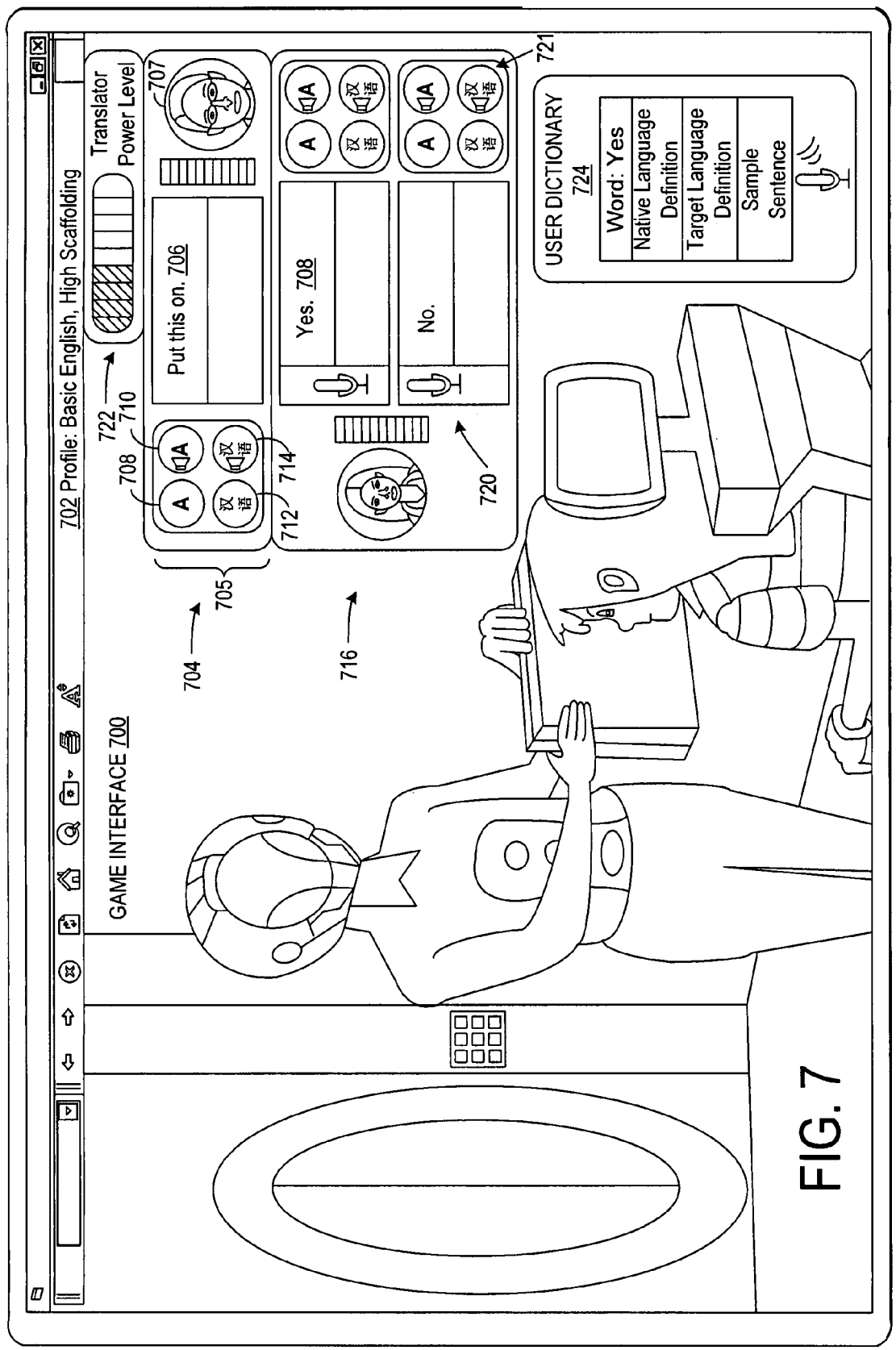
FIG. 7 shows an embodiment of a graphical user interface that may be generated by a learning application program depicting game play.
Figure 8:
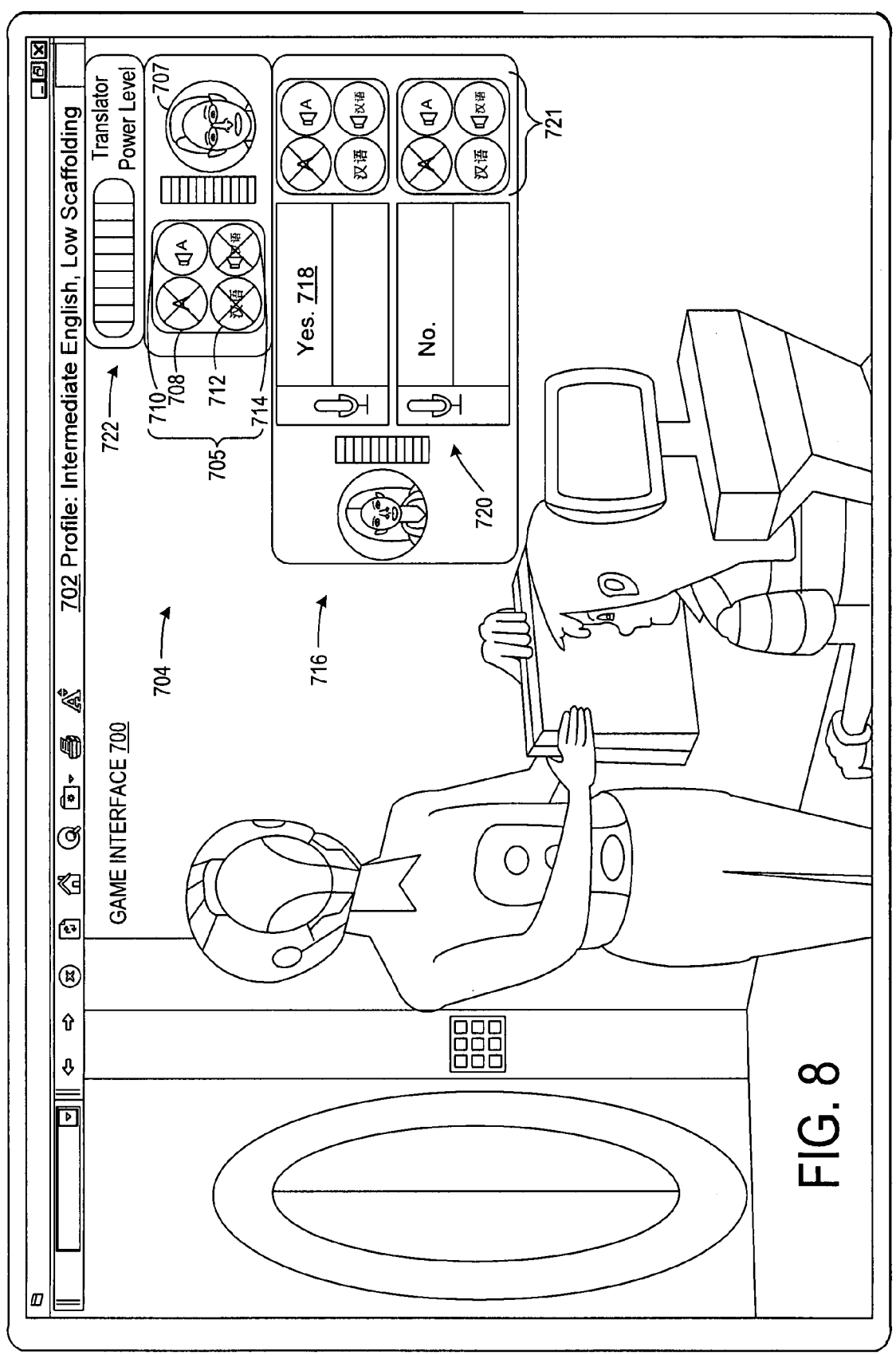
FIG. 8 shows another embodiment of a graphical user interface that may be generated by a learning application program depicting game play.
Figure 9:
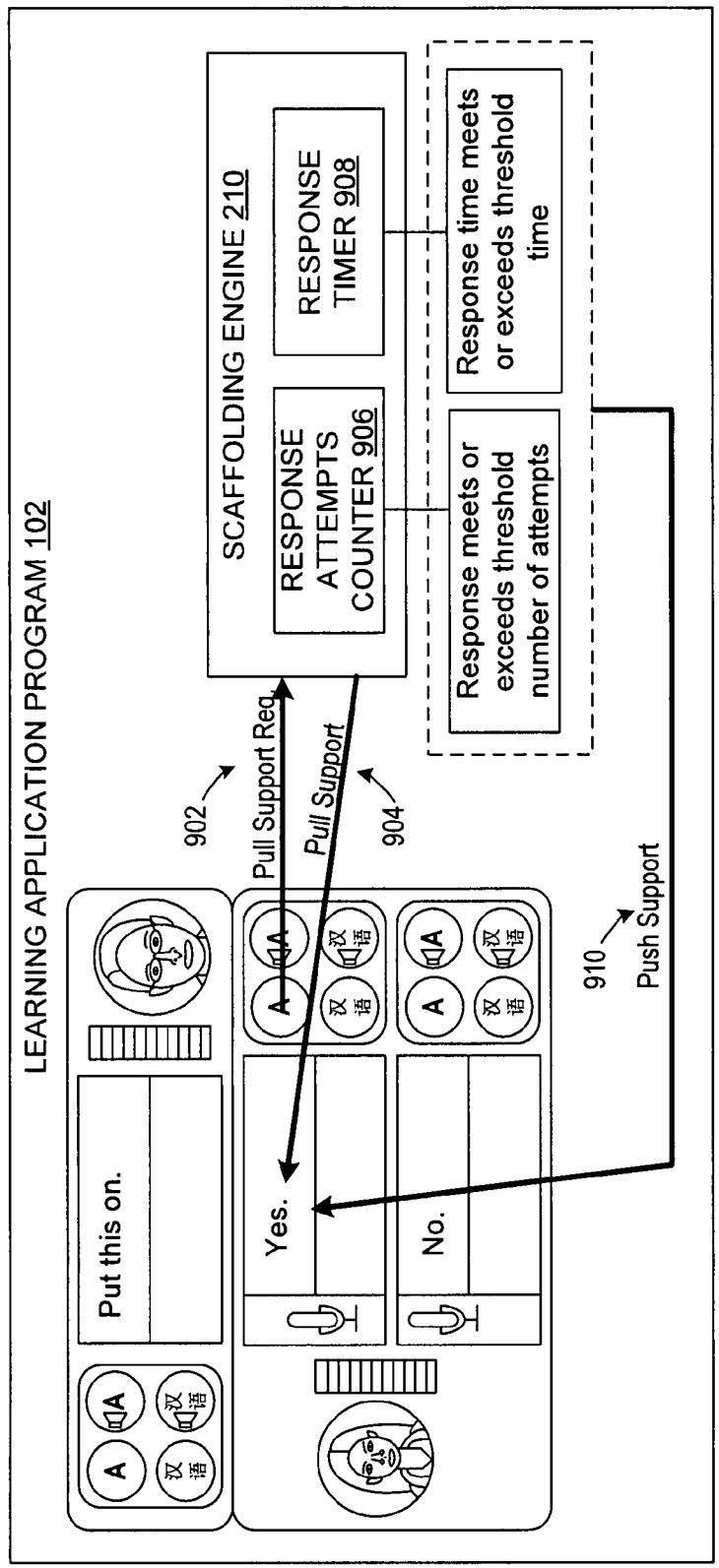
FIG. 9 shows a schematic depiction of an embodiment of a scaffolding support system including push and pull support.

At 1608, the method may include presenting a support selector to the user via the user interface to aid the user in responding to the challenge, wherein the user performance data includes support history data indicating use of the support selector by the user. Examples of support selectors are illustrated in FIGS. 7-9 and discussed in detail below. The support selector may be configured to enable a user to select support in a plurality of support categories, each support category corresponding to a skill defined in the profile schema. For example, for learning application programs relating to language acquisition, the support selector may be configured to enable a user to select support in written form, in spoken form, in a first language of the user, and in a target language of the user. A support selector for learning application programs relating mathematical skill acquisition may include different options, for example. According to another example, the support selector may be a challenge support selector configured to enable the user to select support to understand the challenge presented to the user. In another example, the support selector may be a response support selector configured to enable the user to select support to respond to the challenge.

At 1610, the method 1600 may further include presenting support to the user, either in response to a user request for support (pull support) or upon reaching a predetermine support threshold (push support), as described below. The presentation of support to the user may be recorded as user performance data, may form the part of the basis for the determination of learning level for a skill. For example, users who request help often may be deemed not to be prepared to advance a learning level, while users who seldom are presented with help may be candidates for advancement.

At 1612, the method 1600 may further include receiving a response to the challenge via the user interface of the learning application, the user performance data being based on the response to the challenge. For example, the method at 1612A may include measuring a response time of the user response to the challenge, the user performance data further including the response time. At 1612B, the method may include counting a number of inaccurate responses received from the user in response to the challenge, the user performance data including the number of inaccurate responses. At 1612C, the method may include determining a degree of accuracy of the response, and the response data may include the degree of accuracy of the response.

According to one example, the method may include receiving a spoken response from the user via a microphone and determining a degree of accuracy of the spoken response. Thus, the response data may include the degree of accuracy of the spoken response, and the skill may be spoken language ability in a target language. The method may further include determining via a game-based learning assessment module (not shown) that the stored learning level for the skill should be updated to an updated learning level, based at least in part on the degree of accuracy of the spoken response.

According to another example, the method may include receiving a written response from the user via the user interface and determining a degree of accuracy of the written response. Thus, it will be appreciated that the response data may include the degree of accuracy of the written response, and the skill may be written language ability in a target language. Further, the method may include determining via a game-based learning assessment module that the stored learning level for the skill should be updated to an updated learning level and may be based at least in part on the degree of accuracy of the written response.

At 1614, the method may include determining that a learning level for a skill of a user profile should be updated to an updated learning level, based on user performance data from the learning application program and predetermined learning assessment rules. It will be appreciated that this determination may be based on a plurality of user responses to challenges. Thus, as indicated by a dashed line between steps 1612 and 1606, the method may iteratively present a plurality of challenges to the user prior to making the determination at 1614. For example, the user may be presented with a challenge set containing a predetermined number of challenges which are successively presented to the user, and the determination at 1614 may be based on the plurality of responses received for the challenge set.

At 1616, the method may include sending a write request to learning service program 106, to modify the learning level for the skill in the user profile to an updated learning level.

IV. Scaffolding

The interaction of various components of computerized learning system 100 to achieve a scaffolding support system is described in detail below. As described above with reference to FIGS. 1 and 2, computerized learning system 100 includes learning application programs 104 executable on a client computing device 102. The learning application program may further include a user interface configured to present a challenge to a user and receive a user response to the challenge. The user interface may include a support system 214 configured to present support to aid the user in responding to a challenge. The learning application program may further include a scaffolding engine 210 configured to determine a scaffolding level of the user for a skill, and adjust the support 212 provided for the skill via the support system 214 based on the scaffolding level.

The scaffolding level for the skill may be stored in a user profile, for example, in non-volatile memory accessible to the learning application program via application programming interface 108. The support system 214 may be configured with a pull support option in which the support system 214 presents support in response a user request for support via a support selector on the user interface. The support system 214 may be configured with a push support option in which the support system 214 presents support in response to a measured response parameter. Push and pull support are illustrated in greater detail in FIGS. 7 and 8.

Referring now to FIG. 5, the scaffolding engine may assign a scaffolding level to the user that is selected from a plurality of scaffolding levels 536 that correspond to the user's learning level. As one specific example, each learning level may have an associated scaffolding level selected from the group consisting of none N, low L, medium M, and high H. In the illustrated embodiment, the user has a scaffolding level of high (H), and a learning level of 1. It will also be noted that the learning levels 0-3 may have names associated with them, such as beginner, basic, intermediate and advanced, with level 0 being basic.

Furthermore, the support system 214 may be configured to tailor the amount of push and pull support offered to a user based on the user's scaffolding level for a skill, with the most push and pull support being offered at the high scaffolding level, some push support and full pull support being offered at the medium scaffolding level, no push support and some pull support offered at the low scaffolding level, and no push or pull support being offered when scaffolding is turned off. Thus, it will be appreciated that not only the challenge itself may be tailored to the user's learning level, but also the support for the challenge may be scaled to the user's scaffolding level for a particular skill.

The measured response parameter on which the support system 214 delivers push support may be selected from a group consisting of response time, number of incorrect responses (response attempts), accuracy level of response, and score. A predetermined threshold for each type of measured response parameter may be set, beyond which push support is presented to the user. As one example, the skill may include listening and the support 212 may include audio. As another example, the skill may include reading and the support may include text. In yet another example, push support may be presented to a user with a lowest score among a group of users, or to a user whose score is below a predetermined threshold. Further, the support 212 may be provided in a native language of the user in one of spoken or written form. The support 212 may also be provided in a target language of study in one of spoken or written form. Further, the support system 214 may be configured to assign a cost to the use of support, the cost being used by the support system 214 in evaluating whether to decrease the scaffolding level of the user. The cost of support in the target language may be lower than the cost of support in the native language, for example. The support system 214 may be configured to display the support 212 in variety of output formats, such as text, audio, animation, video, haptic pressure, etc., which output may be attributable to a non-player character in the learning application program. Further, the support system 214 may be configured to display the support 212 as one or more user response options in one or more input format, such as text input through a keyboard, audio input through a microphone, handwriting or input through a stylus, mouse clicks, gestures captured by a camera, etc.

The learning application program may be configured to perform an intra-game assessment and determine that the user has attained a user scaffolding level. The intra-game assessment may be based on the use of support by the user in responding to one or more challenges. Typically, the intra-game assessment is based on a cumulative pattern of use of support by the user as compared to the use of support by other users. The learning application program may be further configured to sending a write request to update the profile of the user upon assessing that a user has attained a new scaffolding level. The learning application program may assess that a user has attained a new scaffolding level when the pattern of use of support for the user corresponds to that of other users at the new scaffolding level. By continuously performing intra-game assessments, the user's scaffolding level may be adjusted in order to stretch the user's learning ability. In this way, support offered to the user is decreased and the rate of learning may be increased.

Furthermore, the learning application program may be configured to assign a zone of proximal development as indicated at 538 to the user, based on the users assessed learning level and scaffolding level for a skill. The zone of proximal development as indicated at 538 may be used to measure the approximate range of a user's current learning ability, and may be used to adjust the content of the support or challenge presented by the learning application program, with the goal of presenting content and support that is at the top of, but still within, the user's ability to comprehend and learn. For example, language application program 104 may be configured to determine whether a unit of game content such as challenge or support content is within the zone of proximal development, and if it is not, then to refrain from presenting the content to the user. In another example, the learning application program may be configured to determine that a unit of content such as challenge or support content is above the user's current assessed and recorded learning level but within the user's zone of proximal development, and may determine to present the content to the user in such a case, to encourage growth of the user's learning level and test if the user is approaching a new scaffolding level or learning level.

Further, the zone of proximal development may be considered when adjusting a scaffolding level or a learning level of the user. For example, if the zone of proximal development indicates that a user's learning ability extends into a new scaffolding level or learning level, at least one of the learning application program and the learning service program may initiate formal assessment, review of scaffolding usage data, and arbitration to request a change at least one of the scaffolding level and the learning level. Further, if the review of scaffolding usage data indicates that a user's scaffolding level or learning level is above a threshold level the user's level may be updated and the zone of proximal development may be adjusted accordingly.

In some embodiments, the support system 214 may be configured to display a user-accessible dictionary including each of a plurality of words presented in the challenge. The dictionary is typically a service-level application, and is a component of learning service program 106. As one example, the dictionary may include information selected from a group consisting of a definition of the word in the target language and the native language of the user, a media that illustrates the word, a sample sentence using the word in context, an audio file of the word being spoken, and a pronunciation detector configured to receive and evaluate a user pronunciation of the word.

According to another embodiment, the support system 214 of the learning application program may be configured to present, via a user interface of the learning application program, a selected one of a plurality of levels of support. The selected level of support may be chosen based on a scaffolding level of the user. The scaffolding level of the user may be read from a user profile stored in memory and updatable upon determining that user performance in a learning application program meets or exceeds a predetermined threshold for scaffolding level advancement.

Figure 17:
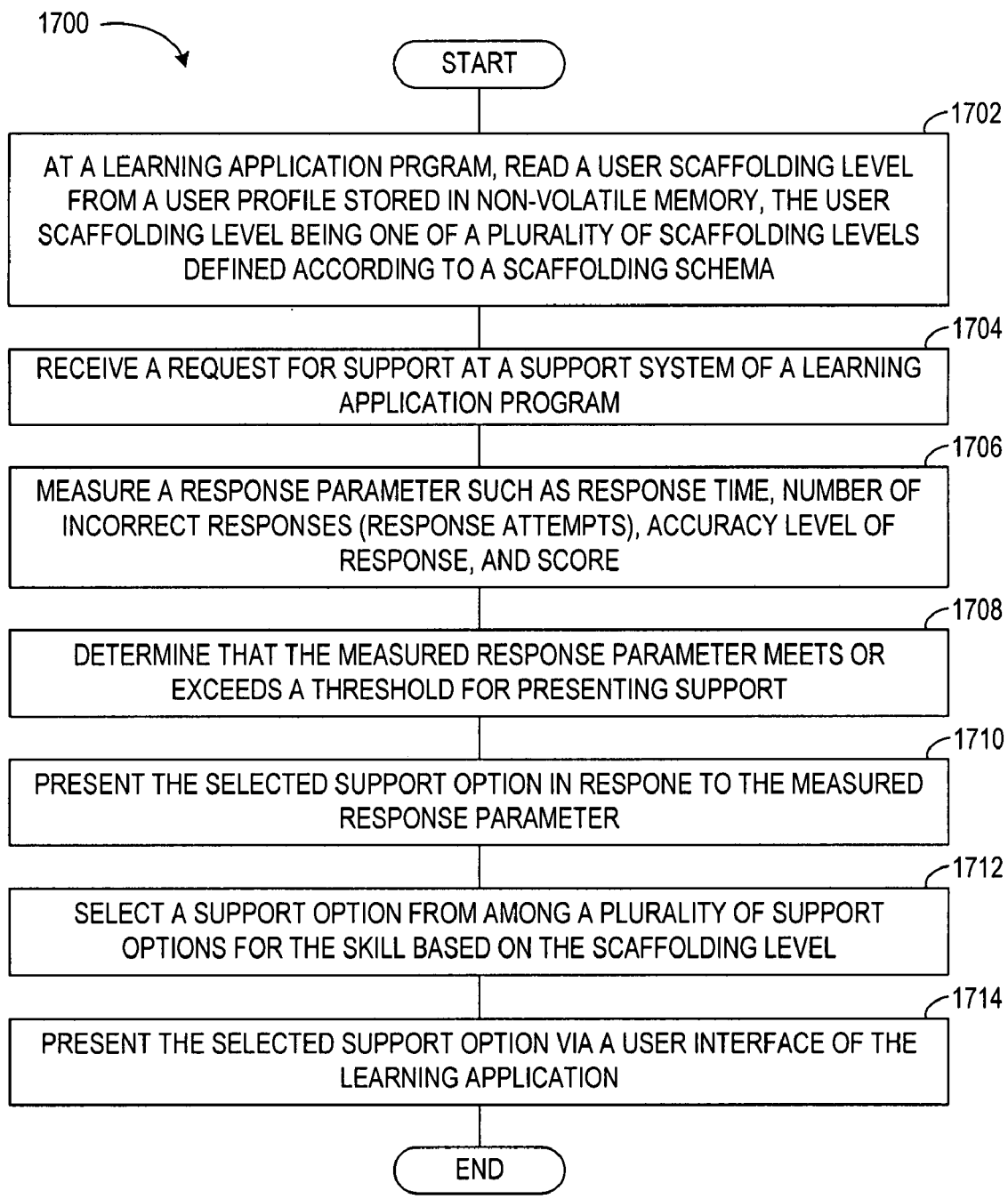
FIG. 17 shows a process flow of an embodiment of a method for of providing support to a user for responding to a challenge.

FIG. 17 illustrates a computerized learning method 1700 according to which scaffolding support may be provided. As illustrated at 1702, the method may include, at a learning application program, reading a user scaffolding level from a user profile stored in non-volatile memory. The user scaffolding level may include one of a plurality of scaffolding levels defined according to a scaffolding schema. At 1704, the method may include receiving a request for support at a support system of a learning application program. At 1706, the method may include, measuring a response parameter selected from at least one of response time, number of number of incorrect responses (response attempts), accuracy level of response, and score. At 1708, the method may include determining whether the measured response parameter meets or exceeds a predetermined threshold for presenting support. At 1710, if the threshold is exceeded, the method may include presenting the selected support option in response to the measured response parameter. At 1712, the method may include selecting a support option from among a plurality of support options for the skill based on the scaffolding level. Example support options that may be selected based on a detected scaffolding level are given below with reference to FIGS. 7 and 8. At 1714, the method may include presenting the selected support option via a user interface of the learning application program.

FIG. 7 depicts an embodiment of a user interface generated by a learning application program executable on a computing device, for example as described herein with reference to FIGS. 1 and 2. The user interface may also be referred to as a "game interface" herein below where the user interface presents different levels of a learning game. Game interface 700 may be configured to present a challenge to a user and receive a user response to the challenge. The challenge may be presented based on the user's learning level for the skill or set of skills. A user's learning level may be indicated by a profile status bar 702, for example. Profile status bar 702 may display a user's current learning level for a skill or set of skills that apply to the particular learning application program. Additionally (or optionally), profile status bar 702 may display a user's scaffolding level.

Game interface 700 may include challenge module 704 that may present a challenge to the user. Challenge module 704 may include a challenge display pane 706 for displaying the challenge in written form in at least one of the user's native language (e.g. Chinese) and the target language of study (e.g. English). In some cases, when a challenge is presented by a non-playable character, a portrait 707 of the character may be included adjacent challenge display pane 706 so that the user may identify who is providing the challenge.

As described above, the learning application program may include a support system 214 that can provide support to the user to respond to the challenge based on the user's scaffolding level. The support system 214 may be configured with a pull support option in which the support system 214 presents support in response to a user request for support, and a push support option in which the support system 214 presents support in response to a measured response parameter.

Furthermore, both push and pull support may be selectively available based on a user's scaffolding level. In at least one embodiment, the scaffolding levels may be selected from a group consisting of none, low, medium, and high. Accordingly, the support system 214 may be configured to enable both the push support option and the pull support option upon detecting that a user scaffolding level for a skill is high; disable some push support options and enable all pull support options upon detecting that a user scaffolding level for a skill is medium; disable all push support options and enable some pull support options upon detecting that a user scaffolding level for a skill is low; and disable both the pull support option and the pull support option upon detecting that a user scaffolding level for a skill is none.

In some embodiments, the learning application program may be configured to display various types of visual or audio support based on the user's scaffolding level. For example, a user with a high scaffolding level in Basic English may receive both written and spoken support, whereas a user with a low scaffolding level may receive only spoken support. In the illustrated embodiment, the user has a high scaffolding level so both visual and audio support may be provided.

Continuing with FIG. 7, the pull support option may be provided as one or more support selectors on the user interface. Challenge module 704 may include pull support selectors 705 to aid the user in providing a response to the challenge. In some cases, support may be provided in a native language of the user in one of spoken or written form. In some cases, support may be provided in a target area of study (e.g. English) in one of spoken or written form. Specifically, challenge module may include pull support selectors 705 such as target language written support selector 708, target language spoken support selector 710, native language written support selector 712, and native language spoken support selector 714. Responsive to a user selection, target language written support selector 708 may display the challenge in a written form of the target language in display pane 706. Responsive to a user selection, target language spoken support selector 708 may play an audio recording of the challenge spoken in the target language. The audio recording may be played from a speaker of the user client device 102. Responsive to a user selection, native language written support selector 712 may display the challenge in a written form of the native language in display pane 706. Responsive to a user selection, target language spoken support selector 714 may play an audio recording of the challenge spoken in the target language. It will be appreciated that selectors 705 are challenge support selectors since they are configured to provide support to help the user understand the challenge.

Game interface 700 may further include response module 716 configured to enable the user to respond to the challenge. Response module 716 may include a written response pane configured to display a user's written response and may also include spoken response selector 720. Response selector 720 may be selected to activate an audio recording device to capture a user's spoken response. In some examples, depending on the particular challenge, a user's response may be only written or only spoken. In such cases, the learning application program may adjust the appearance of the response module to only present the associated response mechanism (i.e. written response pane or spoken response selector).

The support system 214 may be configured to display support as user response options in text or audio. Accordingly, the response module may include response support selectors 721 configured to provide pull support to the user, similar to the support selectors of the challenge module. In particular, the response support selectors 721 may provide target language written support, target language spoken support, native language written support, and native language spoken support. In some examples, a challenge may include multiple responses that may be presented in the response module, for example, responding "yes" or "no". In such cases, the response module may include support selectors that correspond to each of the respective responses, similar to challenge selectors, described above. For this reason, the response support selectors will not be described in detail.

In some embodiments, the support system 214 may be configured to assign a cost to the use of support. The cost may be used by the support system 214 in evaluating whether to decrease (or increase) the scaffolding level of the user. The cost may be based on, for example, response time, number of response attempts, requests for support, etc. Thus, cost meter 722 may display the current number of support requests that a user may have remaining in order to demonstrate mastery of the challenge and to indicate to the user the norms for support requests at his/her level of scaffolding. In addition, cost meter 722 may change its appearance each time the user requests support so that the user may have an indication of the number of support requests remaining. For example, the cost meter may change color or eliminate a bar of the meter each time a request for support is made. In addition to a visual cost meter, it will be appreciated that the cost of support may be implemented in another suitable manner, for example, by a score handicap according to which a user is awarded fewer points for completion of a challenge using support.

In some embodiments, the cost of support may be different based on the type of support. For example, the cost of support presented in the native language may be higher than the cost of support in the target language. Further, in some embodiments, the cost of support may be eliminated or reduce based on a user's scaffolding level. For example, a user with a high scaffolding level (a user who needs more help) may not have a cost for support.

In some examples, the support system 214 may be configured to display a user-accessible dictionary 724. For each of a plurality of words presented to the user in a challenge, the dictionary may include information selected from a group consisting of a definition of the word in the target language and the native language of the user; a media that illustrates the word; a sample sentence using the word in context; an audio file of the word being spoken; and a pronunciation detector. The pronunciation detector may be configured to receive and evaluate a user pronunciation of the word. In some embodiments, the dictionary may be selectively available based on at least one of scaffolding level and learning level.

FIG. 8 shows another example depiction of game interface 700 configured for use by a user with a low scaffolding level. In this example, since the user has low scaffolding, less pull support is available for selection by the user, as indicated by the crossed out pull support selectors, which are not available for selection. With respect to challenge support provided in challenge module 704, target language written support selector 708, native language written support selector 712, and target language spoken support selector 714 are not available for selection. Additionally, among response support selectors 721, the target language written support corresponding to the response is not available. Since the user has a lower scaffolding level the support 212 is adjusted to expand the learning ability of the user. Further, it should be appreciated that various types of pull and push support may be not available based on a user's learning level, in addition to or in the alternative to the user's scaffolding level. For example, some pull and push support may be available to beginning or basic learning levels, but not to intermediate or high learning levels. In the illustrated example, the use has an intermediate English learning level, and some of the pull support may be unavailable to the user based on the user's learning level.

FIG. 9 schematically illustrates an example of a support system 214 in a user interface of learning application program 104 providing push and pull support to a user as described above. In one example, a user may make a request for pull support as indicated at 902 in the response module by selecting the target language written support selector. Scaffolding engine 210 may receive the request for pull support and may send target language written support for display, as shown at 904. Accordingly, the user's selected response may be displayed in the response pane written in the target language. In another example, scaffolding engine 210 may measure various response parameters which may be used to present push support. To accomplish this, scaffolding engine 210 may include response attempts counter 906 and response timer 908. Response attempts counter 906 may further record the number of incorrect responses the user may enter into the response module. Over time, and after many challenge response encounters are counted, the recorded number of attempts further may be compared to a threshold number. If the number of attempts recorded by the counter meets or exceeds the threshold number, the scaffolding engine may initiate push support 910, since the user's high number of help requests indicates that more help is needed. Response timer 908 may record the elapsed time since presentation of the challenge before the user responds correctly. The elapsed response time further may be compared to a threshold time. Over time, and after many challenge response encounters are counted, if the elapsed response time meets or exceeds the threshold time, the scaffolding engine may initiate push support 910.

In this example push support is supplied as target language written support displayed in the response module, however, push support may include other written or spoken support. Further, in some cases, push support may be presented by non-player characters to aid the user in responding to the challenge.

The following table illustrates one specific set of scaffolding rules that may be used to deliver push and pull support based on user scaffolding levels in the user interface of FIGS. 7-9.

TABLE 4

PUSH AND PULL SUPPORT BASED ON SCAFFOLDING LEVELS

| Scaffolding Level | Push Support | Pull Support |
|---|---|---|
| HIGH | No cost to user for use of push or pull support. All support is push support based on the delay time in user response. Target language subtitles appear automatically when spoken audio plays, and remain on screen until the user has made a successful choice. After predetermined delay with no successful response, the audio is repeated at a slower speed. If the user still has not made a choice, native language subtitles | |

TABLE 4-continued

PUSH AND PULL SUPPORT BASED ON SCAFFOLDING LEVELS

| Scaffolding Level | Push Support | Pull Support |
|---|---|---|
| | appear after a first predetermined threshold of time, such as 20 seconds, (below the target language subtitles). After a second predetermined threshold of time, such as an additional 20 seconds, the native language text is read aloud. At that point, the UI takes the form of the "medium" scaffolding case, with the scaffolding buttons appearing within the field of the target subtitles. The native language subtitles disappear unless they are called back up again. If a user clicks a choice button while automatic scaffolding is in process, the auto scaffolding stops. However, if the user fails to respond successfully, the scaffolding buttons appear on screen in the non-player character (NPC) text area, just like the medium scaffolding case; there is no penalty for the use of the buttons, however, in the high scaffolding case. | |
| MEDIUM | Target language subtitles appear automatically when narrated | Mousing over a pull help selector generates pop-up support pane that explains what each button is (in target language). Pull help selectors must be clicked to activate the scaffolding they support. The user may click on a "Say it" button, to cause a non-player-character to repeat her statement, each time more slowly, up to a total of three times. After the third time the button is pushed, subsequent repetitions are at the slowest speed. |
| LOW | The scaffolding model for low scaffolding cases is progressive and offers less immediate support than described above. Immediately after a non-player character speaks a target language phrase, the "repeat" option becomes available for the user to press. Each time the user presses the button, the audio becomes progressive slower, up to 3 repetitions. After the third push, all subsequent pushes repeat the text at the slowest speed. After the third time the "repeat" button is pressed, a "Target Language Subtitles" button becomes available. Pressing this buttons makes the English subtitles visible on the screen for 10–20 seconds. The other button remains pressable. One the "Target Language Subtitles" is pressed, the "Native Language Subtitles" button becomes available. Pressing it brings up Native Language subtitles for 10–20 seconds. The other buttons remain pressable. After the "Native Language Subtitles" button is pressed, the "Say it in Native Language" button becomes available. Each button push only says the text at one speed. The other buttons remain | |

TABLE 4-continued

PUSH AND PULL SUPPORT BASED ON SCAFFOLDING LEVELS

| Scaffolding Level | Push Support | Pull Support |
|---|---|---|
| | pressable. Each button push has a cost to the user's "translator headset" battery. Target language audio repeats cost 2.5% of remaining battery power each. Native language subtitles cost 5%. Native subtitles or audio cost 10%. Once the battery gets to 10% or lower power, each button push is worth one point (where a point each 1% of total battery capacity). | |
| NONE | None | None |

It will be appreciated that the above scaffolding rules merely examples, and are designed to be applied in learning application programs that teach language acquisition. Scaffolding that is applied in learning application programs that relate to other subjects, such as mathematics, may take a different appearance. For example, instead of support in a native and target language, all help may be in the native language. Further, pull or push help for a math problem may display building blocks of knowledge that can be used by the user to solve the math problem, or may begin solving an equation step by step, etc.

V. Evaluation and Recommendation

Figure 18A:
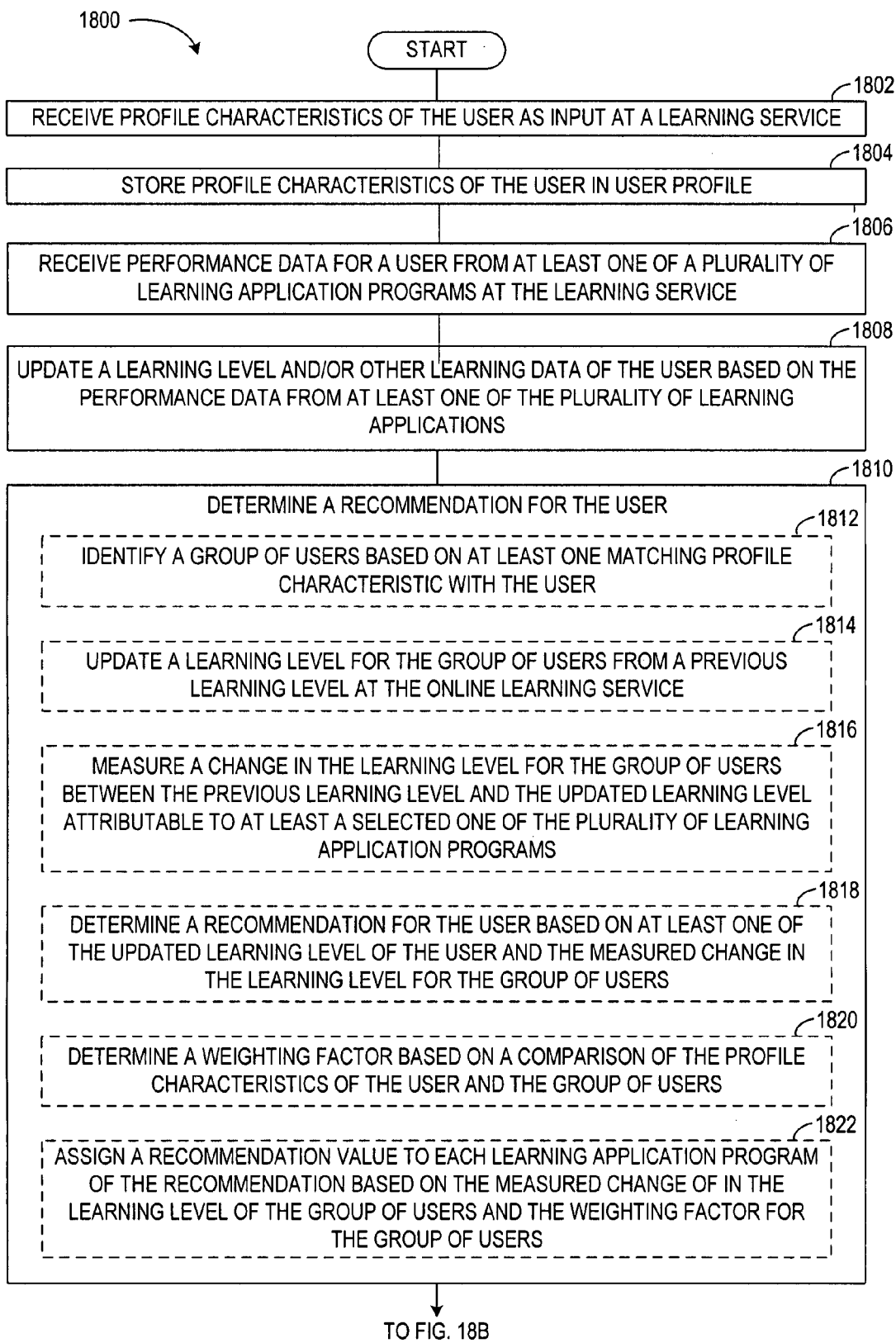
FIGS. 18A and 18B show a process flow of an embodiment of a method of providing a recommendation for a user.
Figure 18B:
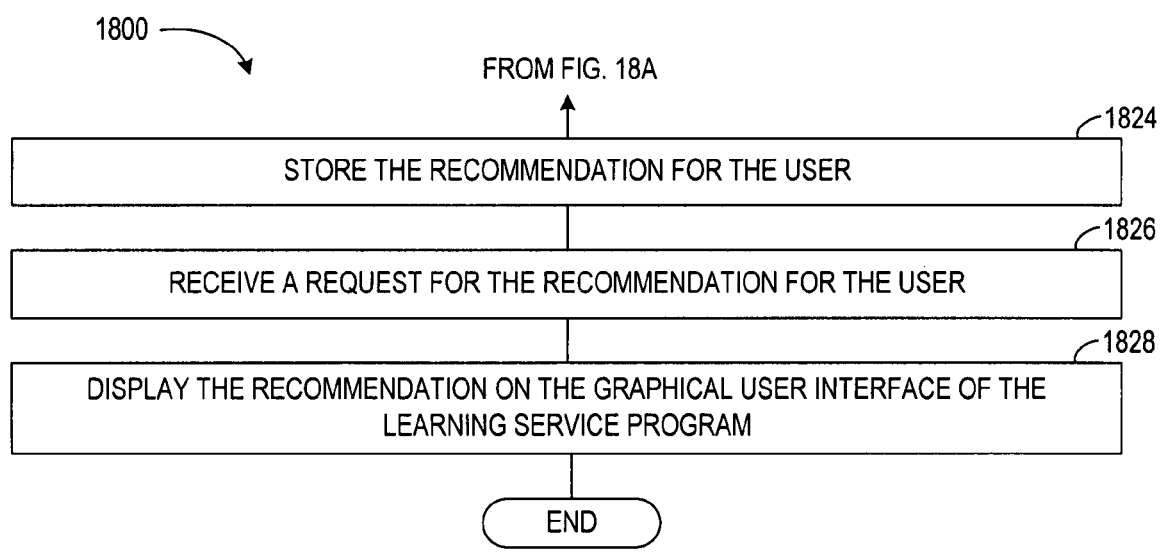

Referring now to FIGS. 18A and 18B, a flow chart illustrating a computerized learning method 1800 for determining recommendation of a learning application program will be described. The recommendation may be provided to the user, a parent of the user, or an administrator of the user via a graphical user interface. In some embodiments, the recommendation may indicate one or more learning application programs. These learning application programs may be attributed to improving a particular skill of the user. As such, the recommendation can provide learning application programs that are more effective at improving the particular skill than a learning application that is merely selected by the user at random from a population of learning applications. In this way, the learning level or skill of the user may be advanced more rapidly or more thoroughly than may otherwise occur without the recommendation.

Beginning at 1802, a profile characteristic of the user may be received as an input at the learning application program. As one example, referring also to FIGS. 1 and 2, the user may input one or more profile characteristics at a particular learning application program via user input device 124 of user client device 102. As also described herein, profile characteristics may include, but are not limited to, one or more of the elements described by Table 1. At 1804, profile characteristics of the user may be stored in a user profile.

As indicated at 1806, the method may further include receiving performance data for the user from at least one of a plurality of learning application programs, at the learning service program. As one example, where the user interacts with or uses a particular learning application program, performance data associated with the interaction may be received by the learning service program. In some embodiments, the performance data may be received by one or both of local learning service program 112 and online learning service program 114. The performance data may be used by the assessment engine 150A, 150B to determine a particular learning level for the user, which may be stored in the user's profile. Note that the user's profile may reside locally at client device 102, at a peripheral device as illustrated at 110A, or remotely at 110B at the data store 118. The performance data may also be used by the assessment engine 150A, 150B to update other learning data of the user, in addition to or alternatively from the learning level of the user. For example, in some embodiments, the assessment engine may update a scaffolding level or other learning data stored in the user profile.

As indicated at 1808, the method may further include updating a learning level and/or other learning data of the user based on the performance data from at least one of the plurality of learning applications. As performance data is received by the learning service in response to user interaction with a learning application program, assessment engine 150A, 150B is configured to determine a learning level for the user based on the performance data generated from the interaction. The learning level of the user for a particular skill may then be used to update the learning level of the skill at the user's profile. In some embodiments, a change in the learning level for the user may be measured between the previous learning level that was stored in the user profile and the updated learning level. For example, a learning level of the user for each skill identified by the learning service program may remain the same, increase, or decrease with respect to the previous learning level stored at the profile. As discussed above, the assessment engine can reside at either or both of the local and online service programs.

At 1810, a recommendation may be determined for the user by a recommendation engine 152A, 152B, which may include one or more of the operations described with reference to 1812-1822. The recommendation may be based on the updated learning level or other learning data of the user. In some embodiments, the determination of the recommendation also may be based on comparisons to patterns of advancement shown by aggregated performance data from other users using the plurality of learning application programs, the other users sharing one or more matching profile attributes with the user. As described herein, a recommendation may indicate one or more learning application programs, websites, printed or electronic publications such as books, or other content stored at or referenced by the learning service, about which the learning service has knowledge or meta-data. In some embodiments, the recommendation may further indicate a particular portion or challenge of the learning application that may be accessed by the user to improve a particular skill. As discussed above, the recommendation engine can reside at either or both of the local and online service programs. However, while depicted in both locations in the Figures, in some embodiments it will be appreciated that the recommendation does not reside locally, but only on the online server system 116.

At 1812, the method may include identifying a group of users based on at least one matching profile characteristic with the user. For example, the identified group of users may have at least one matching profile characteristic with the user, where one or more of the matching profile characteristics may be received as input from the user. Alternatively, the matching profile characteristic may be inferred from user activity by the learning service program. As one example, the group of users may be selected based on native language and target language of study. However, it should be appreciated that other matching profile characteristics may be considered. Profile characteristics being matched further may include similarities in learning trend data or other data captured in the learning service but not explicit in the users' profiles. The identification of one or more groups of users is described in greater detail with reference to FIG. 20.

As indicated at 1814, the method may further include updating a learning level for the group of users from a previous learning level at an online learning service. For example, as each user of the group of users interacts with or uses a learning application program, the learning level of each of the users may be updated in a respective user profile as described above with reference to 1808.

As indicated at 1816, the method may further include measuring a change in the learning level for the group of users between the previous learning level and the updated learning level attributable to at least a selected one of the plurality of learning application programs. The change in the learning level of each user of the group of users may be used to identify which learning applications are effective at increasing the learning level of the user.

At 1818, a recommendation may be determined for the user based on at least one of the updated learning levels of the user and the measured change in the learning level for the group of users. For example, the method may include determining a recommendation for the user based on the updated learning level of the user. Additionally, the determination of the recommendation may be further based on the measured change in the learning level for the group of users. For example, the recommendation may be determined by the recommendation engine so that it indicates learning application programs that have caused the greatest increase in the learning level of the group of users for a particular skill.

Note that a recommendation may indicate any suitable number of learning application programs or particular challenges associated with a learning application program. As one example, the recommendation may indicate at least one of a plurality of learning application programs. In some embodiments, the recommendation may further indicate a particular challenge of a learning application program. As yet another example, the recommendation may indicate at least two of the plurality of learning application programs. Furthermore, in some embodiments, the recommendation does not include a learning application program that was previously used by the user. In this way, the user may be recommended learning applications, books, websites, etc., that have not been previously used or purchased by the user, thereby reducing redundancy in the recommendation and increasing the relevancy of the recommendation.

As indicated at 1820, a weighting factor may be determined based on a comparison of the profile characteristics of the user and the group of users. As is described in greater detail with reference to FIGS. 20 and 21, a weighting factor may be applied by the recommendation engine in order to consider the relevancy of the learning information obtained from the group of users. As one non-limiting example, the profile characteristics of the user may be compared to the profile characteristics of each user of the group of users. For example, the greater the match between the user's profile and the profile of the group, the greater the weighting factor that may be determined. In this way, the recommendation engine can provide greater deference to learning information associated with a group of users that more closely matches the user for which the recommendation is to be determined, thereby increasing the relevancy of the recommendation.

As indicated at 1822, the method may include assigning a recommendation value to each learning application program of the recommendation. The recommendation values may be used for displaying the recommendation on a graphical user interface. As one example, the relative position on the graphical user interface of each of the learning application programs indicated by the recommendation may be based on the assigned recommendation value of each learning application program. For example, a recommendation value may be assigned to each learning application program of the recommendation based on the measured change in the learning level of the group of users and the weighting factor for the group of users determined at 1820. Note that in some examples, a weighting factor may not be used by the recommendation engine when determining a recommendation for the user. For example, the user may be assigned to a user group without necessarily requiring that a weighting factor be determined.

As one non-limiting example, the learning application programs indicated by the recommendation may be arranged in a particular order when displayed on the graphical user interface. This order may be based on the recommendation value of each of the learning application programs. For example, the learning application program that is attributable to the greatest increase in the learning level of the group of users may be assigned the highest recommendation value of the plurality of learning applications such that it may be placed at the first position or top of the order. Conversely, a learning application that did not increase the learning level of the group of users may be assigned a lower recommendation value, thereby causing the learning application to be displayed closer to the bottom of the list or at a different page. In this way, it may be more likely that user or the user's parent, teacher, or other administrator will select the most effective learning application program.

At 1824, the recommendation for the user may be stored. As one example, the recommendation may be stored at the learning service, either locally at the local learning service or remotely at the online learning service. As another example, the recommendation may be stored at a profile of the user, such as at the local profile located at the client, at a profile located at a peripheral device, or remotely at the online learning service. In this way, the recommendation may be determined in advance to a user's recommendation request, thereby reducing the amount of time for providing the recommendation to the user.

At 1826, a request for the recommendation for the user may be received. For example, the user may request the recommendation at the learning service program. Alternatively, a parent, teacher administrator, or other administrator of the user may request the recommendation at the same or at a different client device via a respective parent, teacher administrator, or other administrator graphical user interface.

As indicated at 1828, the method may include displaying the recommendation on a graphical user interface of the learning service program. Where the recommendation is stored prior to the request, the recommendation may be retrieved by the learning service. Alternatively, the recommendation may be determined upon a request for the recommendation. Where the recommendation indicates multiple learning application programs, the method may include displaying each learning application program of the recommendation on the graphical user interface. In some embodiments, the relative position of each of the learning application programs on the graphical user interface may be based on the assigned recommendation value of each learning application program that is indicated by the recommendation.

Figure 19:
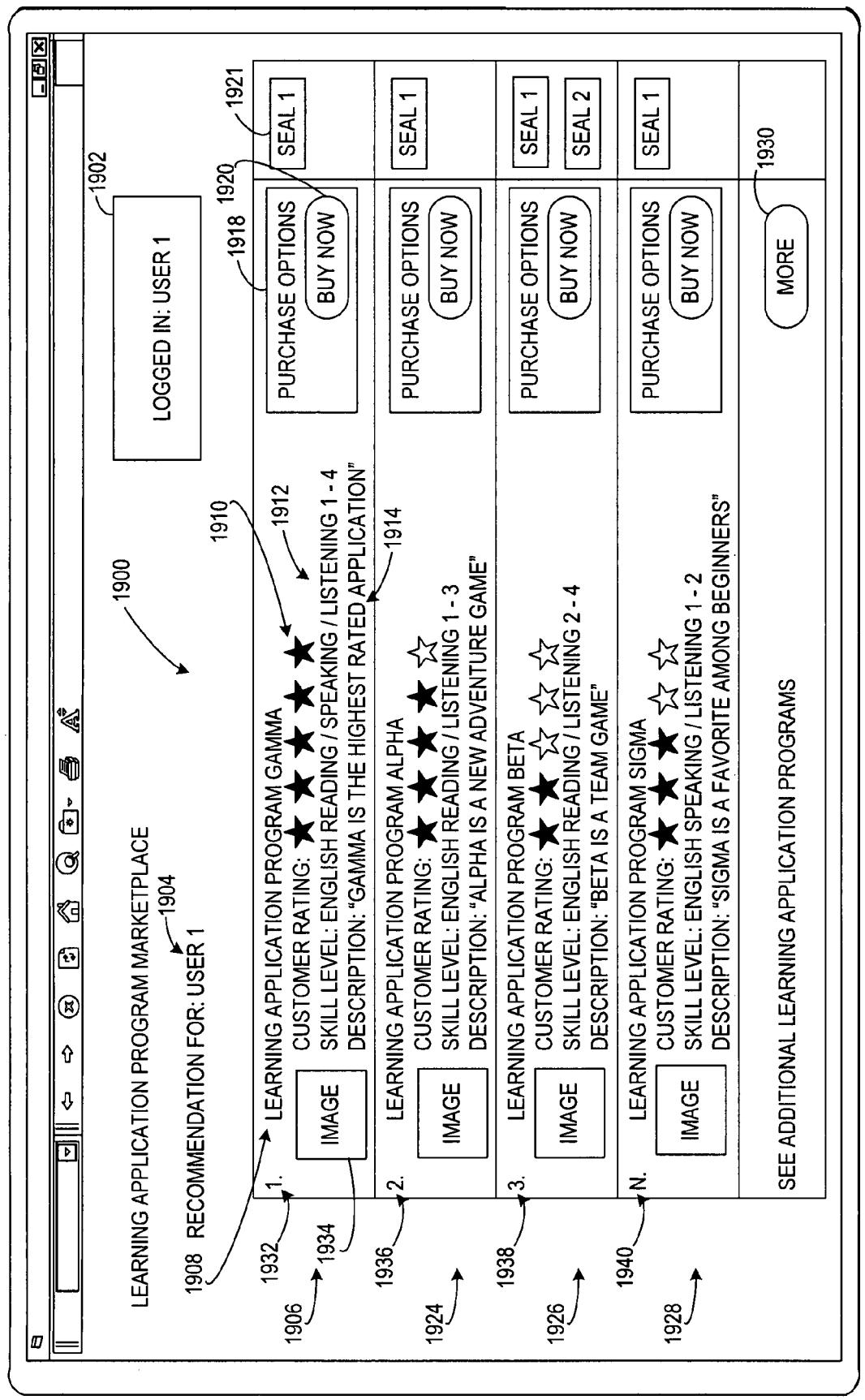
FIG. 19 shows an embodiment of a graphical user interface for presenting a recommendation for a user.

FIG. 19 illustrates an example graphical user interface displaying a recommendation 1900 for a user. Recommendation 1900 may be determined, for example, via method 1800 or by another suitable approach. The depicted recommendation 1900 indicates several learning application programs, however, as discussed above, books, websites, or other content may also be included in a recommendation. In this particular example, the recommendation is displayed in the context of a marketplace at which recommended items are available for purchase. For example, the marketplace can be configured to enable the user or an administrator for the user to purchase learning application programs or to purchase access to learning application programs via an online subscription service, etc. The marketplace may also be configured to enable purchase of other items included in recommendations, such as books, access to subscription websites, etc.

As indicated by 1902 of the graphical user interface, User 1 is logged in or signed in to the learning application program marketplace such that recommendation 1900 for User 1 is displayed. Alternatively, a parent, teacher administrator, or other administrator may sign into the learning application program marketplace, which may likewise be indicated at 1902. Further, 1904 indicates that the recommendation currently displayed by the graphical user interface is for User 1.

In this particular example, the recommendation displayed by the graphical user interface indicates learning application programs 1-N via indicia 1932-1940. However, it should be appreciated that any suitable number of learning application programs or particular challenges thereof may be indicated by the recommendation, as indicated by the variable N in the fourth learning application program shown. Furthermore, it should be appreciated that a recommendation may indicate learning application programs that span two or more pages displayed by the graphical user interface or that occupy a scrollable window. Thus, FIG. 19 may represent only a portion of the learning applications indicated by the recommendation for User 1.

A first learning application program of the recommendation for User 1 is indicated at 1906. The first learning application program may be indicated by a title 1908, indicated, for example, as "Learning Application Program Gamma". A customer rating 1910 of the learning application program may be represented graphically, for example, by a number of stars. It should be appreciated that other suitable approaches may be used for displaying a user rating for the learning application program. A set of skills utilized by the learning application program may be indicated at 1910. These skills may be used by the recommendation engine for recommending learning application program to the user based on the user's learning level for the particular skills associated with each of the learning application programs. For example, the set of skills associated with learning application program Gamma includes skills such as English reading, speaking, and listening. Further, the set of skills may include a skill range indicated by FIG. 19, for example, as 1-4. However, other suitable ranges or values may be used. A description 1914 of the learning application program Gamma may be displayed. For example, the description for learning application program Gamma may recite: "Gamma is the highest rated application". An image 1934 further indicates that a pictorial representation of the learning application program may also be displayed.

A purchasing interface 1918 may be displayed by the graphical user interface to enable the user or administrator of the user to select and purchase the learning application program. For example, a selectable icon 1920 titled "Buy Now" may be displayed. Further, a, learning application program Gamma may require 25 points of a currency to complete the purchase. One or more seals 1921 may be provided adjacent each learning application program recommendation, indicating that the learning application program has earned a seal of approval and is thus recommended by a third party certification service, such as a testing service, a government agency, a school, etc.

A second learning application program of the recommendation for User 1 is indicated at 1924. The second learning application program may be indicated by a title that is different from the first learning application program indicated as learning application program Alpha. The second learning application program may be displayed in a manner that is similar to the first learning application program. For example, learning application program Alpha may also include a customer rating, a skill set including a skill level and list of skills, a description, and an associated image. Furthermore, a purchasing interface for learning application program Alpha may also be displayed. Note that, in some embodiments, a common purchasing interface may be to facilitate the purchase of two or more learning application programs.

A third learning application program "Beta" of the recommendation for User 1 is indicated at 1926. The third learning application may be indicated using similar indicia as the first and second learning application programs. An Nth learning application program "Sigma" of the recommendation for User 1 is indicated at 1928. The Nth learning application program may represent any suitable number of learning application programs that may be indicated by the recommendation for User 1.

In some embodiments, only a portion of the recommendation may be displayed by the graphical user interface at a particular instance. Thus, a selectable icon 1930 may be provided to enable the user or an administrator for the user to view more learning application programs that may be indicated by the recommendation in addition to those currently displayed.

As described with reference to method 1800, learning application programs may be displayed in an order that corresponds to their respective recommendation value. For example, referring again to FIG. 19, learning application program Gamma may be positioned before learning application program Beta on the graphical user interface where learning application program Gamma has a greater recommendation value. In other words, learning application Gamma may have been attributed to a greater increase in the learning level of other users for a particular skill than learning application program Beta. In some embodiments, the particular order of the learning application programs may be further indicated by corresponding indicia 1932-1940. Thus, in this particular example, Gamma is ranked first as indicated by 1932 and Beta is ranked third as indicated by 1938.

Furthermore, a learning application program that has already been purchased by the user or has already been used by the user may not be presented for the user with the recommendation or may be excluded from the recommendation. For example, a learning application program may have a higher recommendation value than Gamma, but it may nonetheless be removed from the recommendation by the recommendation engine. In this way, redundancies in the recommendation may be reduced and relevancy of the recommendation may be increased.

Figure 20:
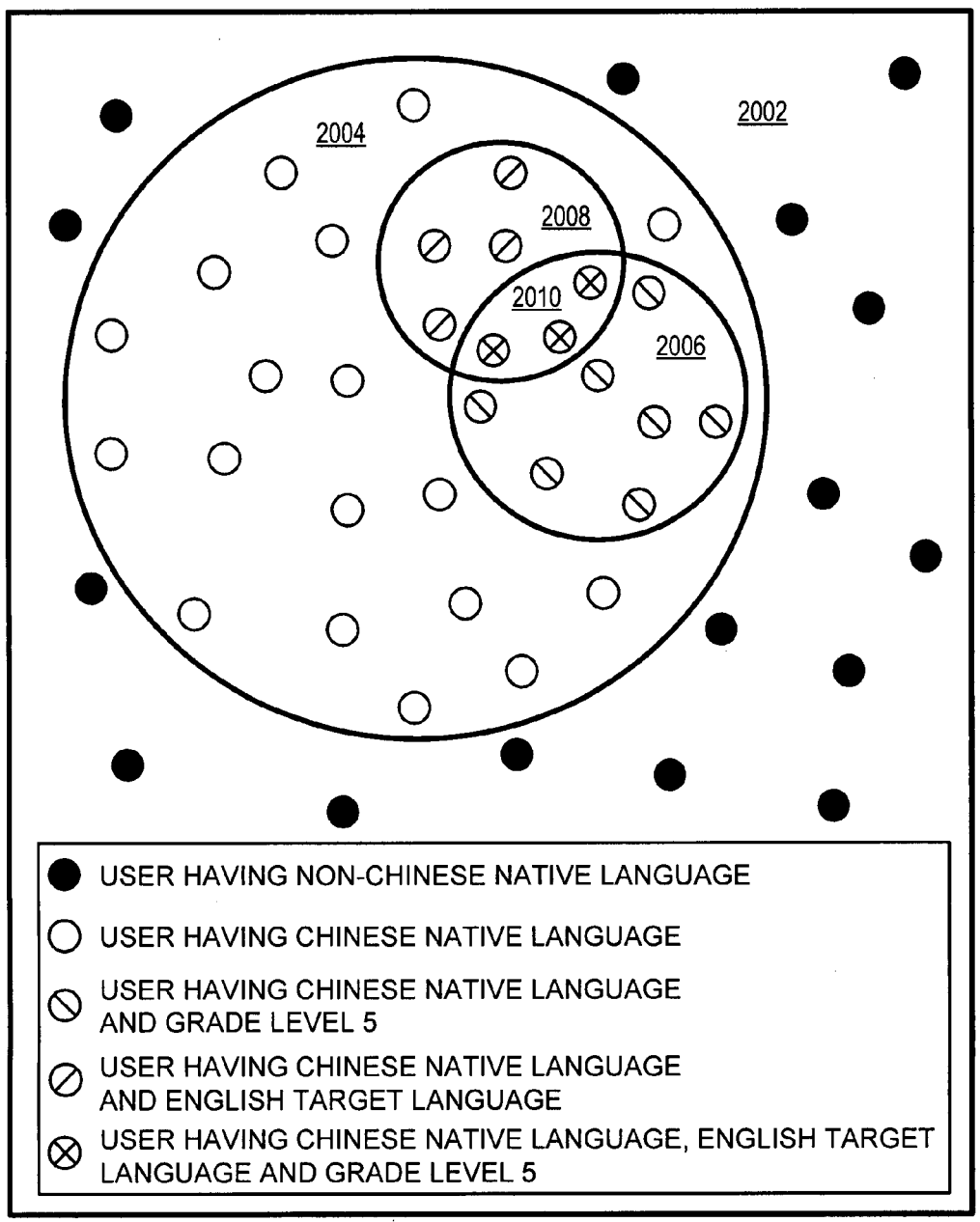
FIG. 20 shows a diagram depicting example groups of users of a population.

As described with reference to 1812 of method 1800, a group of users may be identified when determining a recommendation for a particular user based on at least one matching profile characteristic. Referring now to FIG. 20, a schematic diagram identifying various groups and subgroups of an example population of users is illustrated. As illustrated by FIG. 20, a population 2002 may include any number of users that are interacting with a learning service such as local learning service 112 or online learning service program 114.

Population 2002 also includes the users associated with groups 2004, 2006, 2008, and 2008. Group 2004, which includes a subset of users from population 2002, may be defined as the users of population 2002 that share a first number of matching profile characteristics. As one specific example, the users of group 2004 may share a profile characteristic that includes native language. For example, the users of group 2004 may have a native language of Chinese. Hence, the users of group 2004 may be more closely related to each other based on their profile characteristics than the remainder of population 2002 that is excluded from group 2004.

Group 2006, which includes a subset of users from group 2004, may be defined as the users of population 2002 that share a second number of matching profile characteristics. In this particular example, the second number of matching profile characteristics is greater than the first number of matching profile characteristics associated with group 2004. In other words, the users of group 2006 may be more closely related to each other based on their matching profile characteristics than the users of group 2004 that are excluded from group 2006. For example, where the users of group 2004 share a profile characteristic that includes native language, the users of group 2006 may share profile characteristics that include both native language and grade of the user. Hence, the number of users of group 2006 may be less than the number of users of group 2004 as group 2006 includes a more specific subset of users.

Similarly, group 2008, which also includes a subset of users from group 2004, may be defined as the users of population 2002 that share a third number of matching profile characteristics. In this particular example, the third number of matching profile characteristics associated with group 2008 is also greater than the first number of matching profile characteristics associated with group 2004. Hence, the number of users of group 2006 may be less than the number of users of group 2004.

Note that the second number of matching profile characteristics defining group 2006 can be the same or different from the third number of matching profile characteristics defining group 2008. Furthermore, the type of profile characteristic that is shared among users may also differ. Groups 2006 and 2008 may be defined by different matching profile characteristics while sharing the same number of matching profile characteristics. As one example, the users of groups 2006 and 2008 may share profile characteristics that include native language. As a more specific example, group 2006 can include a native language of Chinese and a user age of 10 years, and group 2008 can include a native language of Chinese and a target language of study of English. It should be appreciated that any number and type of matching profile characteristics may be used to define a group of users of the user population. For example, similar learning levels for specified skills may also be used as a matching profile characteristic. A summary of example profile characteristics is described herein with reference to Table 1.

Continuing with FIG. 20, group 2010, which includes a subset of users from groups 2006 and 2008, may be defined as the users of population 2002 that share a fourth number of matching profile characteristics. In this particular example, the fourth number of matching profile characteristics associated with group 2010 may be greater than the second and third numbers of matching profile characteristics associated with groups 2006 and 2008, respectively. As one example, the users of group 2010 may share a profile characteristic that is not necessarily shared by all users of group 2008 or group 2006. For example, where group 2006 includes users having a native language of Chinese and a user age of 10 years and group 2008 also includes users having a native language of Chinese, but instead a target language of English, group 2010 may include users having a native language of Chinese, a target language of English, and a user age of 10 years.

In this way, one or more groups of users may be defined within a population of users based on any suitable number or type of matching profile characteristics. Further, as illustrated by FIG. 20, each group of users may be a subset of a larger group of users. In some examples, users may be associated with one or more groups based on their respective profile characteristics.

Figure 21:
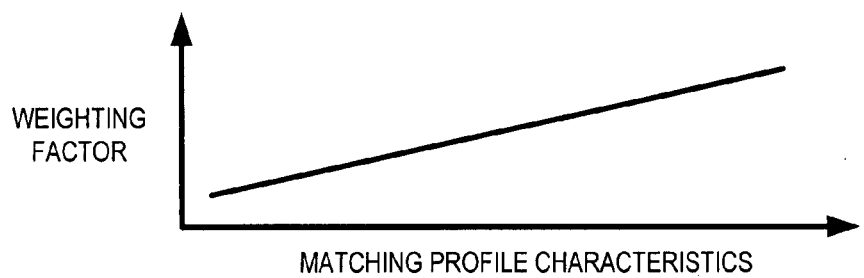
FIG. 21 shows a graph depicting an example function describing how a weighting factor may be determined based on a number of matching profile characteristics.

As described with reference to 1820 of method 1800, a weighting factor may be determined in at least some examples based on a comparison of the profile characteristics of the user and the profile characteristics of a group of users. Referring now to FIG. 21, a graph illustrating an example weighting factor function is described. As illustrated by the non-limiting example of FIG. 21, the weighting factor determined by the recommendation engine may increase with an increasing number of matching profile characteristics. For example, referring also to FIG. 20, a comparison of a user of group 2008 to the other users of group 2008 may result in a higher weighting factor than a comparison of the user of group 2008 to other users of group 2004 that are excluded from group 2008. In other words, the more closely a user shares profile characteristics with a group of users, the higher the weighting factor that may be determined for the comparison.

The weighting factor may then be used by the recommendation engine to influence the recommendation. For example, the influence of a particular group on the recommendation may increase with increasing weighting factor. As one non-limiting example, the relevance of the measured change in the learning level of the group of users may be adjusted by the weighting factor. In this way, users that are more closely matched to the user for whom the recommendation is determined may influence the recommendation more than users that are less closely matched to the user.

Note that while FIG. 21 illustrates how the weighting factor may vary with the number of matching profile characteristics, the weighting factor may also vary with the type of matching profile characteristic. As one non-limiting example, the native language of a user may influence the weighting factor more than the age of the user. As such, it should be appreciated that any suitable function may be used to determine a weighting factor based on the number and type of matching profile characteristics. Further, the particular skills that are identified as behind the average (deficit skills) for peer-matched profiles for a user may lead to the recommendation emphasizing those learning applications or other content that specifically targets those deficit skills.

VI. Matching

Referring again briefly to FIGS. 1 and 2, a system for matching users of learning application programs may include learning service program 106 configured to receive performance data for each of a plurality of users from a plurality of learning application programs, such as learning application programs 104, for example. The learning service program may be further configured to receive a request from a requesting learning application program to perform matching of the plurality of users for multi-user interaction via the requesting learning application program. The system for matching users may also include a matching engine 154A, 154B associated with the learning service program. The matching engine 154A, 154B may be configured to match the plurality of users based on the performance data for each user received from the plurality of learning application programs, to thereby produce a match result including one or more matched groups of users. As one example, the matching engine 154A, 154B may be executed locally on user client device 102 and may be associated with the local learning service program.

The learning service program may be configured to send the match result to the requesting learning application program. The learning system may further include application programming interface 108 configured to transmit communications between the learning service program and the requesting learning application program.

Computerized learning system 100 may further include online learning service program 114 executed on the online server system 116 configured to communicate over the computer network 120 with the local learning service program executed on user client device 102. The matching engine 154A, 154B may be a component of the online service learning service program, and may be configured to send the match result to the requesting learning application program via the local learning service program.

Computerized learning system 100 may further include assessment engine 150A, 150B associated with the learning service program configured to determine an assessed learning level for each of the plurality of users based on the performance data. It should be appreciated that the assessed learning level may be determined on a per skill basis for each of the plurality of users. The matching engine 154A, 154B may be configured to match the plurality of users based on the assessed learning level for each of the plurality of users. It will be appreciated that other learning data for each of the plurality of users may also form the basis for the matching.

The matching engine 154A, 154B may be configured to determine one or more skills utilized by the requesting learning application program by referencing application-specific game schema 172 in a game configuration file. As one example, the game configuration file may be stored in nonvolatile storage 132A, 132B accessible to the matching engine 154A, 154B. The matching engine 154A, 154B may be configured to match users based on learning levels for the skills determined to be utilized by the learning application program.

Computerized learning system 100 for matching users may include a matching engine configured to receive a matchmaking request from a requesting learning application program via application programming interface 108. The request may be used to perform matching of a plurality of users for multi-user interaction via a learning application program. The matching engine 154A, 154B may be further configured to process the request by determining a plurality of available users who are available for game play, reading performance data in a learner profile for each of the available users, comparing the performance data according to a matching mode to thereby produce a match result including one or more matched groups of users, and sending the match result to the requesting learning application program.

Figure 22A:
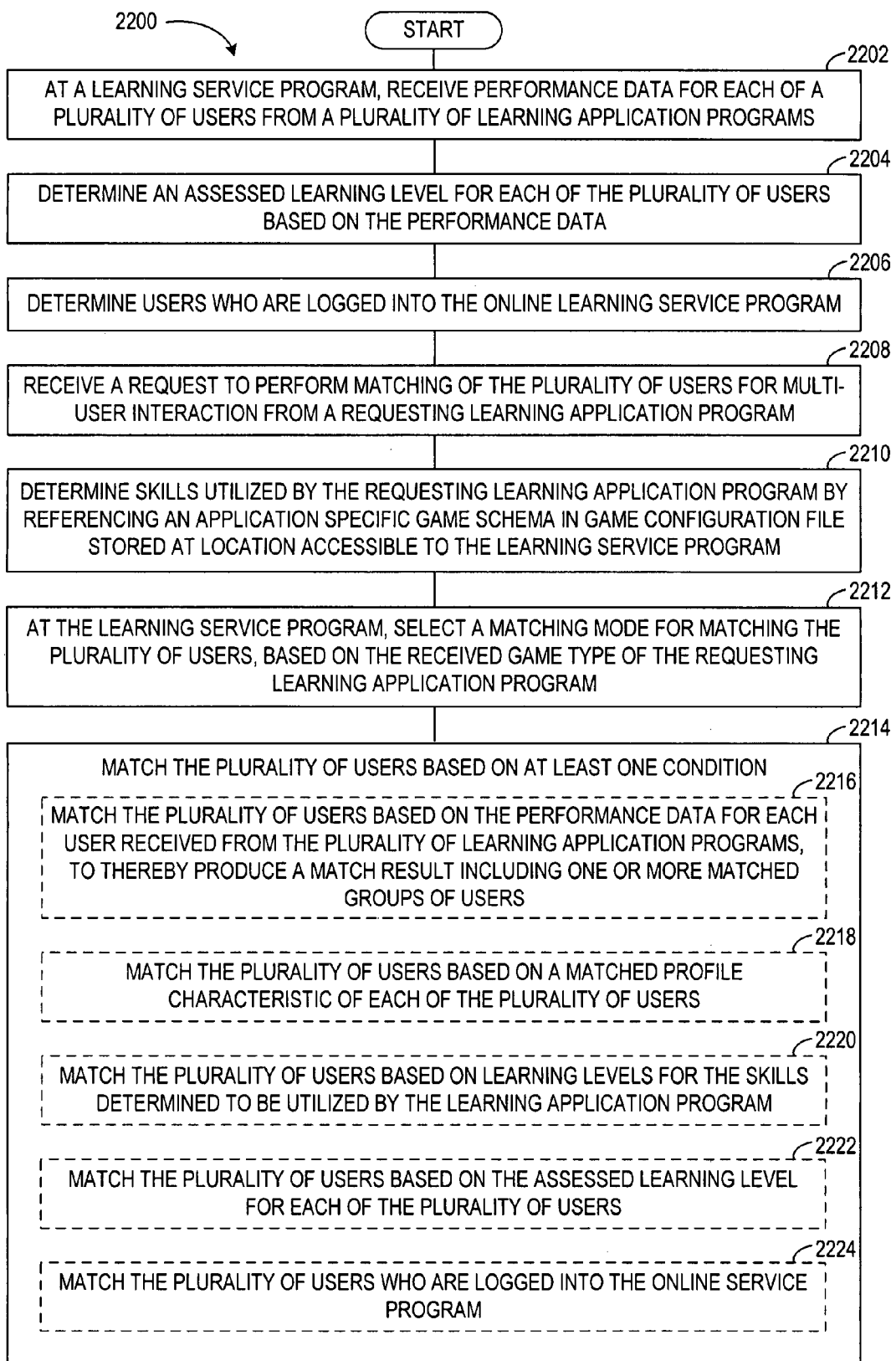
FIGS. 22A and 22B show a process flow of an embodiment of a method of matching users for an interactive learning application program.
Figure 22B:
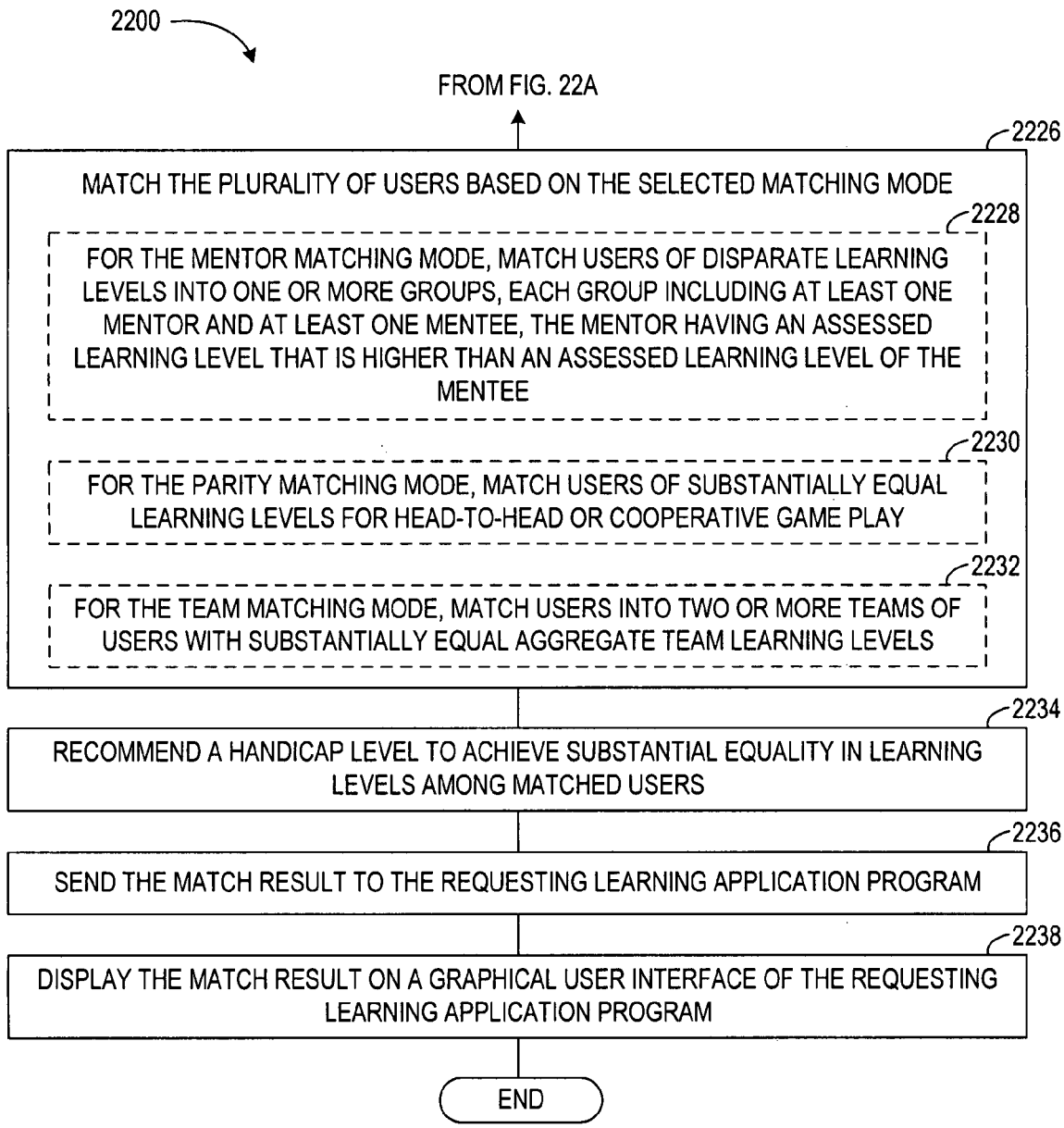

FIGS. 22A and 22B illustrate a computerized learning method 2200 for matching a plurality of users. It should be appreciated that method 2200 may be performed by the computerized learning system 100 as described herein. At 2202, the method may include, at learning service program 106, receiving performance data for each of a plurality of users from a plurality of learning application programs. At 2204, the method may further include determining an assessed learning level for each of the plurality of users based on the performance data. At 2206, the method may further include determining users who are logged into online learning service program 114.

The learning service program may include local learning service program 112 executed on a user device. The learning service program may further include online learning service program 114 having an associated matching engine. The learning service program may receive requests from users to engage in a multi-user online interaction via a learning application program, where the matching may be performed in response to the request. At 2208, the method includes receiving a request to perform matching of the plurality of users for multi-user interaction from a requesting learning application program. It will be appreciated that the request to perform matching may be received from a requesting learning application program, and the request may include data indicating the game type of the requesting learning application program.

As shown at 2210, the method may include determining one or more skills utilized by the requesting learning application program by referencing an application-specific game schema 172 in a game configuration file stored at a location accessible to the learning service program. At 2212, the method may further include, at the learning service program, selecting a matching mode for matching the plurality of users, based on the received game type of the requesting learning application program. For example, the matching mode may be selected from a group including a mentor matching mode, a team matching mode, and a parity matching mode. Thus, in some examples, a plurality of matching modes may be provided.

At 2214, the method may include matching the plurality of users based on one or more parameters. As indicated at 2216, the method may include matching the plurality of users based on the performance data for each user received from the plurality of learning application programs, to thereby produce a match result including one or more matched groups of users. As indicated at 2218, the method may further include matching the plurality of users based on a matched user profile characteristic of each of the plurality of users. The matched user profile characteristic may be selected from the group consisting of first (or native) language, target language, country, grade level, learning level for a skill, age, gender, interests, other profile data stored for each user, or other user data that may be relevant to targeted learning skill or game genre.

At 2220, the method may include matching the plurality of users based on the assessed learning level for each of the plurality of users. At 2222, the matching may be based on learning levels for the skills determined to be utilized by the learning application program. At 2224, the method may further include matching among a plurality of users who are logged into the online service program and who have access to the learning application assets needed to play the learning application program, or are otherwise registered to be online and available to play. In some embodiments, the matchmaking engine is configured to send a message asking users who are detected to be online but not logged into the online learning service whether they would like to join a group of users who are commencing interactive play. The matching of the plurality of users may be based on one or more parameters described with reference to 2216-2224.

Referring to FIG. 22B, the plurality of users may be matched at 2226 based on the selected matching mode described above with reference to 2212. As indicated at 2228, the matching mode may be a mentor matching mode, according to which the learning service program may be configured to match users of disparate learning levels into one or more groups. Each group may include at least one mentor and at least one mentee. The mentor may have at least an assessed learning level that is higher than an assessed learning level of the mentee.

As indicated at 2230, the matching mode may be a parity matching mode, according to which the learning service program may be configured to match users of substantially equal learning levels for head-to-head or cooperative game play. In some embodiments, the learning service program may be configured to match users of substantially similar learning levels or may be configured to create the closest match of the users that may be practical from the population of users.

As indicated at 2232, the matching mode may be a team matching mode, according to which the learning service program may be configured to match users into two or more teams of users with substantially equal aggregate team learning levels. In some embodiments, the learning service program may be configured to match users into two or more teams with substantially similar learning levels or may be configured to create the most equal match of the teams that may be practical from the population of users. Note that the aggregate team learning level can include a total learning level of the team members, an average learning level of the team members, or a median learning level of the team members, among other suitable aggregation approaches. In this way, the users may be matched based on a selected matching mode.

At 2234 the method may further include recommending a handicap level to achieve substantial equality in learning levels among matched users. As one example, where the parity matching mode is selected, users having different learning levels may be provided with a handicap to reduce the difference between the learning levels. It should be appreciated that the handicap may be applied to each of the matching modes where there is an undesired difference in learning levels.

The method may further include, at 2236, sending the match result to the requesting learning application program, and at 2238, displaying the match result on a graphical user interface of the requesting learning application program. As one example, the match result may be displayed on sign-in interface 300 of a particular learning application program via user client device 102. Once the match result is displayed, the computerized learning system 100 is configured to enable the users to engage in multi-user interaction according to the match result.

VII. Trophies

The interaction of the various components of computerized learning system 100 with trophy engine 156A, 156B are discussed in detail hereinafter. Referring to FIGS. 1 and 2 discussed above, learning service program 106 may be configured to receive user performance data 206 from a plurality of learning application programs 104. It may be appreciated that the user performance data may be organized according to a predefined schema such that user learning level in one or more predefined learning levels may be measured across the plurality of applications. Learning service program 106 may include an assessment engine, such as local assessment engine 150B, that is configured to determine an assessed user learning characteristic, such as a user learning level, based on the user performance data. The learning service program 106 may further include a trophy engine, such as local trophy engine 156B, that is configured to award a "trophy", or achievement, to the user upon determining that the assessed user learning characteristic meets or exceeds a predetermined threshold. In the case where the user learning characteristic is a user learning level for a skill, the trophy engine is configured to determine whether the user learning level meets or exceeds a predetermined user learning level. It may be appreciated that instead of a local assessment engine 150B executed on a local user client device, and the assessment engine may be an online assessment engine 150A executed at the online server system 116. The online assessment engine 150A may be configured to administer an assessment test to the user to verify that the user has attained a user learning level that meets or exceeds the predetermined learning level threshold.

Learning service program 106 may be configured to store data relating to a trophy in profile 110 of the user. For example, data relating to a trophy may be stored in the achievement array element of profile 110. It may be appreciated that profile 110 of the user may be stored in non-volatile storage 132A, 132B on one or both of a local user client device and an online learning service.

As discussed above, computerized learning system 100 may further include application programming interface 108 configured to receive the user performance data 206 from each of the plurality of learning application programs, and store the user performance data 206 in profile 110 for retrieval by the learning service program, application programming interface 108 being further configured to read and write data relating to the trophy in the user profile.

Learning service program 106 further may be configured to display a graphical user interface including an icon representing the trophy. According to another embodiment, the system may include learning service program 106 configured to display a graphical user interface, the graphical user interface being configured to display trophies awarded to a user by the learning service program for achieving assessed user learning levels meeting or exceeding a predetermined learning level threshold based on user performance in a plurality of learning application programs 104.

Referring to FIG. 4, as described above, user interface 400 may include trophies pane 408 configured to display trophies that represent achievements the user has made in each of the plurality of learning application programs. In a more particular example, each of the displayed trophies may include a unique trophy graphic 409 and a description of the accomplished task associated with the trophy. In some embodiments, trophies pane 408 may include a selector, such as the "details" selector, which is configured to display a trophy graphic user interface 1000, described below with reference to FIG. 10, which presents detailed information about trophies earned by the user. Alternatively, the trophies may be displayed in a game play interface of a learning application program, or in the summary view.

Figure 10:
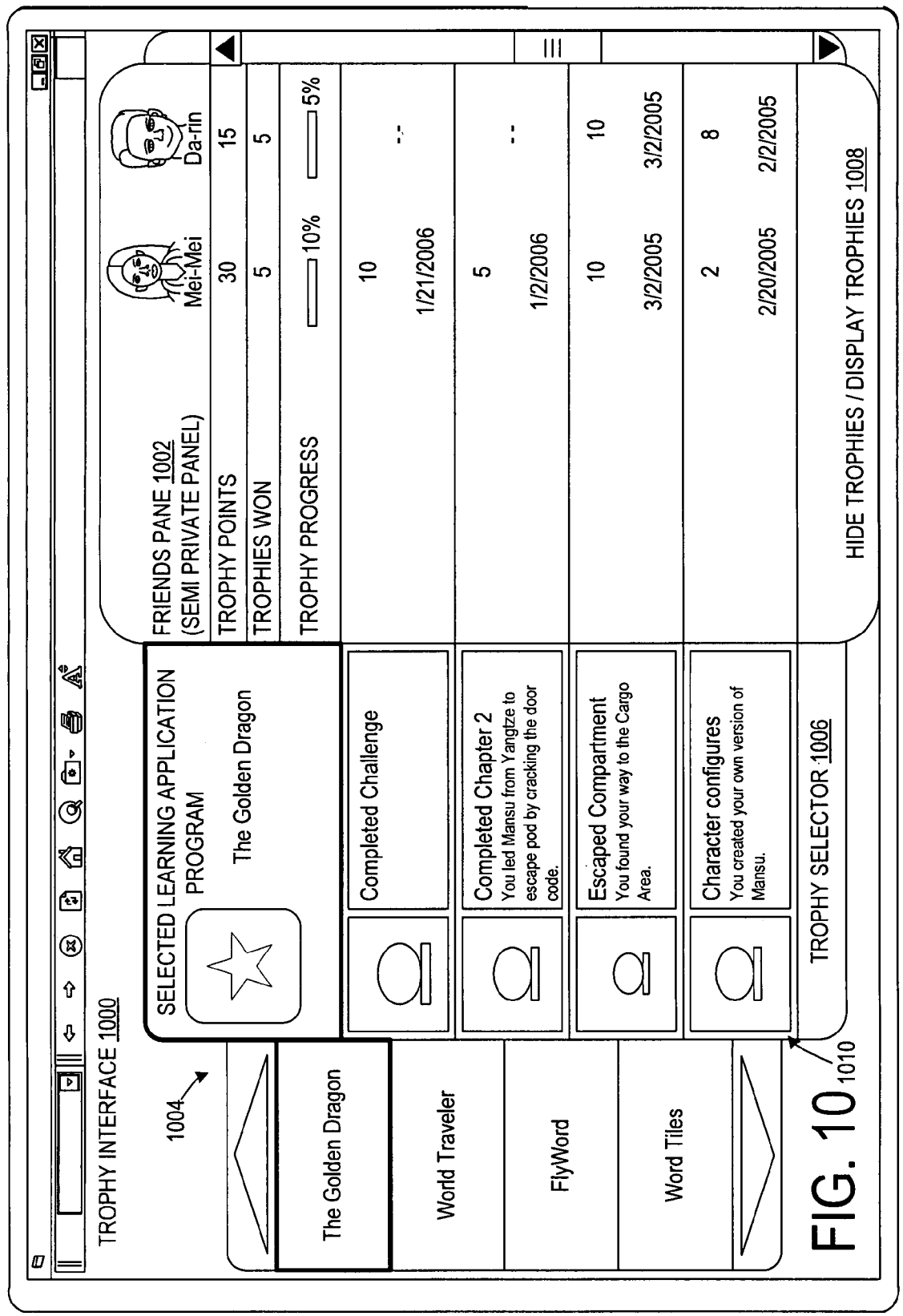
FIG. 10 shows an embodiment of a graphical user interface presenting user trophy information.

FIG. 10 illustrates an embodiment of a trophy graphical user interface 1000, which is configured to display semi-private trophy information of the user, in a semi-private friends pane 1002. Application selector 1004 may be configured to select a particular learning application program so as to view trophy data associated with a selected learning application program, such as The Golden Dragon in the depicted embodiment. The trophy interface 1000 further includes a trophy selector 1006 configured to display a plurality of trophy options 1010 from the selected application, from which the user may select a particular trophy option for viewing in a detail view.

In the depicted embodiment, the trophy information of friends Mei-Mei and Da-rin is displayed in the semi-private friends pane 1002 of trophy graphical user interface 1000. The semi-private friends pane 1002 may include information associated with trophy points, trophies won, trophy progress, and dates corresponding to trophies for each friend. Additionally, the trophy can record learning assessment data, including detailed information regarding the skill levels achieved prior to awarding the trophy, with pointers to a data record of the assessment. The trophy graphical user interface 1000 may include a selector 1008 for receiving a user selection to cause the trophy to be hidden from friends in the semi-private view. In the depicted embodiment the selector hides all trophies from the view of friends; however it will be appreciated that the hide selector may be provided for each trophy individually. Further, learning service program 106 may be configured to send a notification message to a parent of the user regarding the award of the trophy. This enables parents to keep up to date on a student's learning progress. A similar message may be sent to an administrator such as a teacher. For example, the system may be configured to send a teacher trophy information for each student in a class.

Figure 23:
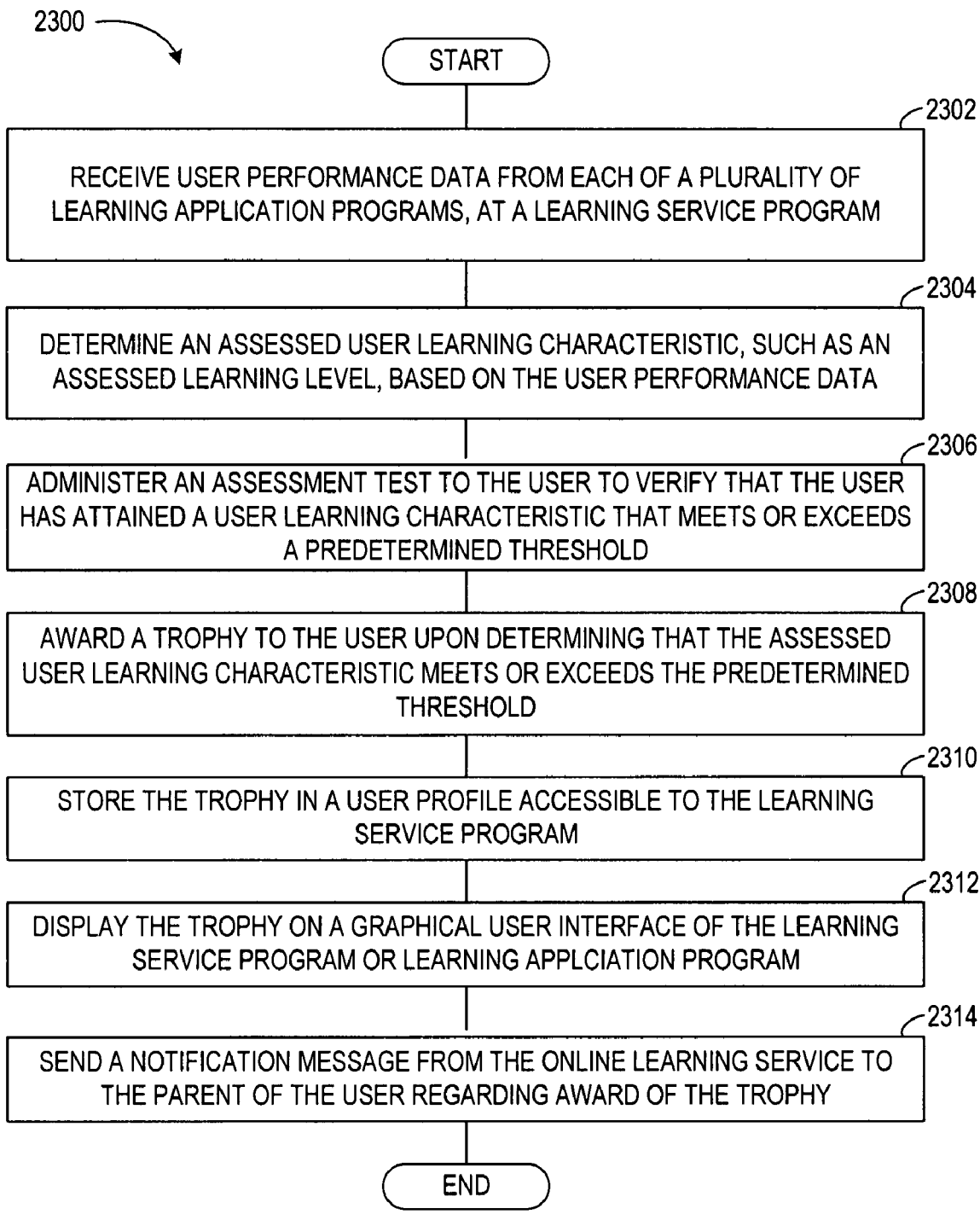
FIG. 23 shows a process flow of an embodiment of a method for providing trophies to a user.

As shown in FIG. 23, a computerized learning method 2300 for use with trophies is illustrated. The method includes, at 2302, receiving user performance data from each of a plurality of learning application programs, at learning service program 106. At 2304, the method may further include determining an assessed user learning characteristic based on the user performance data. The assessed user learning characteristic may be an assessed user learning level, or other characteristic such as attendance that is not learning level related. At 2306, the method may include administering an assessment test to the user to verify that the user has attained a user learning characteristic that meets or exceeds a predetermined threshold. In some embodiments the assessment test may verify that the user has attained a predetermined user learning level threshold. The method may further include, prior to administering the assessment test, receiving parental authorization for the user to undertake the assessment test. It will be appreciated that the assessment test may be administered via an online learning service.

At 2308, the method may further include awarding a trophy to the user upon determining that the assessed user learning characteristic meets or exceeds a predetermined threshold. As discussed above, this may include determining that a user learning level meets or exceeds a predetermined user learning level threshold. At 2310, the method may further include storing the trophy in a user profile accessible to the learning service program. At 2312, the method may further include displaying the trophy on a graphical user interface of the learning service program. Alternatively, the trophy may be displayed on the user interface of a learning application program.

At 2314, the method may include sending a notification message from the online learning service to the parent of the user regarding the award of the trophy.

As discussed above, it should be appreciated that trophies may also be awarded for user learning characteristics that represent achievements within a learning application program that are not directly related to attainment of a learning level. For example, a learning application program developer may specify that a user is to be awarded a trophy after playing the learning application a predetermined number of times, or for perfect attendance at online events. In this case, instead of steps 2304-2308 above, the method may include determining that the user has achieved a predetermined trophy criterion, which may be set by the game developer, and then awarding the trophy to the user upon making such determination.

VIII. Parent Interface

The interaction of the various components of computerized learning system 100 with parent graphical user interface 1100 is discussed in detail hereinafter. Referring to FIGS. 1 and 2, as discussed above, learning service program 106 may be configured to receive learning data from a plurality of learning application programs 104. Computerized learning system 100 may include profile 110 of the user configured to store the learning data in non-volatile storage accessible to learning service program 106 and parent graphical user interface 1100 displayed by the learning service program and configured to include a parent view of learning data associated with the profile. It may be appreciated that the parent user interface may be displayed via at least one of a web page, email, SMS (short message service) message, local service program graphical user interface, and web-enabled mobile telephone, or other suitable display device or format.

As described above, learning service program 106 may include assessment engine 150A, 150B configured to determine an assessed user learning level based on the user performance data, and store the learning level being in profile 110 of the user. The assessed user learning level may be stored in profile 110 according to a profile schema. Learning service program 106 may further include a statistics engine 164A, 164B configured to aggregate learning data stored in profile 110 of the user with data stored in profiles of other users to thereby produce a statistical comparison. Learning data may be uploaded from profile 110 of the user. Learning data of other users, as defined by various elements such as the friends array, the group array, and the group members array according to the profile schema, may be uploaded from profiles of other aggregated users. Learning service program 106 may include recommendation engine 152A, 152B configured to determine a recommendation for continued action for the user based on data stored in the learner profile.

Figure 11:
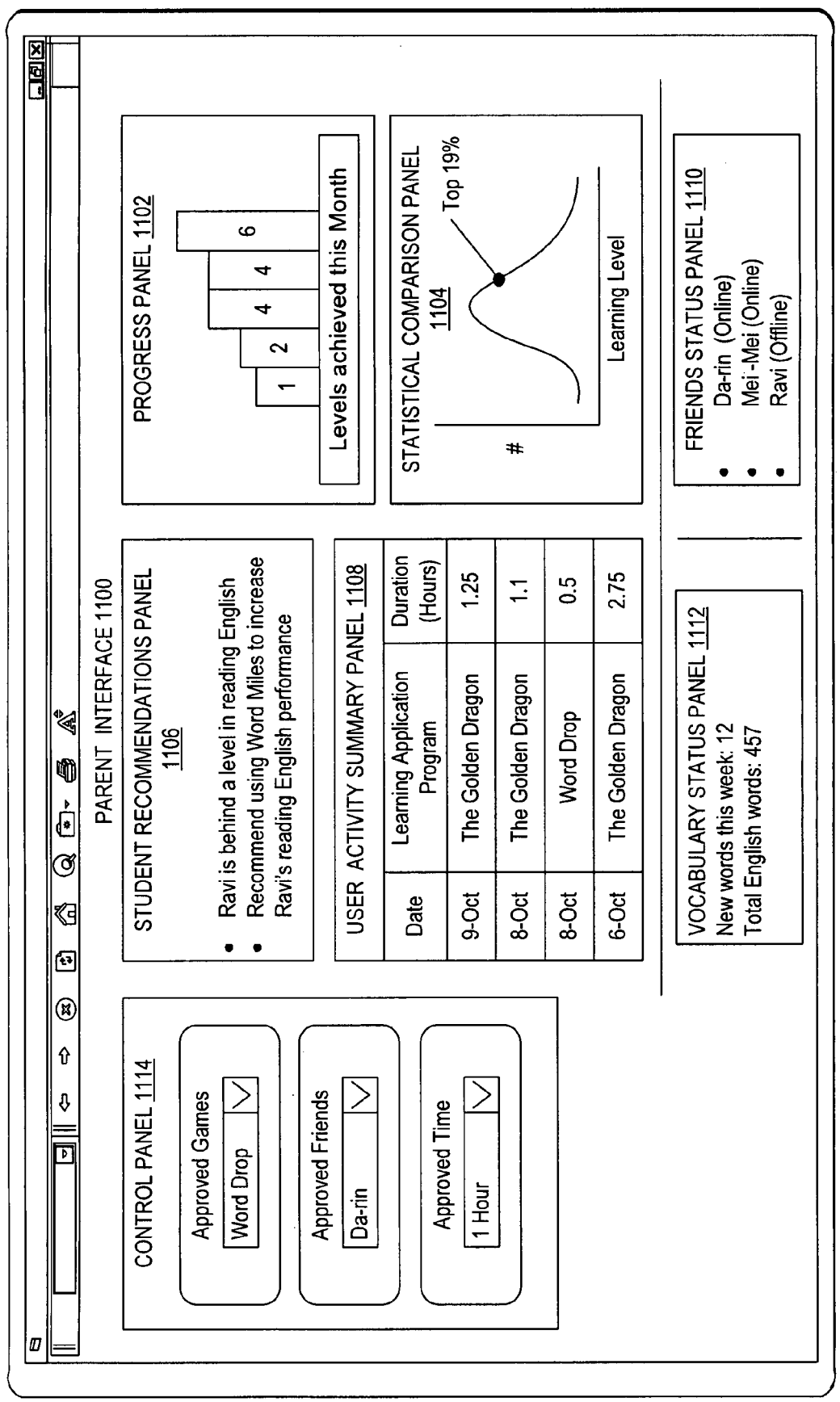
FIG. 11 shows an embodiment of a graphical user interface for presenting to a parent of a user information relating to the user.

Referring next to FIG. 11, a parent graphical user interface 1100 is shown. The interaction of the various components of computerized learning system 100 with parent graphical user interface is discussed in detail hereinafter. As discussed above, learning service program 106 may be configured to receive learning data from a plurality of learning application programs 104, and each user's profile 110 may store the learning data in a non-volatile memory accessible to learning service program 106. Parent graphical user interface 1100, which may be opened by selecting the "parent" button of sign-in interface 300, is configured to present to a parent a view of learning data associated with a user profile. It may be appreciated that the parent user interface may be displayed via any one or more of a web page, an email message, a short message service ("sms") message, a local service program graphical user interface, and a web-enabled mobile telephone.

The parent graphical user interface 100 may include various panels configured to present information to a parent. In some embodiments, the information presented to the parent may include information produced by the various engines of learning service program 106 shown and described in reference to FIGS. 1 and 2 above. For example, as discussed above, the assessment engine 150A, 150B may be configured to determine an assessed user learning level based on user performance data provided by a learning application program, and to store the learning level in profile 110 of the user. Learning service program 106 may further include statistics engine 164A, 164B which may be configured to aggregate learning data stored in profile 110 of the user with data stored in profiles of other users to produce a statistical comparison of the user with the other users. Learning service program 106 may additionally include recommendation engine 152A, 152B configured to determine a recommendation for continued action for the user based on data stored in the learner profile.

Information from each of these engines may be shown on parent graphical user interface 1100. For example, the parent graphical user interface 1100 may be configured to display an assessed user learning level determined by assessment engine 150. In the depicted embodiment, the assessed learning level is displayed in progress panel 1102 as a plurality of learning levels for a skill arranged over time. Likewise, statistical comparisons of a user to other users generated by statistics engine 164B may be displayed in a statistical comparison panel 1104. Further, a recommendation generated by recommendation engine 152A, 152B may be displayed in a student recommendations panel 1106. As specific examples of recommendations, one or more recommended learning application programs for the user may be listed in the recommendations panel 1106.

Continuing with FIG. 11, the parent graphical user interface 1100 may be configured to display a summary of user activity in one or more of the learning activity programs utilized by the user. In the depicted embodiment, a plurality of learning application programs are listed with a corresponding number of times played and a date played in a user activity summary panel 1108. This information may be acquired, for example, by uploading from profile meta data of the user according to profile schema. It will be appreciated that the information shown in user activity summary panel 1108 is shown for the purpose of example, and that any other suitable information may be shown in the user activity summary panel 1108.

The parent graphical user interface 1100 may further include a friends status panel 1110 showing which of the user's friends are currently online, and also a service-level vocabulary status panel 1112 showing progress made acquiring vocabulary in one or more learning application programs. The parent graphical user interface 1100 may be further configured to display a control panel 1114 on the parent graphical user interface, control panel 1114 being configured to receive parent selected control parameters governing a parent regulated activity of the user on the computerized learning system 100. Examples of activities that may be regulated include, but are not limited to, approved games, approved friends, and/or approved time for playing games.

Figure 24:
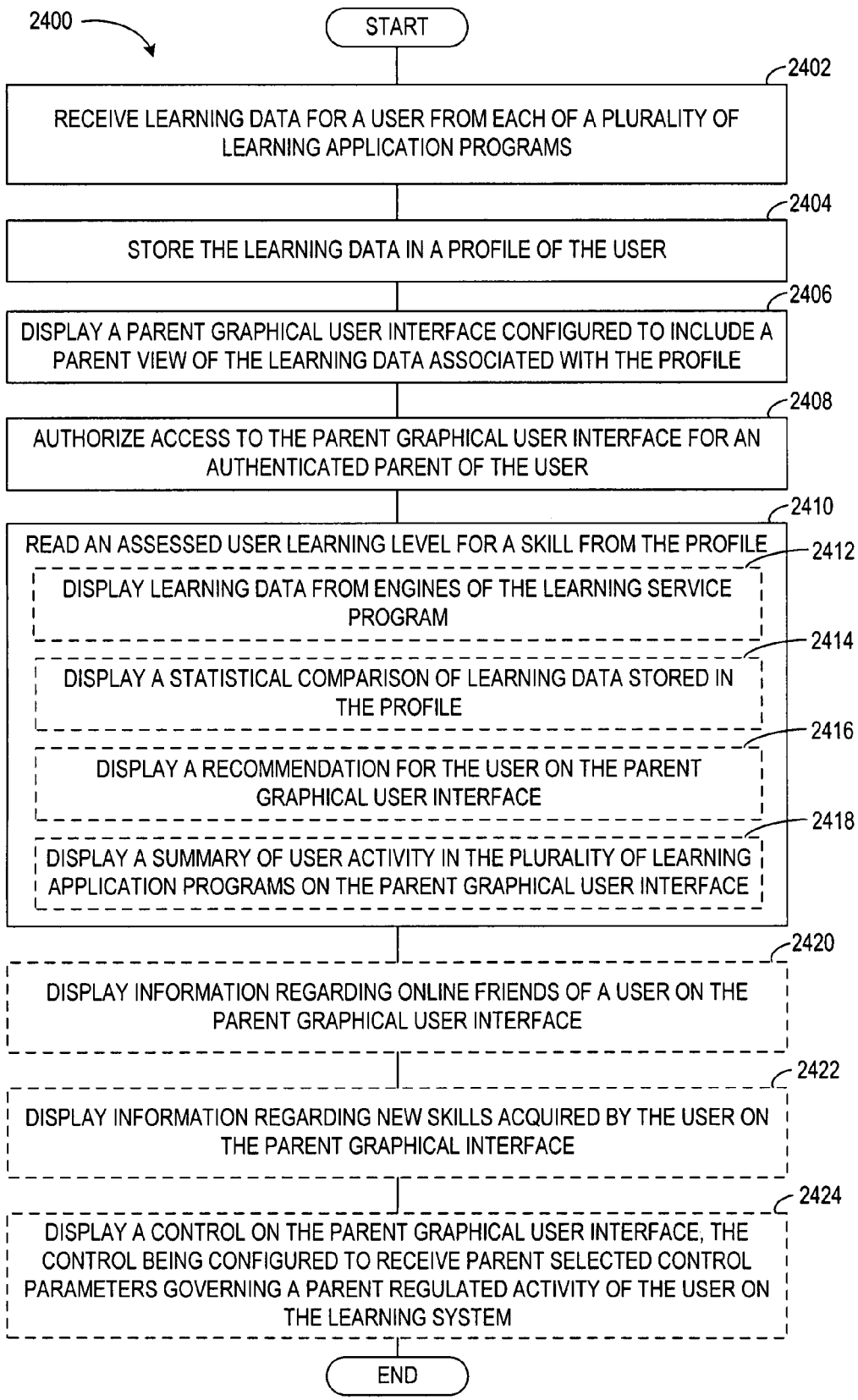
FIG. 24 shows a process flow of an embodiment of a method for providing parental access to user information.

FIG. 24 illustrates a computerized learning method 2400 for utilizing a parent graphical user interface with a plurality of learning application programs. The method includes, at 2402, receiving learning data for a user from each of a plurality of learning application programs, at learning service program 106. At 2404, the method includes storing the learning data in a profile of the user, in non-volatile memory accessible to the learning service program. It will be appreciated that the profile of the user may be stored in non-volatile memory on one or both of a local user client device and an online learning service server system. At 2406, the method may include displaying parent graphical user interface 1100 configured to include a parent view of learning data associated with the profile.

At 2408, the method may further include authorizing access to the parent graphical user interface for an authenticated parent of the user. For example, a parent ID stored in meta data of profile 110 may be associated with an encrypted password of an authenticated parent of the user.

The method may further include, at 2410, displaying learning data from engines of learning service program 106. For example, the method may include, at 2412, reading an assessed user learning level for a skill from profile 110 of the user and displaying the assessed user learning level in the parent view of profile 110 of the user on parent graphical user interface 1100. Additionally, the method may include, at 2414, displaying a statistical comparison of learning data stored in profile 110 of the user with data stored in profiles of other users, on parent graphical user interface 1100. The method may further include, at 2416, displaying a recommendation for the user on parent graphical user interface 1100, the recommendation being selected based on data stored in profile 110 of the user. The method may also include, at 2418, displaying a summary of user activity in the plurality of learning activity programs, on parent graphical user interface 1100, displaying, at 2420, information regarding online friends of a user on parent graphical user interface 1100, and/or displaying, at 2422, information regarding new skills acquired by the user on parent graphical user interface 1100. The information displayed by the method described may be embodied in panels of parent graphical user interface 1100, as described above.

The method may further include, at 2424, displaying a control on the parent graphical user interface, the control being configured to receive parent selected control parameters governing a parent regulated activity of the user on the computerized learning system 100. One or more parent regulated activities may be selected by an authenticated parent of the user in the controls of profile 110 according to profile schema, as described above. The parent regulated activities may be selected in control panel 1114 on parent graphical user interface 1100. Examples of parent regulated activities include, but are not limited to, whether a user is allowed to associate with selected other users via a friends interface, whether a game or other application is an allowed application, whether a selection within a game or application is an allowed selection, and whether a user has permission to use a game or application for a specified duration, at a specified time, identity of the learning application program, or whether "an exchange" of activities may be arranged, e.g. an equal amount of time spent in learning activities can be exchanged for watching videos or other entertainment.

IX. Admin Interface

Figure 12:
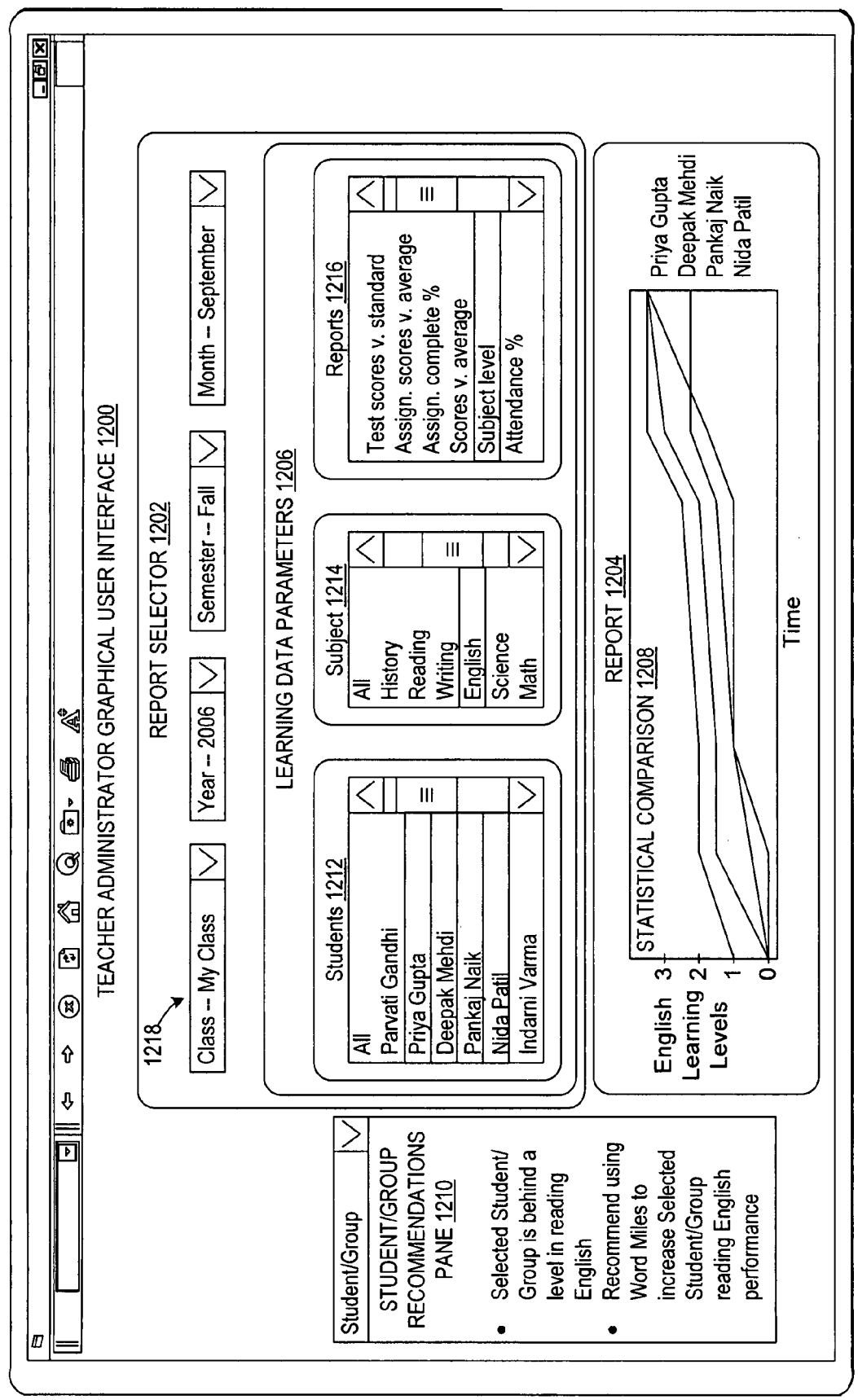
FIG. 12 shows an embodiment of a graphical user interface for presenting to a teacher administrator of a group of users information relating to the group of users.
Figure 13:
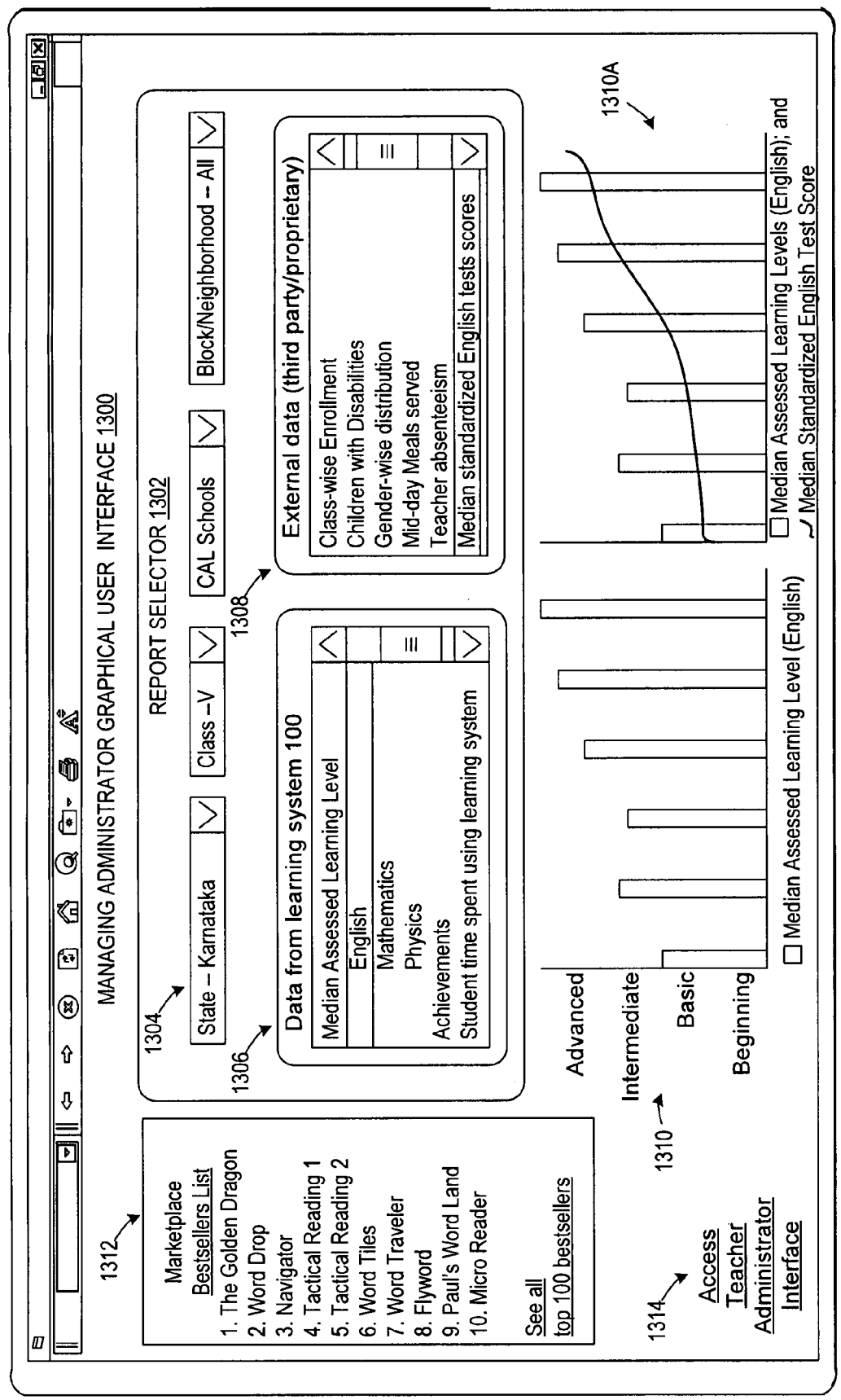
FIG. 13 shows an embodiment of a graphical user interface for presenting to an administrator information relating to one or more schools.

The interaction of the various components of computerized learning system 100 with an administrator graphical user interface discussed in detail hereinafter. Two exemplary administrator graphical user interfaces are illustrated in FIGS. 12 and 13, namely, a teacher administrator graphical user interface 1200 and a managing administrator interface 1300. Teacher administrator graphical user interface 1200 is configured to display learning data from students in a teacher's classroom, and managing administrator interface 1300 is configured to display administrative data as well as individual and aggregate learning data of students. As used herein the term "managing administrator" refers to a school official, government official, or other person having authority to view learning data for entire schools, school districts, geographic regions, or other student populations in the aggregate. As used herein the term "teacher administrator" is refers to a teacher of a class of students. Thus, the term administrator is used broadly to refer to a person with authority to administer educational services to a population of students, and it will be appreciated that a teacher is considered a type of administrator herein. The population of students need not be present within a formal educational institution, but may be an informal or ad-hoc group.

As discussed above, learning service program 106 may be configured to receive learning data for a plurality of users from a plurality of learning application programs 104. Computerized learning system 100 may further include reporting engine 160A, 160B responsive to administrator selected parameters so as to retrieve and process the learning data to produce reports configured to be displayed on teacher and managing administrator graphical user interfaces 1200, 1300. It may be understood that reporting engine 160A, 160B may be configured to receive and process administrative data for use in creation of the reports. Teacher and managing administrator graphical user interfaces 1200, 1300 may include a selector 1202, 1302 configured to receive the administrator selected parameters, and the administrator selected parameters are adapted to form the basis for the display of a learning data report.

As discussed above, learning service program 106 may include an assessment engine 150A, 150B configured to determine an assessed user learning level based on the learning data, wherein the assessed user learning level is displayed on teacher and managing administrator graphical user interfaces 1200, 1300. Learning service program 106 may further include statistics engine 164A, 164B configured to aggregate the learning data for the plurality of users. Teacher and managing administrator graphical user interfaces 1200, 1300 may display a statistical comparison of the learning data. Learning service program 106 may include recommendation engine 152A, 152B configured to determine a recommendation for continued action for the user based on data stored in the learner profile. Teacher and managing administrator graphical user interfaces 1200, 1300 may further display a recommendation for one or more of the plurality of users, the recommendation being selected based on the learning data. Learning service program 106 may include matching engine 154A, 154B configured to match two or more of the plurality of users based on the learning data received at learning service program 106 for said two or more users.

FIG. 12 illustrates an embodiment of teacher administrator graphical user interface 1200 including a selector, such as report selector 1202, configured to receive the teacher administrator selected parameters, where said teacher administrator selected parameters are adapted to form the basis for a learning data report.

In one embodiment, teacher administrator selected parameters may be adapted such that learning data displayed in a learning data report, such as report 1204, on teacher administrator graphical user interface 1200 may include learning level data. For example, learning data parameters 1206 may be selected in report selector 1202 such that the learning data report at 1204 may display learning level data. In another embodiment, learning data displayed on teacher administrator graphical user interface 1200 may include learning data associated with a predefined group of users through time. For example, learning data parameters 1206 may be selected in report selector 1202 to include a group of one or more users. The predefined group of users may include at least one of a classroom, a school, a school district, a state, and a country, for example. Student selector 1212, subject selector 1214, and report template selector 1216 are provided to select individual students, subjects, and report templates for the learning data report. Further, it will be appreciated that in the depicted embodiment, data in these selectors 1212-1216 is populated by demographic selector 1218. Demographic selector 1218 includes pull down menus by which a user may select a class, year, semester, and month from which data is to be drawn from for including in selectors 1212-1214, which in turn may be used by the user to further filter the data for inclusion in report 1204. Some or all of this demographic data may be gathered from school records via proprietary computerized database systems, if not available from computerized learning system 100. Further, it will be appreciated that in some embodiments learning data gathered from computerized learning system 100 may be combined with learning data from other sources, such as standardized test scores, demographic data, etc., to produce report 1204.

As described above, teacher administrator graphical user interface 1200 may display a statistical comparison of the learning data. For example, a statistical comparison 1208 in the form of a graph or table may be included in report 1204. Teacher administrator graphical user interface 1200 may further display a recommendation for one or more of the plurality of users, the recommendation being selected based on the learning data. For example, recommendation pane 1210 may include an assessment of the learning level of one or more students or the group, for a skill, and a list of one or more recommendations.

The following is a list of example reports that may be produced via the teacher administrator user interface.

1. Individual skill levels (diagnostic, proficiency)
2. Individual improvement over time per skill (diagnostic)
3. Individual comparison to—and mappings to—other proficiency measures, standards (e.g., national exams, Flesch-Kincaid reading level)
4. Individual percentile ranking for profile characteristics (e.g., overall, by age, by year of study, by first language, to others in class)
5. Sample speech recordings compared to models per student
6. Listing of capabilities associated with each skill per student
7. Trophies per student
8. Total vocabulary size of known words per student
9. Next skills to acquire per student
10. Skills that are lagging per student
11. Class comparison to third party proficiency measures, standards (e.g., national exams, Flesch-Kincaid reading level)
12. Class percentile ranking for profile characteristics, by subject (e.g., overall, by age by year of study, by native language)
13. Class distribution of students (e.g., by learning content completion percentage, or level per skill)

FIG. 13 illustrates an embodiment of a managing administrator graphical user interface including a managing administrator view of learning data for an managing administrator, where the administrator graphical user interface further includes data from external sources, in addition to learning data gathered from computerized learning system 100, and is configured to draw the data from a wider demographic pool of users.

Various administrative data may be selected via report selector 1302. Report selector 1302 typically includes a demographics selector 1304 configured to receive user selection of geographic region such as state, class, and school district, and block/neighborhood within a school district from which administrative data will be drawn to produce administrative report 1310. Report selector 1302 may further include an administrative data selectors such as computerized learning system data selector 1306 and external data selector 1308 configured to enable the user to select with particularity which data gathered from external sources to include in administrative report 1310. The computerized learning system data selector 1306 typically is configured to enable the user to select data gathered from computerized learning system 100, while external data selector 1308 is typically configured to enable the user to select data gathered from third party and proprietary sources, such national exam statistics or a school district's own records.

In one embodiment, the external data may include financial data such as salary data, management expense data, and promotion data that the administrator may wish to compare and correlate. This data may be drawn from third party or proprietary services that reside outside of the learning service, and may be combined with learning service data through the use of web services. The external data may also include administrative data such as testing data administered and scored in a standard manner. For example, testing data may include one or more of state or national exam scores, TOEFL scores, and/or Flesch-Kincaid or other proficiency data. In yet another embodiment, the external data may also include organizational data gathered from services outside of the learning service but combined for reporting purposes with learning service data. For example, the organizational data may include one or more of enrollment data, disability data, gender distribution data, and teacher absentee data. Various other exemplary data types are illustrated in FIG. 13. Administrative report 1310 may be configured to display a report containing a graphical or textual representation of the computerized learning system data, such as the median assessed learning levels for English, in the depicted embodiment. In addition, as shown at 1310A, the administrative report may be configured to display a report containing a graphical or textual representation of computerized learning system data combined with other data from third party or proprietary sources, such as the comparison of median assessed learning levels for English with median standardized test scores for English.

Further, it will be appreciated that managing administrator graphical user interface is typically configured to offer the administrator access via link 1314 to the teacher administrator graphical user interface with managing administrator level permissions, thereby enabling the generation of all of the reports listed above on a individual or classroom basis, plus the following reports for larger aggregate groups of students.

1. School/city/state comparison to third party proficiency measures, standards (e.g., national exams, Flesch-Kincaid reading level)
2. School/city/state percentile ranking for profile characteristics, by subject (e.g., overall, by age by year of study, by native language)
3. School/city/state distribution of students (e.g., by content completion percentage, or level per skill)

The administrator user interface 1300 may also be configured to display a marketplace pane 1312 in which, for example, books and software of interest to managing administrators may be displayed. In the depicted embodiment, a top sellers list is illustrated. Within the marketplace pane 1312, a link may be provided by which the administrator can access further information or make a purchase.

Figure 25:
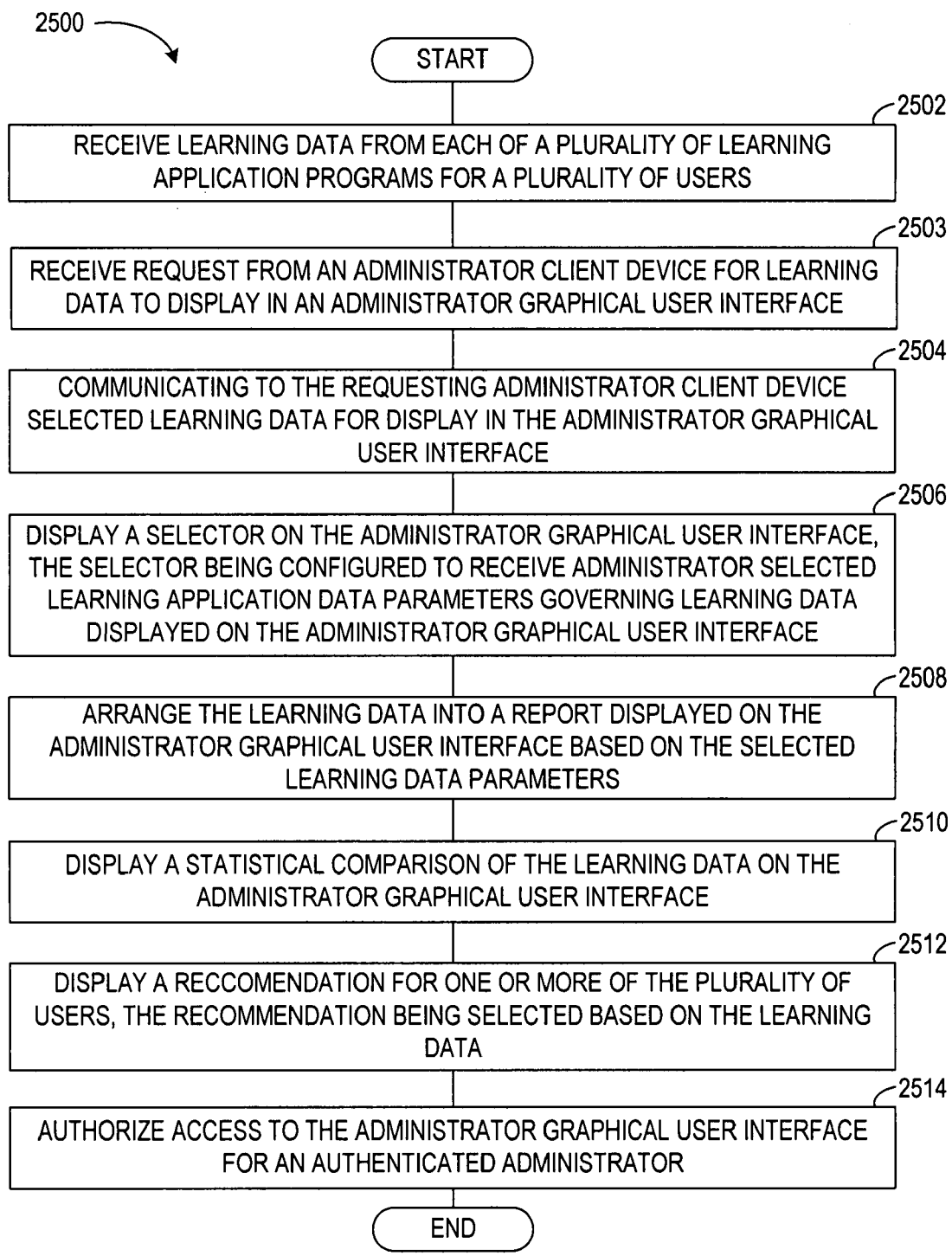
FIG. 25 shows a process flow of an embodiment of a method for providing administrator access to user information.

FIG. 25 illustrates a computerized learning method 2500 for utilizing an administrator graphical user interface with a plurality of learning application programs. The method may include, at 2502, at learning service program 106, receiving learning data from each of a plurality of learning application programs for a plurality of users, and, at 2503, receiving a request from an administrator client device for learning data to display in an administrator graphical user interface 1300. The request may be received via an application programming interface, in the case of a local service program, or via an online service, in the case of an online service program. At 2504, the method may include communicating to the requesting administrator client device selected learning data for display in the administrator graphical user interface.

At 2506, the method may further comprise displaying a selector on administrator graphical user interface 1300, the selector being configured to receive administrator selected learning data parameters governing learning data displayed on administrator graphical user interface 1300, and, at 2508, arranging learning data into a report displayed on administrator graphical user interface 1300 based on the selected learning data parameters. It will be appreciated that the learning data may be for aggregate student populations, and may be combined with data not gathered via computerized learning system 100, to produce the types of reports described above.

At 2510, the method may further comprise displaying a statistical comparison of the learning data, on the administrator graphical user interface. At 2512, the method may further comprise displaying a recommendation for one or more of the plurality of users, the recommendation being selected based on the learning data. At 2514, the method may further comprise authorizing access to the administrator graphical user interface for an authenticated administrator. It should be appreciated that the steps illustrated in FIG. 25, particularly steps 2506-2514, may occur in any suitable order in relation to each other and in relation to steps 2502-2504.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computerized learning method comprising:
at a learning service program executable by a computing device, receiving a write request from a first learning application program to write an assessed learning level for a skill in a user profile, the assessed learning level being selected from a predefined set of learning levels for the skill by the first learning application program, the user profile including a plurality of skills and an assigned learning level for each skill, which are defined according to a profile schema;
writing the selected learning level for the skill in the user profile;
receiving a write request from the first learning application program to write a scaffolding level for the skill in the user profile, the scaffolding level determining a type or amount of support provided to a user to understand and respond to a challenge presented by the first learning application program, the scaffolding level being selected from a predefined set of scaffolding levels for the skill by the first learning application program based on a cost of support presented to the user by the first learning application program;
writing the selected scaffolding level for the skill in the user profile;
receiving a read request from a second learning application program to read the selected learning level for the skill in the user profile, the second learning application program being configured to present a challenge to the user that varies in difficulty based on the selected learning level for the skill;

receiving a read request from the second learning application program to read the selected scaffolding level for the skill in the user profile, the second learning application program being configured to present support to the user that varies in amount or type based on the selected scaffolding level for the skill;

retrieving the selected learning level from the user profile;

retrieving the selected scaffolding level from the user profile;

sending the selected learning level to the second learning application program; and sending the selected scaffolding level to the second learning application program.

2. The method of claim 1, further comprising:

prior to writing the selected learning level for the skill in the user profile, determining that the write request is authorized.

3. The method of claim 1, wherein the first learning application program is from a first third-party and the second learning application program is from a second third-party, and the read request and the write request are received via a public application programming interface.

4. The method of claim 1, wherein the skill is mastery of vocabulary words in a target language, and wherein the learning service program is configured to send to a learning application program skill and learning level data from the user profile in response to the read request, which indicates a set of vocabulary words which have been demonstrated as known to the user through the user's use of the learning application program and/or the learning service program.

5. A computerized learning method comprising:

at a learning application program executable by a computing device, sending a read request to a learning service program, the read request being a request to read a stored learning level and a stored scaffolding level for a skill from a user profile, the user profile being editable by a plurality of other learning application programs via the learning service program, the stored learning level, the stored scaffolding level, and skill being defined according to a profile schema;

receiving a response to the read request including the stored learning level for the skill to the learning application program;

presenting a challenge to a user via a user interface of the learning application program;

displaying a cost meter to the user via the user interface, the cost meter providing a real-time indication of a cost associated with use of support during the challenge, the cost being used to evaluate whether to increase the stored scaffolding level that determines a type or amount of support provided to the user to respond to the challenge;

presenting support to the user via the user interface, the cost of the support causing a change in display of the cost meter;

receiving a response to the challenge from the user via the user interface of the learning application program;

determining that the stored learning level should be updated to an updated learning level, based on user performance data generated based on the response to the challenge and predetermined learning assessment rules;

determining that the stored scaffolding level should be updated to an updated scaffolding level, based on the cost of the support presented to the user;

sending a write request to the learning service program, to modify the stored learning level to the updated learning level; and sending a write request to the learning service program to modify the stored scaffolding level to the updated scaffolding level.

6. The method of claim 5, further comprising:

presenting a support selector to the user via the user interface to aid the user in responding to the challenge;

wherein the user performance data includes support history data indicating use of the support selector by the user.

7. The method of claim 6, wherein the support selector is one of a challenge support selector configured to enable the user to select support to understand the challenge presented to the user, and a response support selector configured to enable the user to select support to respond to the challenge.

8. The method of claim 6, wherein the support selector is configured to enable the user to select support in a plurality of support categories, each support category corresponding to a skill defined in the profile schema.

9. The method of claim 8, wherein the support selector is configured to enable the user to select support in written form, spoken form, in a native language of the user, and in a target language of the user.

10. The method of claim 5, further comprising:

measuring a response time of the user response to the challenge;

wherein the user performance data further includes the response time.

11. The method of claim 5, further comprising:

counting a number of inaccurate responses received from the user in response to the challenge;

wherein the user performance data further includes the number of inaccurate responses.

12. The method of claim 5, wherein the user performance data includes response data based on the response of the user.

13. The method of claim 12, further comprising:

determining a degree of accuracy of the response;

wherein the response data includes the degree of accuracy of the response.

14. The method of claim 13, further comprising:

receiving a written response from the user via the user interface;

determining a degree of accuracy of the written response;

wherein the response data includes the degree accuracy of the written response;

wherein the skill is written language ability in a target language; and wherein determining via a game-based learning assessment module that the stored learning level for the skill should be updated to the updated learning level, is based at least in part on the degree of accuracy of the written response.

15. The method of claim 13, further comprising:

receiving a spoken response from the user via a microphone; and determining a degree of accuracy of the spoken response;

wherein the response data includes the degree of accuracy of the spoken response;

wherein the skill is spoken language ability in a target language; and wherein determining via a game-based learning assessment module that the stored learning level for the skill should be updated to the updated learning level, is based at least in part on the degree of accuracy of the spoken response.

16. A computerized learning system, comprising:

a plurality of learning profiles stored in non-volatile memory of a computing device, each learning profile being associated with a user, each profile including learning data organized according to a profile schema, the learning data including one or more skills, an assessed user learning level for each skill selected from among a predefined set of learning levels, and a scaffolding level for each skill selected from among a predefined set of scaffolding levels; and a learning service program configured to receive requests from a plurality of learning application programs that are configured to present challenges to users, display a cost meter to the users that provides a real-time indication of a cost associated with the use of support during the challenges, the cost being used to evaluate whether to increase the scaffolding level that determines a type or amount of support provided to users to understand and respond to challenges, the requests being to read and write the assessed user learning level and the scaffolding level for each skill to and from each of the user profiles, the assessed user learning level being assessed based on responses to the challenges from the users by the learning application program that is requesting to write to the user profile, the scaffolding level being determined based on the cost of support used by users in responding to challenges by the learning application program that is requesting to write to the user profile, and the requests being received via an application programming interface.

17. The system of claim 16, wherein the skills include mastery of vocabulary words, and wherein the learning service program is configured to receive requests to read a set of vocabulary words for a user, and write newly mastered vocabulary words to the user profile, in response to requests from learning application programs.

18. The system of claim 16, further comprising:
    an arbitration engine configured to determine if each of the read and write requests is authorized.

* * * * *